(12) United States Patent
Gil et al.

(10) Patent No.: US 10,993,569 B2
(45) Date of Patent: May 4, 2021

(54) DRONE DELIVERY PLATFORM TO FACILITATE DELIVERY OF PARCELS BY UNMANNED AERIAL VEHICLES

(71) Applicant: United Parcel Service of America, Inc., Atlanta, GA (US)

(72) Inventors: Julio Gil, Veldhoven (NL); Bala Ganesh, Alpharetta, GA (US); Thomas Ramsager, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

(21) Appl. No.: 16/704,967

(22) Filed: Dec. 5, 2019

(65) Prior Publication Data
US 2020/0180880 A1    Jun. 11, 2020

Related U.S. Application Data

(60) Provisional application No. 62/776,355, filed on Dec. 6, 2018.

(51) Int. Cl.
*A47G 29/22* (2006.01)
*A47G 29/14* (2006.01)
(Continued)

(52) U.S. Cl.
CPC .......... *A47G 29/22* (2013.01); *A47G 29/141* (2013.01); *A47G 29/30* (2013.01); *B64C 39/024* (2013.01);
(Continued)

(58) Field of Classification Search
CPC ...... A47G 29/22; A47G 29/141; A47G 29/30; B64C 39/04; B64C 2201/027; B64C 2201/128
See application file for complete search history.

(56) References Cited

U.S. PATENT DOCUMENTS 1,784,743 A     12/1930  Montgomery
10,026,054 B1 *  7/2018  Staton ............... G06Q 10/0832
(Continued)

FOREIGN PATENT DOCUMENTS

CN    108189704 A     6/2018
EP    3412569 A1     12/2018
(Continued)

OTHER PUBLICATIONS

International Search Report and Written Opinion received for PCT Patent Application No. PCT/US2019/064945, dated Apr. 3, 2020, 15 pages.
(Continued)

*Primary Examiner* — Kaitlin S Joerger
(74) *Attorney, Agent, or Firm* — Shook, Hardy & Bacon, L.L.P.

(57) ABSTRACT

An elevated delivery platform having a delivery surface that can be placed at a location off the ground to better facilitate delivery of parcels by unmanned aerial vehicles, such as delivery drones, is provided. By placing the elevated delivery platform in an area above the ground, such as atop a home or a pole, a drone is more capable of making deliveries because it avoids obstacles nearer to the ground that typically make drone delivery challenging. The elevated delivery platform raises and lowers parcels to a position where they can easily be retrieved. Some systems also provide a deployable cover to protect parcels from adverse weather conditions while awaiting pickup or following delivery. The elevated delivery platform can be used as part of a drone delivery system that can also include a containment unit, a computer application, or any combination of these aspects.

18 Claims, 46 Drawing Sheets

(51) Int. Cl.
*A47G 29/30* (2006.01)
*B64F 1/32* (2006.01)
*B64C 39/02* (2006.01)
*B65G 67/00* (2006.01)

(52) U.S. Cl.
CPC .......... *B64F 1/32* (2013.01); *B65G 67/00* (2013.01); *B64C 2201/027* (2013.01); *B64C 2201/128* (2013.01)

(56) References Cited

U.S. PATENT DOCUMENTS

| | | | |
|---|---|---|---|
| 10,093,432 B2 | 10/2018 | McKinnon et al. | |
| 10,351,261 B1* | 7/2019 | Bryant | B64F 1/362 |
| 10,501,205 B1* | 12/2019 | Siewert | B64F 1/32 |
| 10,604,252 B2* | 3/2020 | Blake | B64F 1/32 |
| 10,647,508 B2* | 5/2020 | Eck | B65G 1/0464 |
| 10,661,916 B2* | 5/2020 | Janssen | G08G 5/0069 |
| 2015/0158599 A1* | 6/2015 | Sisko | B64F 1/20 244/114 R |
| 2015/0175276 A1* | 6/2015 | Koster | B64C 39/024 244/114 R |
| 2017/0127868 A1* | 5/2017 | Adewuyi | A47G 29/141 |
| 2017/0275025 A1* | 9/2017 | Johnson | B64C 39/024 |
| 2018/0141682 A1 | 5/2018 | Blake et al. | |
| 2018/0155032 A1 | 6/2018 | Gil et al. | |
| 2019/0002129 A1* | 1/2019 | Walsh | B64F 1/32 |
| 2019/0125116 A1* | 5/2019 | Russell | B64F 1/32 |
| 2019/0133363 A1* | 5/2019 | Burchat | A47G 29/141 |
| 2019/0135433 A1 | 5/2019 | Goovaerts et al. | |
| 2019/0300202 A1* | 10/2019 | High | G05B 15/02 |
| 2020/0013008 A1* | 1/2020 | Newcomb | B64F 1/007 |
| 2020/0178717 A1* | 6/2020 | Gil | A47G 29/22 |
| 2020/0198801 A1* | 6/2020 | Carthew | B64D 1/12 |
| 2020/0207473 A1* | 7/2020 | Blake | B64F 1/22 |
| 2020/0207485 A1* | 7/2020 | Foggia | B64F 1/222 |
| 2020/0255163 A1* | 8/2020 | Janssen | G05D 1/00 |
| 2020/0293980 A1* | 9/2020 | Ogilvie | G06Q 50/28 |

FOREIGN PATENT DOCUMENTS

| | | |
|---|---|---|
| GB | 518117 | 2/1940 |
| WO | 2013/158568 A1 | 10/2013 |
| WO | 2014/080390 A2 | 5/2014 |
| WO | 2017/081550 A1 | 5/2017 |

OTHER PUBLICATIONS

International Search Report and Written Opinion received for PCT Patent Application No. PCT/US2019/064933, dated Mar. 9, 2020, 14 pages.
Alain Clapaud, "Skynet reinvents the mailbox for UAVs", website, Nov. 11, 2014, 4eRevolution, 2 pages. <http://www.4erevolution.com/en/skynet-livraison-drone>.
Sara Johns, "Secure Parcel Box—a Drop Box with Video Surveillance", website, May 23, 2016, KeenEyeMedia, 7 pages. <http://wesolvethat.com/secure-parcel-box>.
Horizon mailbox, Hamerkop.com, 2 pages, available at: <https://www.hamerkopmailbox.com/>.
Hamerkop, "Hamerkop", video, Jan. 14, 2018, Youtube, 40 Seconds, 7 pages. <https://www.youtube.com/watch?time_continue=40&v=OjNy4TNPfYs>.
Airbox Technologies, "AirBox Drone", website, Drone Delivery Systems, Sep. 28, 2016, 8 pages. <https://airboxtechnologies.com/>.

* cited by examiner ial Appli-
DRONE DELIVERY PLATFORM TO FACILITATE DELIVERY OF PARCELS BY UNMANNED AERIAL VEHICLES

CROSS-REFERENCE TO RELATED APPLICATIONS

This application claims priority to U.S. Provisional Application No. 62/776,355, entitled "Drone Delivery System to Send and Receive Parcels," filed on Dec. 6, 2018, which is hereby incorporated by reference in its entirety.

This application is also related to U.S. application Ser. No. 16/704,974, and is filed concurrently with this application on Dec. 5, 2019, and is entitled "A Containment Unity for Facilitating Parcel Delivery By Unmanned Aerial Vehicle," which is hereby incorporated by reference in its entirety.

BACKGROUND

Home delivery of parcels has traditionally been performed using human couriers. Delivery companies have begun to explore the possibility of delivering parcels using unmanned systems in collaboration with human couriers to increase delivery efficiency and to decrease the physical demands on human couriers. However, there remain unsolved problems when delivering parcels using unmanned technologies.

SUMMARY

At a high level, aspects described herein relate to an elevated delivery platform having a delivery surface that can be placed at a location off the ground to better facilitate delivery of parcels by unmanned aerial vehicles (UAVs), such as delivery drones. The elevated delivery platform can be attached to an object off the ground, such as a pole or a home. By placing the elevated delivery platform in an area above the ground, a delivery drone is more easily capable of making deliveries to the platform by removing many of the obstacles nearer to the ground that typically make drone delivery challenging. This further increases the safety of drone delivery by allowing drones to stay in the air above people and property. The elevated platform facilitates drone delivery by receiving parcels from drones and safely lowering the parcels so that they can be retrieved by a person. Similarly, parcels can be elevated from the ground level to the elevated platform to be retrieved by drones.

Some systems also include mechanism for protecting parcels from adverse weather conditions, such as a cover that forms a protected area around a parcel. These systems are beneficial because parcels can be left for extended periods of time, either awaiting pick up or after delivery. Not only does this protect parcels from weather conditions and allow for broader time windows for parcel delivery, but the elevation and cover also provide additional security to protect parcel from thieves, also known as "porch pirates."

The elevated delivery platform can be used as part of a personal drone delivery system that can also include a containment unit, a computer application, or any combination of these aspects.

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Figure 1:
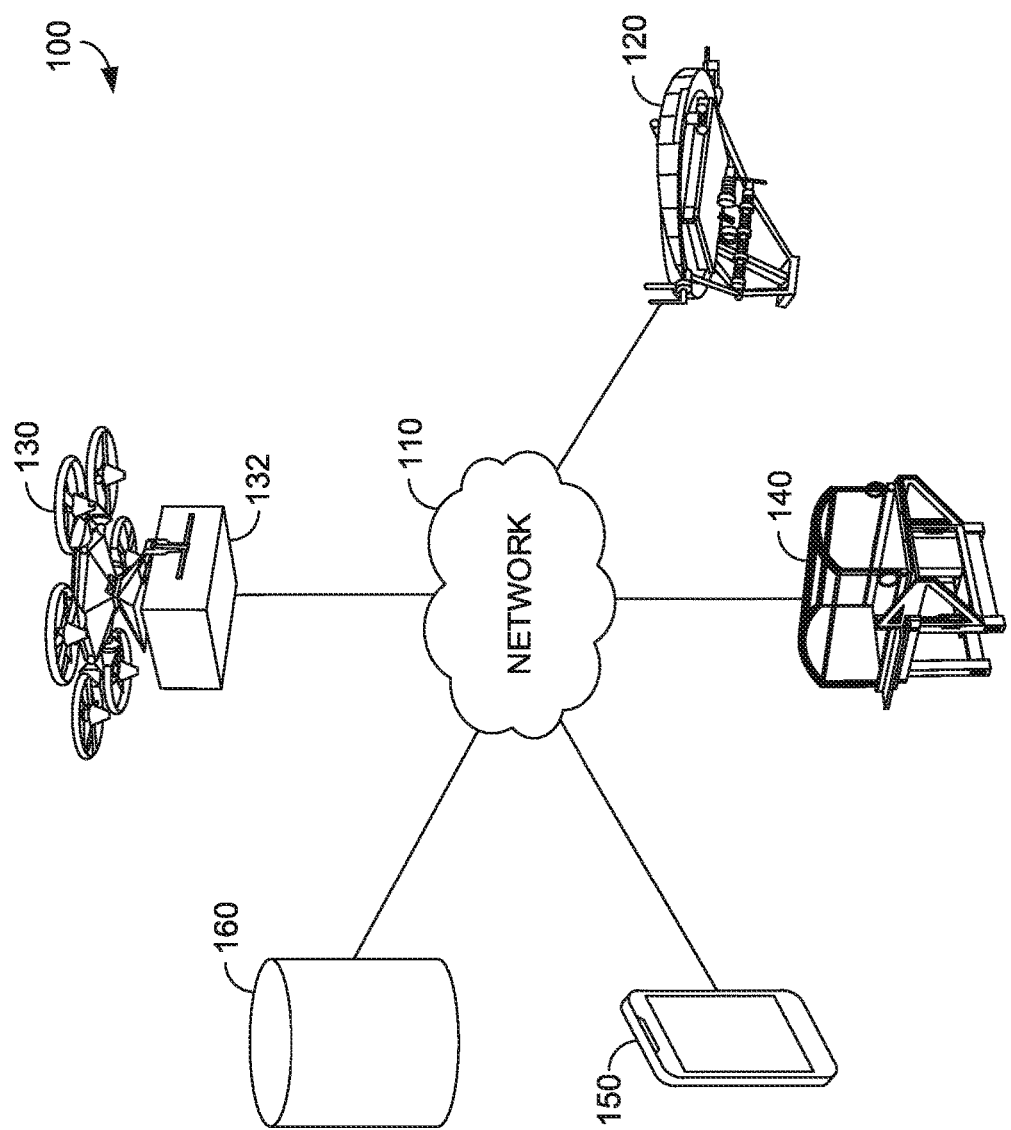
FIG. 1 is an example operating environment for drone delivery, in accordance with embodiments described herein.

The present disclosure provides for a personal drone delivery system. The delivery system may be an unmanned aerial vehicle (UAV) delivery platform, a containment unit, a computer application, or any combination of these.

Throughout this disclosure, "unmanned systems" include systems that are capable of operating for at least a period of time without input from an on-board human. Unmanned systems may include terrestrial, aquatic, or aerial vehicles. An unmanned system may sometimes include a human on board who is capable of taking control of the unmanned system or that provides instructions to the unmanned system. Some unmanned systems may operate without a human on board, but may be controlled or partially controlled remotely by a human pilot. Some unmanned systems may operate autonomously by receiving instructions from a computer program. Thus, to complete an objective, an unmanned system may operate autonomously, under the guidance of received instructions, or under partial or total control of a human pilot. The word "drone" is synonymous with "unmanned system" as used herein.

One example of an aerial unmanned system is an unmanned aerial vehicle, more commonly called a UAV. The UAVs discussed and illustrated in this disclosure are a four-rotor vertical takeoff and landing UAVs. However, the UAV may include any number of rotors, may be embodied as be a fixed-wing aircraft, or some combination of both.

As used in this disclosure, the word "delivery" is intended to mean both "to drop off" and "to pick up," unless one of the options is impracticable. For example, a "delivery vehicle" is a vehicle capable of picking up a parcel and dropping off a parcel at a location.

Having this in mind, the present technology describes a personal drone delivery system that may include a UAV delivery platform, a containment unit, a computer application, or any combination of these. This disclosure describes the delivery system as a "personal" system, and many of the embodiments are discussed in the context of a person's home or place of living. It is not intended to be limited to such embodiments, but may also be used in the context of business or industries, including business locations that are primarily engaged in parcel delivery.

At a high level, the UAV delivery platform may be an elevated surface to facilitate the delivery of parcels from a UAV. As used herein, the UAV delivery platform may also be referred to as simply a "delivery platform." The delivery platform may be elevated by mounting it onto a structure, including a pole, a home, an apartment building, or the like. In some instances, it may be mounted on a track system to move the delivery platform along the track system. The delivery platform may communicate with different devices and systems, such as a mobile user device and a UAV. The delivery platform may include one or more of several different sensors to facilitate communication and delivery, such as antennas, cameras, weather sensors, pressure sensors, and the like.

The delivery platform may comprise an elevating surface. The elevating surface may be raised and lowered. As such, when a parcel is dropped off at the delivery platform by a UAV, the parcel may be lowered from the delivery platform by the elevating surface to a lower position where the parcel may be retrieved by a person. In some cases, the parcel may be lowered by the elevating surface and placed into a containment unit.

The containment unit may comprise a housing to protect the parcel from environmental elements and to provide security to the parcel. The containment unit may receive the parcel from the elevating surface. To do so, the containment unit may extend a portion of the housing over the elevating surface having the parcel. Then, the portion of the housing may be retracted so that an end of the housing unit pulls the parcel into the housing. The containment unit may store the parcel until it is retrieved by a person or drone.

Each of the delivery platform and the containment unit may be operated autonomously using predetermined or learned instructions. The delivery platform and the containment unit may also be controlled using a computer application, sometimes referred to as an "app" or "mobile app." For example, the elevating surface of the delivery platform may be raised and lowered in response to instructions received from a mobile device executing an app.

Having described a high level summary of the technology, example aspects are provided below in further detail with reference to the figures.

Operating Environment

FIG. 1 provides an example operating environment 100 that may be used for drone delivery. Operating environment 100 is illustrated as having delivery platform 120, drone 130, containment unit 140, user device 150, and storage 160. Each of these is shown communicating through network 110. Network 110 may include, without limitation, local area networks (LANs) and wide area networks (WANs). Network 110 may comprise the Internet and cellular networks, or any of a variety of possible public and private networks. In some instances, network 110 may comprise direct hard-wire communication, or any form of short- or long-range communication methods, such as infrared (IR) or Bluetooth. Because operating environment 100 is intended only to illustrate one example environment, it should not be read as limiting the operating environment to only the illustrated components, but rather, it may include any combination of these or other components.

Delivery platform 120 may be any platform that facilitates parcel delivery by a drone, such as drone 130. Some example embodiments of suitable delivery platforms will be further described in this disclosure. Drone 130, while illustrated as a UAV, may be any unmanned system. In a specific embodiment that will be described in more detail, drone 130 is a UAV having parcel carrier 132. Containment unit 140 is also illustrated within operating environment 100, and may comprise any device for housing or securing a parcel during the delivery process. Specific example embodiments of containment unit 140 are described in more detail in this disclosure.

User device 150 represents any device that may receive user inputs and communicate information through network 110. One suitable example of user device 150 that may be utilized with the present technology is computing device 1200, which is described in more detail below with reference to FIG. 41. However, more general examples of user device 150 may include smartphones, smartwatches, personal computers, tablets, personal digital assistants, or the like. User device 150 may be capable of executing a computer application, more commonly referred to as an "app" or a "mobile app." An app is a computer-readable software code that may be executed by a processor of user device 150 and may be stored in storage 160.

In general, storage 160 stores computer-usable information, such as data or instructions. One example of storage 160 is described in FIG. 41 with reference to memory 1212. Storage 160 may store information that is utilized by any of the other components illustrated in operating environment 100 or described throughout this disclosure. While storage 160 is depicted as a single data store, storage 160 may include one or more data stores or may be in a cloud environment. Storage 160 may include remote data stores or may be integrated within any of the components in operating environment 100.

Delivery Platform

Figure 2:
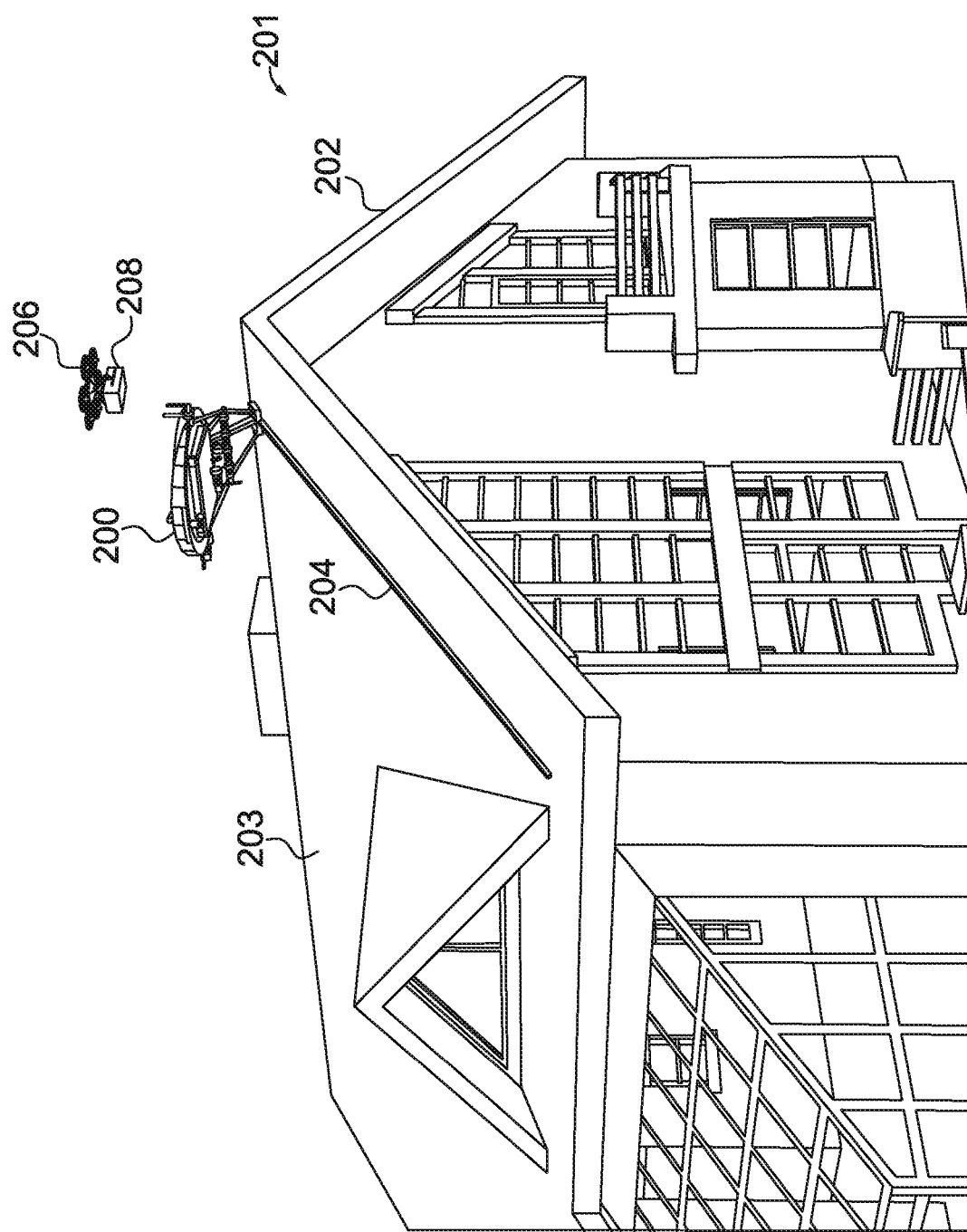
FIG. 2 is an example use-case environment for a delivery platform, in accordance with embodiments described herein.

FIG. 2 provides a general overview 201 of delivery platform 200 in an example use environment. Here, delivery platform 200 is fixed to structure 202, which is an example location that may send or receive parcels. Delivery platform 200 may be fixed to an area on structure 202 so that delivery platform 200 is elevated above structure 202 or at least above a majority of structure 202. Delivery platform 200 is shown in FIG. 2 as coupled to track system 204 that runs along rooftop 203. Other track system locations may be used and are discussed in more detail below. Track system 204 may move delivery platform 200 from a first position on structure 202 to a second position on structure 202. The first position may be higher in elevation than the second position, and the first position may be used to facilitate delivery of a parcel 208 by UAV 206. The second position may be used to facilitate elevating or lowering a parcel 208 to or from delivery platform 200 so that it may be retrieved by a person on the ground. Various aspects of these elements will be described in more detail below.

At a high level, however, delivery platform 200 solves several problems that have been encountered when delivering parcels using drones. When delivering parcels using UAVs, one problem that is sometimes encountered is a difficult terrain at the delivery location. The delivery location may be surrounded by obstacles such as trees or vehicles, or may be geographically sloped. These issues can make take-offs and landings or near-ground pick ups and releases difficult. Similarly, there are additional safety concerns when delivering parcels using UAVs, particularly when navigating UAVs near the ground. For instance, people, animals, and property may be near the delivery location at the time of the delivery.

To solve these problems, some of the delivery platforms described in the present disclosure, such as delivery platform 200, are elevated above these obstacles and safety concerns. Thus, when UAVs are delivering parcels, many of these obstacles and safety concerns may be avoided. This also has the added benefit of allowing UAV delivery to take place at a greater number of delivery locations. Since there are currently many delivery addresses that may not be able to take advantage of UAV delivery due to the delivery location's structure or its terrain, the delivery platforms described throughout this disclosure provide systems that allow these locations to begin using UAV delivery methods. Additionally, the elevated aspects of the delivery platforms provide enhanced security for people shipping and receiving parcels. Instead of placing a parcel on the ground, such as on a porch, the parcels may be selectively raised to an elevated, more secure position, and they may stay in this position until retrieved by a UAV or a person on the ground.

Figure 3:
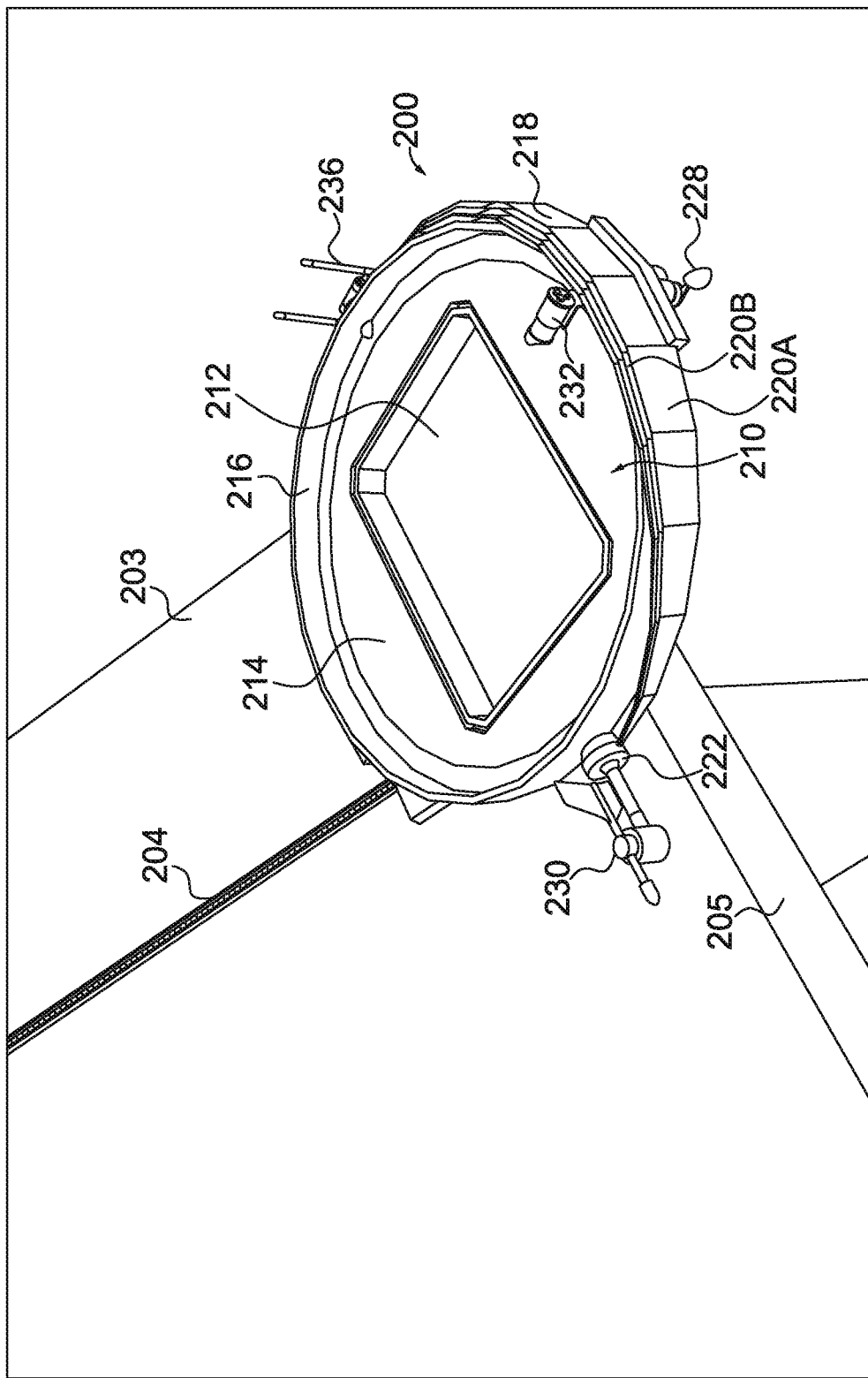
FIGS. 3-5 are top views of the delivery platform of FIG. 2, in accordance with embodiments described herein.

Turning now to FIG. 3, a top view of delivery platform 200 is provided. Delivery platform 200 is shown in the second position, which is lower in elevation than the first position, shown in FIG. 2. In the second position, delivery platform 200 may extend over edge 205 of rooftop 203 so that there is no obstruction below a bottom of delivery platform 200 to the ground or release point.

In general, delivery platform 200 may comprise delivery surface 210. Delivery surface 210 may include elevating surface 212, which may comprise substantially all of delivery surface 210 or only a portion of delivery surface 210. In the example illustrated in FIG. 3, elevating surface 212 is shown as comprising a portion of delivery surface 210, while another portion of delivery surface 210 includes stationary surface 214. Here, stationary surface 214 surrounds elevating surface 212, and elevating surface 212 is recessed below stationary surface 214. Additionally, delivery surface 210 may be proximate outer rim 216, which may be fixed to outer rim 216 and extend upward therefrom.

Figure 4:
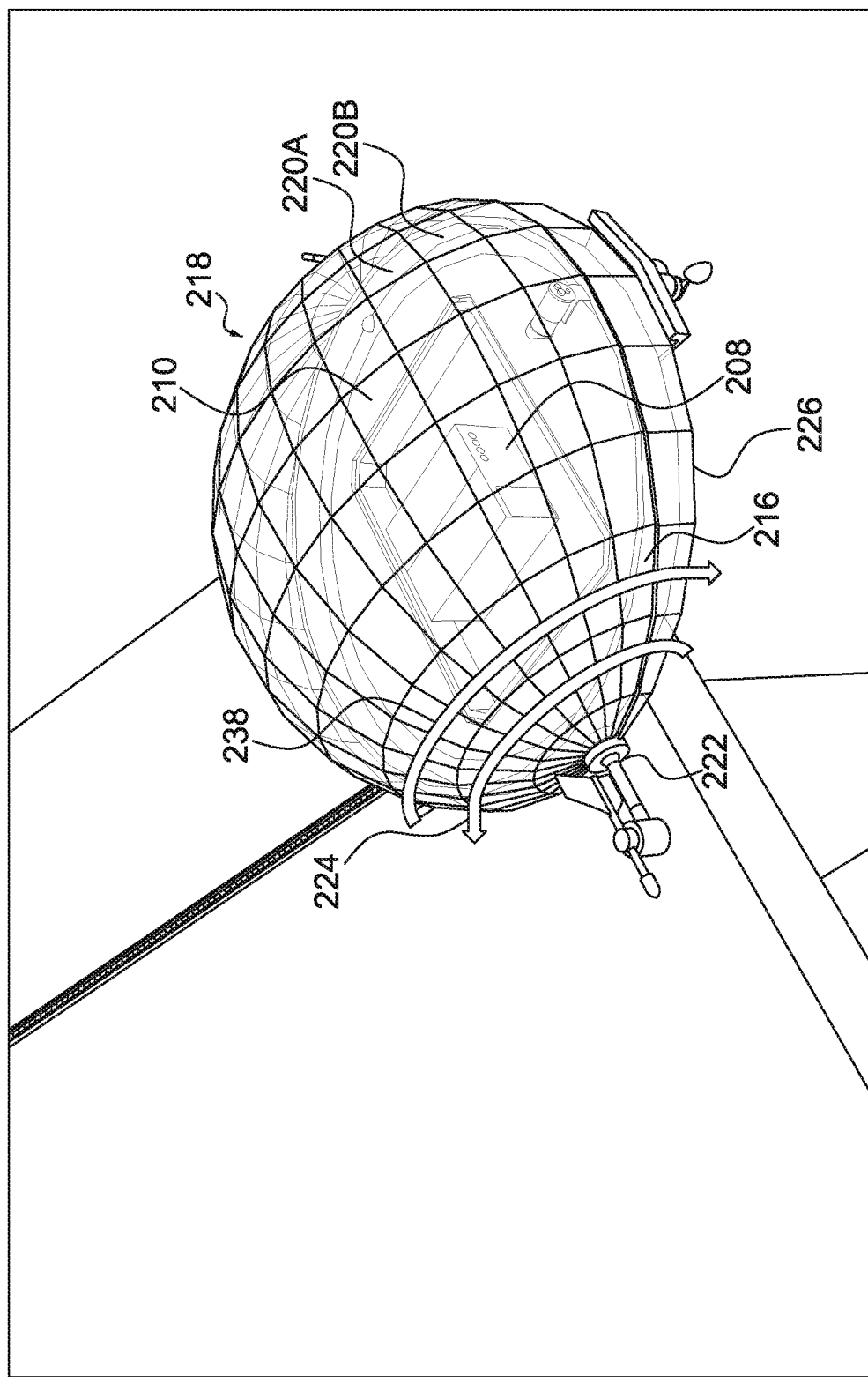

Delivery platform 200 may comprise cover 218. Cover 218 may be retractable so as not to obstruct delivery of a parcel by a UAV. As illustrated, cover 218 is in a retracted position. Cover 218 may be comprised of segments, such as segments 220A and 220B, that stack together when cover 218 is in the retracted position. In a covered position, the segments may extend end to end. FIG. 4 shows an example of cover 218 in the covered position having segments 220A and 220B in the end-to-end configuration. In the end-to-end configuration, the segments cover the top of delivery platform 200 to protect parcel 208 from external conditions, such as weather, while the parcel is on the delivery surface 210. Cover 218 may be deployed from the retracted position, such as that shown in FIG. 3, to the covered position, such as that shown in FIG. 4 by rotating about pivot 222. This rotation is illustrated as in FIG. 4 as directional arrow 224. When cover 218 is in the covered position, outer edge 226 of cover 218 may be positioned outside outer rim 216 to limit the amount of external moisture from contacting delivery surface 210 or parcel 208.

In another embodiment, which is not illustrated, a cover may comprise a plastic or other waterproof polymer material. This may include one or more sheets of material. The material may be secured at one end to a delivery platform and to a rotatable arm at the other end. The cover material may be deployed by rotating the arm over the top of the delivery platform, thereby covering the platform with the cover material.

Delivery platforms, such as delivery platform 200 may include climate controls, for example, controls that regulate the temperature and humidity within delivery platform 200. In such cases, parcels that require particular temperature ranges or moisture conditions can be delivered using UAVs. This is particularly helpful when delivering medicine— allowing medicine to be delivered and held until a person retrieves it, or to be stored for a period of time prior to being picked up by a UAV. To do so, delivery platform 200 further comprises a compressor, not shown. The compressor removes heat from within a contained area of delivery platform 200, for example, an area that is formed when cover 218 is deployed. Cover 218 may comprise insulation that forms an insulated area when deployed. Delivery platform 200 may also comprise a dehumidifier, not shown, that removes moisture from within the contained area. Cover 218 can further comprise outer edge 226. When cover 218 is deployed, outer edge 226 secures into a recessed area of outer rim 216 to form a seal. In some cases, outer edge 226 forms a seal by contacting outer rim 216 of cover 218. This is just one example, and others include outer rim 216 of cover contacting outer edge 226 an inside part of outer edge 226, on an outside part of outer edge 226, or by directly contacting a surface of delivery platform 200 when deployed, and can form a seal at each of these locations.

With reference back to FIG. 3, delivery platform 200 may comprise one or more sensors. For example, some sensors include those illustrated on anemometer 228, wind vane 230, and camera 232. While not illustrated, delivery surface 210 may include a scale to determine weight of parcels that are placed on delivery surface 210. Each of these sensors may determine information and communicate this information to a UAV delivering a parcel. Wireless communication may be facilitated by antenna 236, which may be used with any of the communication methods previously discussed, such as Wi-Fi. As an example, anemometer 228 may collect wind speed, while wind vane 230 may collect wind direction. This may be communicated to a UAV during delivery of a parcel to assist in guiding the UAV so that the parcel may be released or retrieved from the delivery surface 210.

Additionally, delivery platform 200 may have an associated waypoint identification. The waypoint identification may guide the UAV to delivery platform 200 using a satellite positioning system, such as the Global Positioning System (GPS).

Camera 232 may be any type of camera known in the art. It may be positioned to detect the presence of a parcel, such as parcel 208, on delivery surface 210. Camera 232 may also be used to determine live images of delivery platform 200 that are communicated to a UAV delivering a parcel to guide the UAV during release or retrieval. Camera 232 may further be used to detect machine-readable indicia, such as labels, that are on the parcel. Camera 232, or another camera associated with delivery platform 200, may point in an upward direction to collect images as the UAV approaches. These images can provide positioning information to the UAV during the approach by transmitting this back to the UAV. This helps increase accuracy when delivering the parcel.

Figure 5:
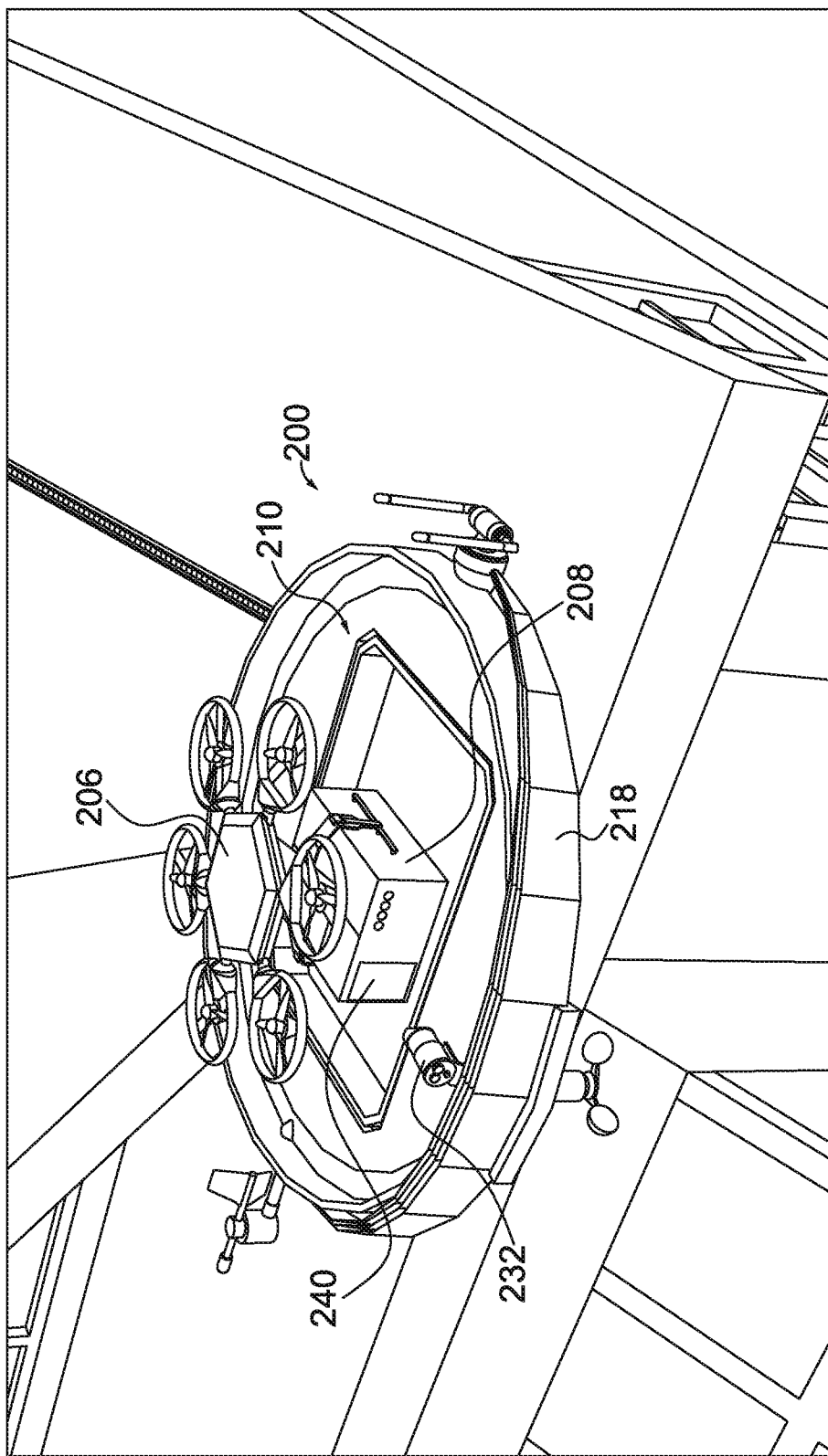

The various sensors may be utilized to deploy cover 218 from the retracted position to the covered position. Looking to FIG. 5, as an example, parcel 208 may be delivered by UAV 206. As previously described, this may include release of parcel 208 at delivery platform 200 or pick up of parcel 208 at delivery platform 200. When parcel 208 is released at delivery platform 200, camera 232 may detect that parcel 208 is present at delivery surface 210. Based on detecting that parcel 208 is present on delivery surface 210, cover 218 may be deployed from the retracted position, as shown in FIG. 5, to the covered position, as shown in FIG. 4. Other methods for detecting the presence of parcel 208 on delivery surface 210 may be used to determine when to deploy cover 218. For example, an indication that parcel 208 has been delivered may be received from a delivery service or UAV 206. Other sensors, such as a scale that determines a force applied to delivery surface 210, may be used in addition to or in lieu of camera 232.

In another example, UAV 206 may be approaching delivery platform 200 having parcel 208. Delivery platform 200 may receive an indication from UAV 206 that UAV 206 intends to release parcel 208 on delivery surface 210. In response to the indication from UAV 206, delivery platform 200 may determine whether cover 218 is in the retracted position or in the covered position. If cover 218 is in the covered position, as in FIG. 4, then delivery platform 200 may move cover 218 from the covered position to the retracted position, shown in FIG. 5, by rotating pivot 222 in the direction indicated by directional arrow 238.

With continued reference to FIGS. 3-5, the various sensors may be used to determine information about a parcel 208. For instance, the scale associated with delivery surface 210 may be used to determine a weight of parcel 208, which may be used to determine the type of UAV needed to retrieve parcel 208, as some delivery UAVs will have a greater payload capacity than others. Further, camera 232 may be used to detect an image machine-readable indicia 240, from which delivery information may be determined, such as a delivery address.

Figure 6:
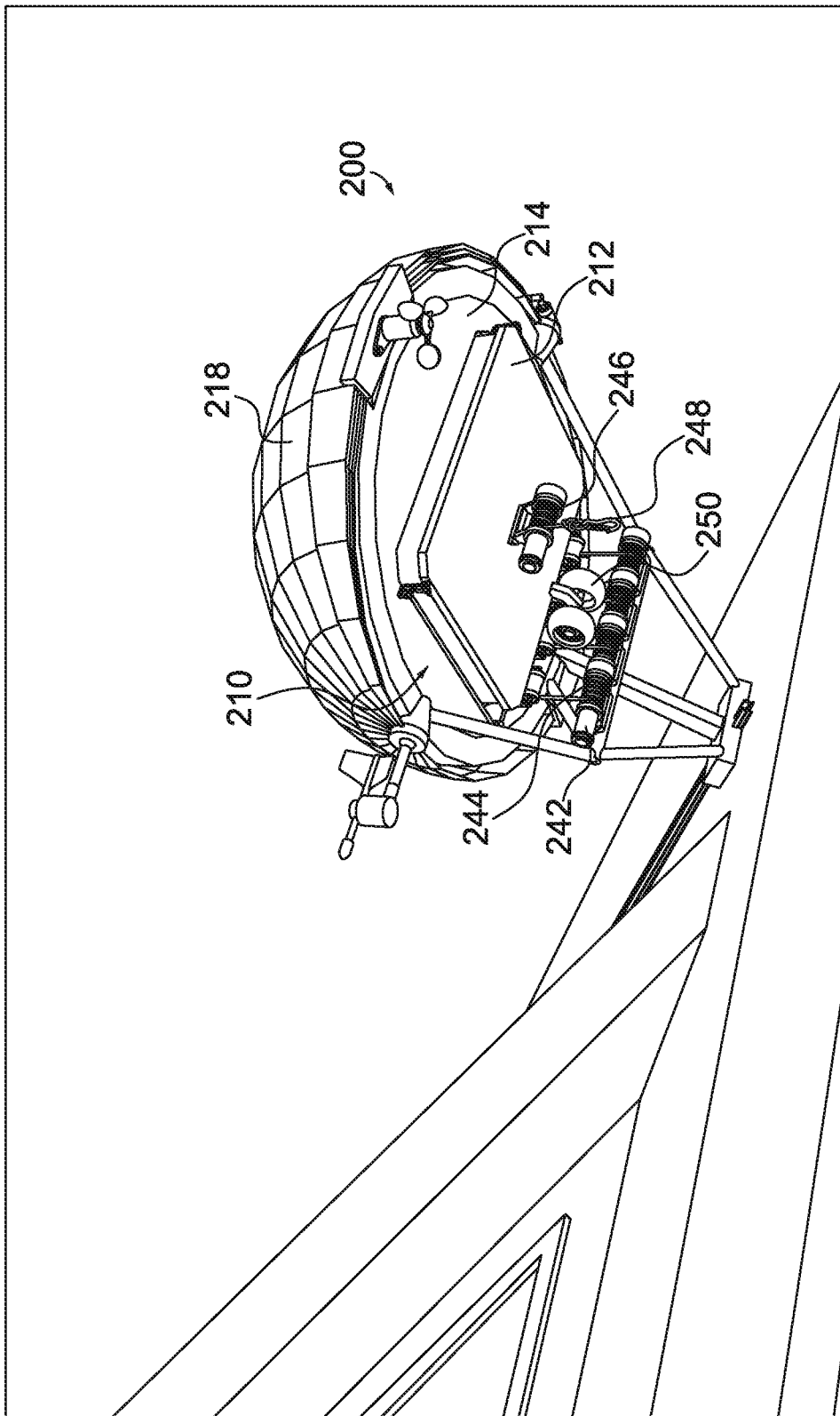
FIGS. 6-7 are bottom views of the delivery platform of FIG. 2, in accordance with embodiments described herein.
Figure 7:
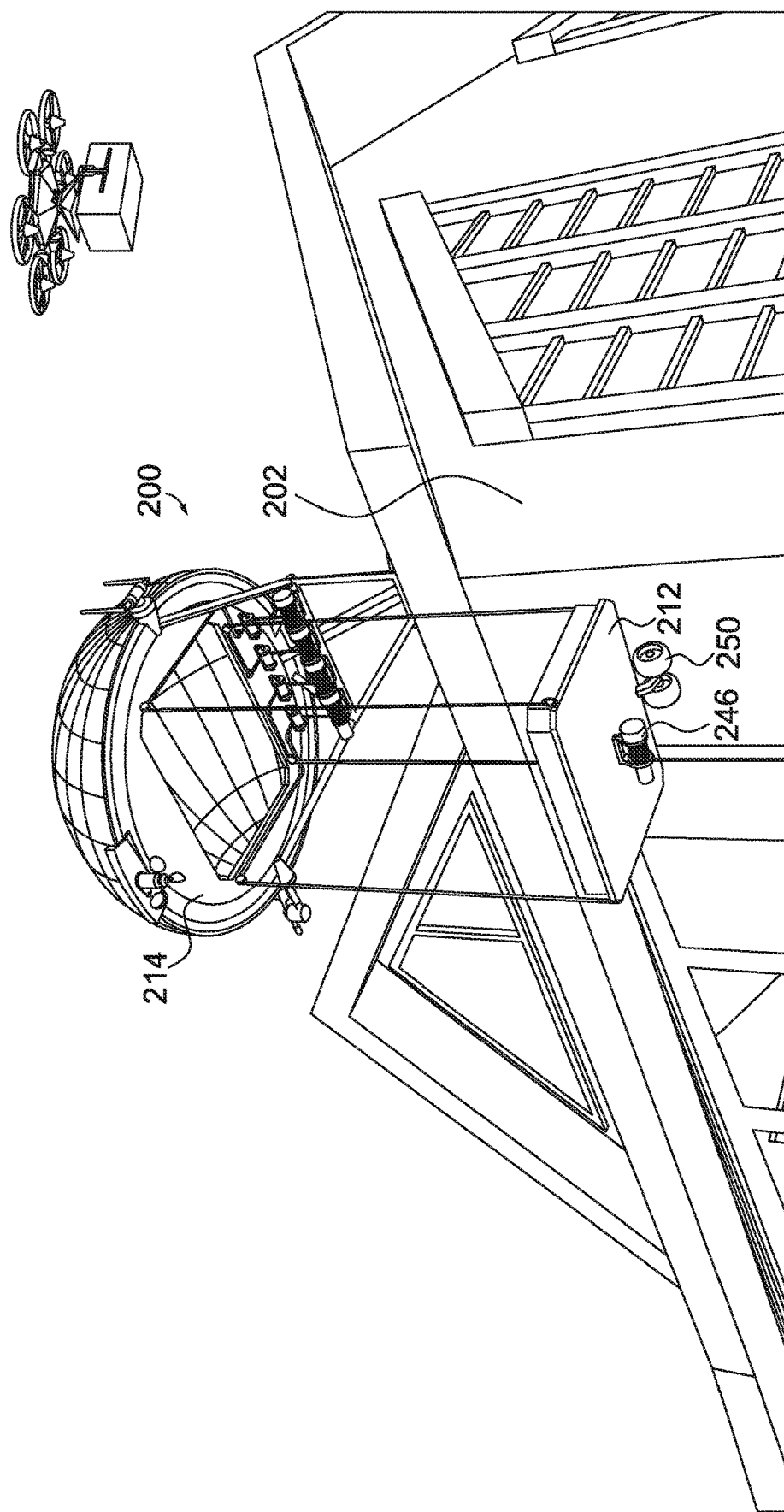

Turning now to FIGS. 6-7, a bottom view of delivery platform 200 when cover 218 is in the covered position, is provided. Delivery platform 200 comprises delivery surface 210, which includes elevating surface 212 and stationary surface 214. Elevating surface 212 may be raised and lowered from an elevated position to a lowered position by lift 242. Lift 242 may comprise one or more lift cables 244. The lift cables 244 may be retracted or extended by lift 242 so that elevating surface 212 moves upward to the elevated position or downward to the lowered position. FIG. 6 illustrates elevating surface 212 in the elevated position, while FIG. 7 illustrates elevating surface 212 in transition from the elevated position to the lowered position. In some cases, as a parcel is lowered by elevating surface 212, a battery associated with delivery platform 200 may be charged by a generator that is turned based on the gravity-assisted lowering of elevating surface 212 and the parcel. The energy stored in the battery during the lowering with the parcel may be used to raise the elevating platform to the raised position.

Figure 8:
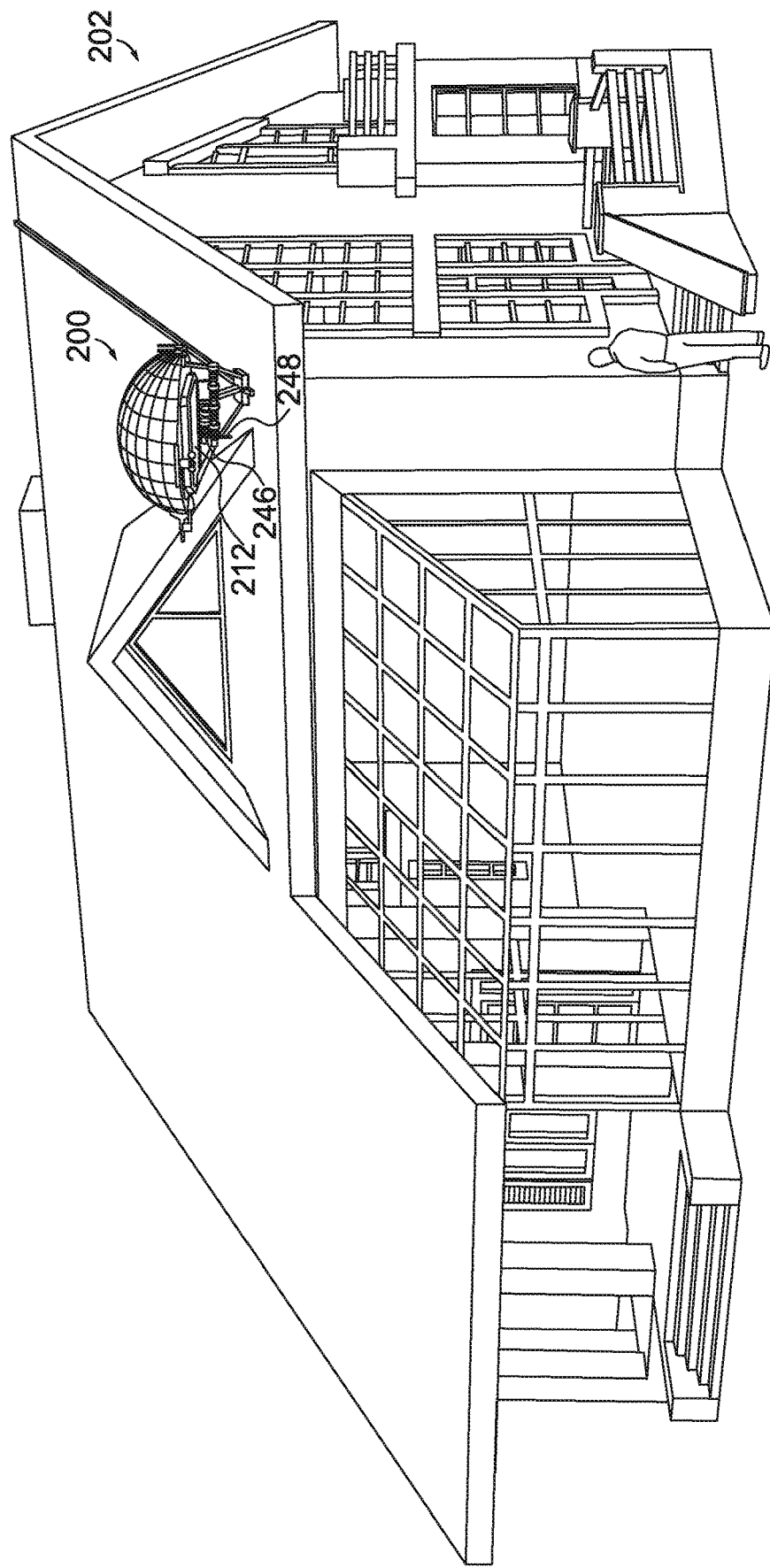
FIGS. 8-9 illustrate an example use-case scenario of the delivery platform of FIG. 2, in accordance with embodiments described herein.
Figure 9:
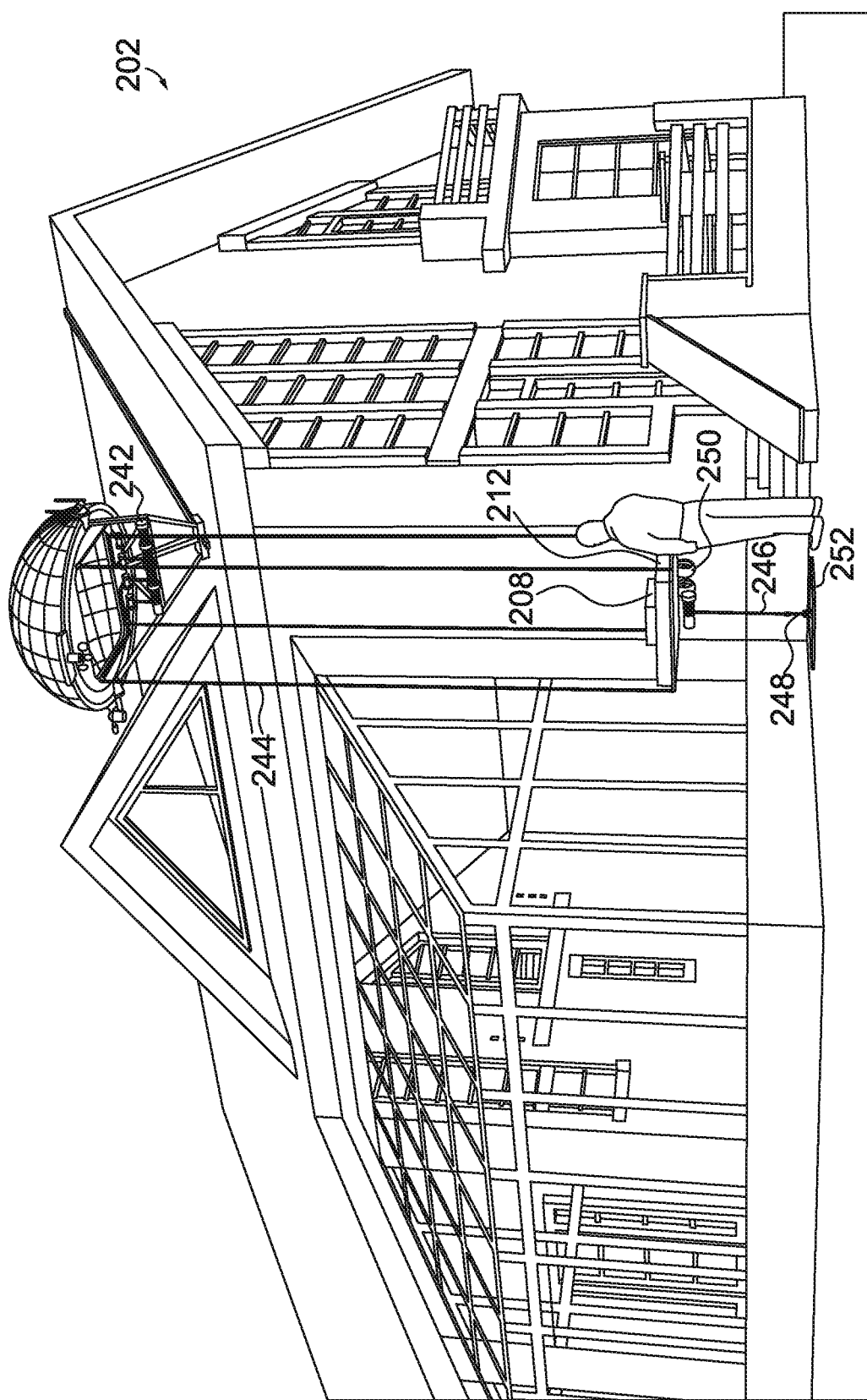

To facilitate raising and lowering elevating surface 212, delivery platform 200 may comprise guide cable 246 and one or more guide wheels 250. Guide cable 246 may comprise guide fastener 248. Guide cable 246 may be coupled to the bottom of elevating surface 212, and may be raised and lowered independent of elevating surface 212. Guide cable 246 may be extended or retracted in a winch-like fashion. In general, guide cable 246 may be used to facilitate raising and lowering of elevating surface 212. With brief reference to FIGS. 8-9, which show another example use-case scenario for delivery platform 200, the figures illustrate an example use of guide cable 246. FIG. 8 illustrates guide cable 246 in the retracted position. Guide cable 246 may be independently lowered from elevating surface 212 to a lowered position near the ground by extending guide cable 246. In some cases, guide cable 246 may be fastened to support 252 on or near the ground using guide fastener 248, as illustrated in FIG. 9. As elevating surface 212 is lowered by lift 242, guide cable 246 may be retracted to keep tension along guide cable 246. By retracting guide cable 246 while lowering elevating surface 212, elevating surface 212 is less likely to sway about lift cables 244, reducing the risk of elevating surface 212 contacting structure 202 and reducing the risk that parcel 208 shifts when raising or lowering elevating surface 212. This process may be similar for raising elevating surface 212 to its elevated position. For example, as elevating surface is raised by lift 242, guide cable 246 may be extended to keep tension on guide cable 246 and one or more lift cables, such as lift cable 244.

Guide wheels 250 may also serve to facilitate the safe raising and lowering of elevating surface 212. Turning back to FIG. 7, guide wheels 250 may be fixed to the bottom of elevating surface 212, and they may extend outward and away from elevating surface 212 in the direction of structure 202. Guide wheels 250 may contact a sidewall of structure 202 as elevating surface 212 is raised and lowered. This stabilizes elevating surface 212 while it is being raised and lowered, making it less likely to sway.

Figure 10:
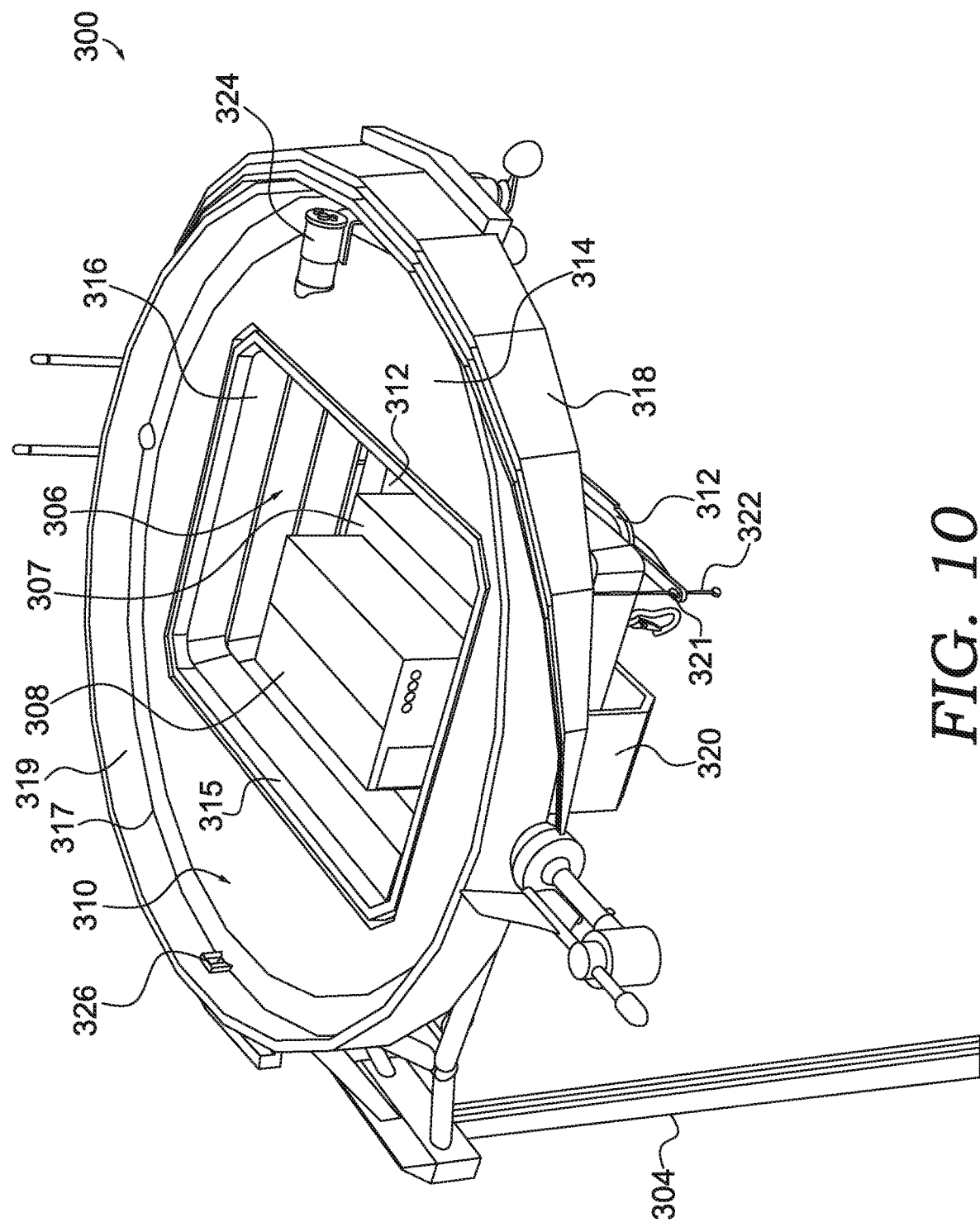
FIGS. 10-12 illustrate another example embodiment of a delivery platform in accordance with embodiments described herein.
Figure 11:
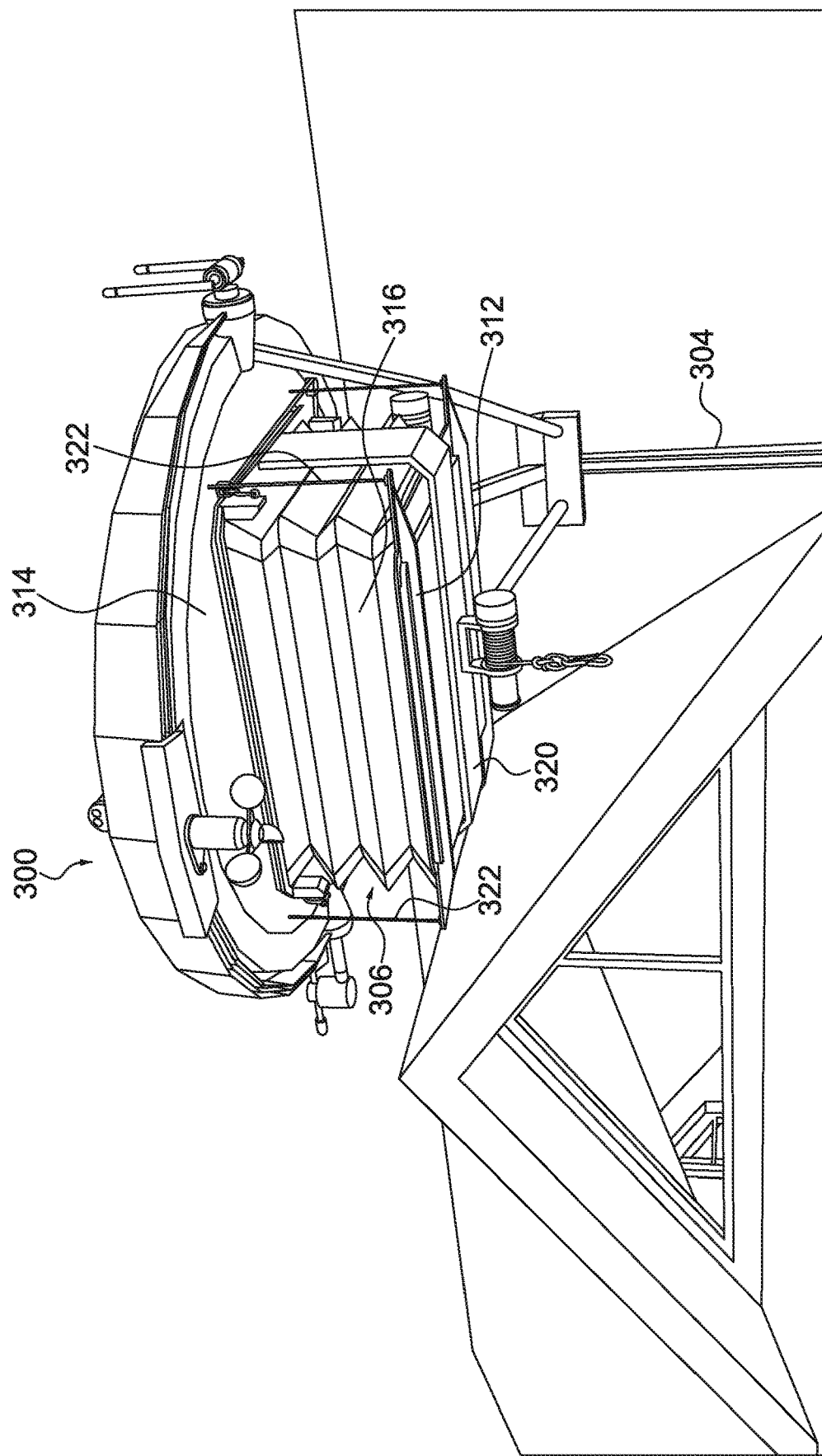

As indicated above, delivery platform 200 is only an example of one embodiment of a delivery platform. Another example embodiment of a delivery platform is described with reference to FIGS. 10-14. Reference is first made to FIG. 10, which provides a top view of delivery platform 300, and to FIG. 11, which provides a bottom view of delivery platform 300. Here, delivery platform 300 is movably coupled to vertical track system 304, where delivery platform 300 and vertical track system 304 are together referred to as a "delivery system." Delivery platform 300 may comprise delivery surface 310, which may include elevating surface 312 and stationary surface 314. In some cases, delivery platform 300 may only comprise elevating surface 312, or it may have only a portion as elevating surface 312 and further comprise a portion as stationary surface 314. Stationary surface 314 can comprise stationary edge 317. Outer rim 319 can extend upward and away from stationary edge 317

Delivery platform 300 may also comprise chamber 306. Chamber 306 may include a bottom portion that includes elevating surface 312 and top rim 315. Chamber 306 may include sidewall 316 extending from elevating surface 312 to top rim 315. Top rim 315 may be horizontally aligned with stationary surface 314. In cases where there is no stationary surface, top rim 315 may include an outer edge of delivery surface 310, not illustrated. Sidewall 316 may be expandable, such as in an accordion configuration. Put another way, sidewall 316 may be able to expand and contract vertically between top rim 315 and elevating surface 312 as the distance between top rim 315 and elevating surface 312 increases or decreases. In this way, chamber 306 may be a variable volume chamber. In some cases, elevating surface 312 may be detached from sidewall 316.

Chamber 306 may be utilized to store one or more parcels, such as parcel 308 (interchangeably referred to as second parcel 308). Chamber 306 may also allow for delivery of multiple parcels. Since chamber 306 can store parcels vertically, e.g., one on top of the other, multiple deliveries may be made to delivery platform 300. In this way, delivery platform 300 does not have to be made horizontally larger, such as having to make the size of delivery surface 310 of delivery platform 300 larger to accommodate multiple parcels. This allows for delivery platform 300 to be placed at a greater number of delivery locations, including those where a larger delivery platform may be challenging to install. Chamber 306 further allows for multiple deliveries by allowing parcels to accumulate prior to retrieving the parcels from the platform, thus possibly reducing the need to retrieve a parcel after each delivery.

To store parcels in chamber 306, a first parcel 307 may be delivered to delivery platform 300 and placed on elevating surface 312. For example, first parcel 307 may be placed on elevating surface 312 by a UAV. In response to first parcel 307 being placed on elevating surface 312, elevating surface 312 may be lowered. Elevating surface 312 may be lowered using one or more threaded shafts, such as threaded shaft 322, illustrated as extending below stationary surface 314. As an example, elevating surface 312 may include one or more threaded portions in contact with the one or more threaded shafts, such as threaded portion 321 is illustrated in contact with threaded shaft 322. Threaded shaft 322 may engage a motorized unit, not illustrated, that turns threaded shaft 322 in either a clockwise direction or a counter-clockwise direction. In doing so, elevating surface 312 may be raised and lowered. In some cases, chamber support arm 320 may be affixed to stationary surface 314 and extend below elevating surface 312 to provide support for elevating surface 312.

Continuing with this example, as elevating surface 312 is lowered, the top of first parcel 307 is lowered as well. At some point the top of first parcel 307 may become horizontally aligned with stationary surface 314, and thus, first parcel 307 is stored in chamber 306. When the top of parcel 307 is horizontally aligned with stationary surface 314, delivery platform 300 may be ready to accept another parcel, such as second parcel 308, for delivery. In this way, parcel 308 may be placed on top of first parcel 307 and the process repeated. That is, elevating surface 212 may be lowered so that second parcel 308 is stored in chamber 306 until the top of second parcel 308 is horizontally aligned with stationary surface 314.

To determine when the top of a parcel, such as first parcel 307 or second parcel 308, is horizontally aligned with stationary surface 314, delivery platform 300 may comprise emitter 324, such as a laser, and detector 326, such as a photocell. While the present disclosure is described with reference to a laser and a detector, it is contemplated that any combination of an emitter—detector pair can detect an object between the emitter—detector pair may be used. In this example, emitter 324 may emit a source of light that may be detected by detector 326. Thus, when a parcel is between emitter 324 and detector 326, detector 326 will not detect the light. As the parcel is lowered, the top of the parcel may drop below the beam of light emitted from emitter 324, allowing detector 326 to detect the light. At that point, delivery platform 300 may stop lowering elevating surface 312 and the parcel is stored in chamber 306.

Figure 12:
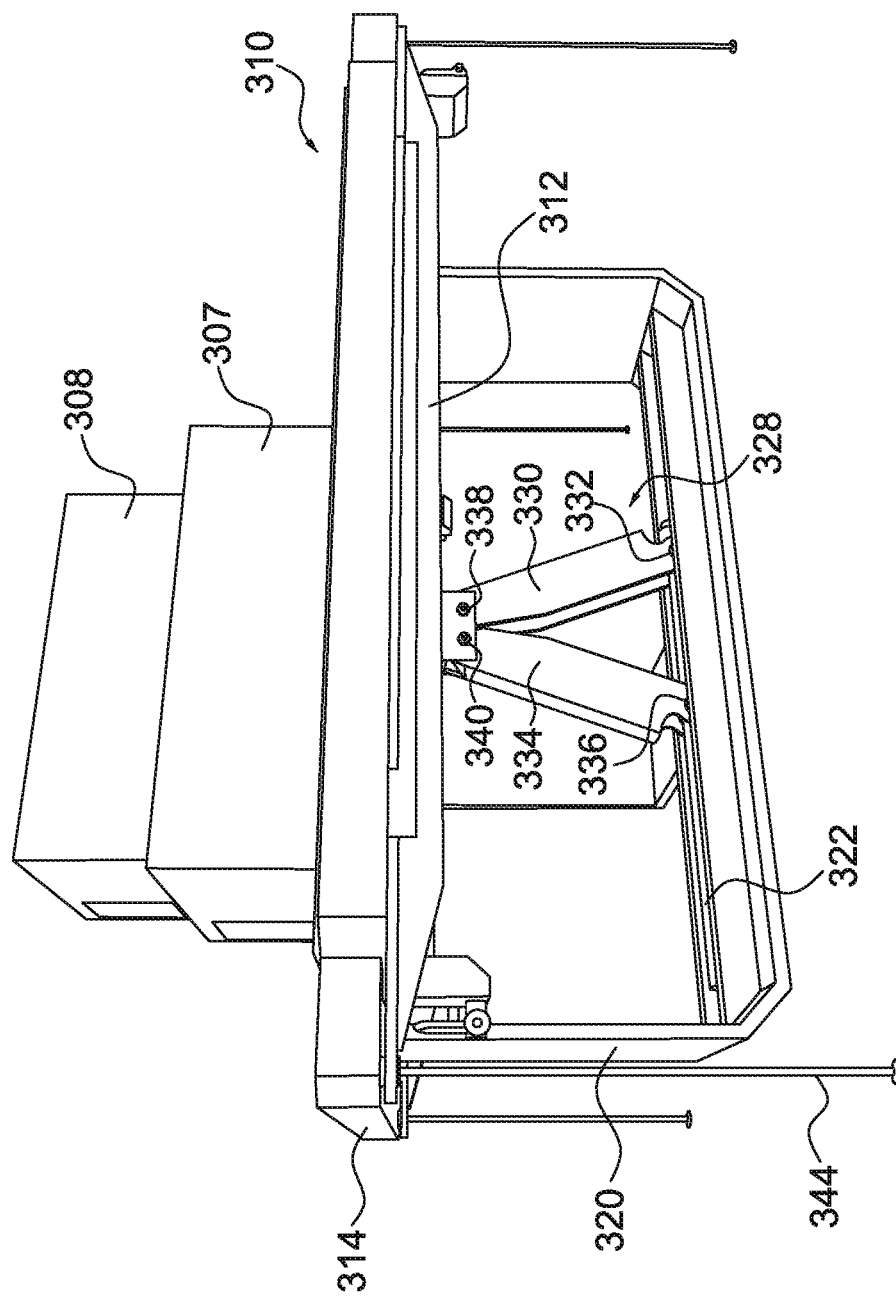

Another configuration for lowering and raising elevating surface 312 is illustrated in FIG. 12. This configuration may be used in addition to or in lieu of the configuration described in FIGS. 10-11 that have one or more vertical threaded shafts. In the configuration provided by FIG. 12, threaded shaft 322 is used in conjunction with scissor system 328 to raise and lower elevating surface 312.

Scissor system 328 may comprise first elongated member 330 and second elongated member 334. First elongated member 330 may have a stationary end 332 that is affixed to a location on threaded shaft 322. Stationary end 332 is affixed to the location on threaded shaft 322 such that stationary end 332 does not move along threaded shaft 322 as threaded shaft 322 is rotated. First elongated member 330 may also have a first pivot joint end 338 that is opposite stationary end 332 and is pivotably attached to elevating surface 312. Scissor system 328 may further comprise second elongated member 334. Second elongated member 334 may have movable end 336 that is engaged with threaded shaft 322, such that movable end 336 moves along threaded shaft 322 when threaded shaft 322 is rotated. In this manner, a distance between stationary end 332 and movable end 336 may be increased or decreased based on the rotation of the threaded shaft 322. Further, second elongated member 334 may additionally comprise second pivot joint end 340 that is opposite movable end 336 and is pivotably attached to elevating surface 312. The distance between stationary end 332 and movable end 336 may be equal to or greater than a distance between first pivot joint end 338 and second pivot joint end 340, and the distance between first pivot joint end 338 and second pivot joint end 340 may be a fixed distance. In some cases, a portion of scissor system 328 may be affixed to chamber support arm 320, and chamber support arm 320 may be affixed to stationary surface 314. In this manner, as threaded shaft 322 is rotated, such as by using the motorized unit, elevating surface 312 is raised or lowered relative to stationary surface 314. In some embodiments, one or more guides may be used to stabilize elevating surface 312 as it is raised and lowered. For example, guide 344 may be fixed on one end to stationary surface 314 and may extend downward and away from stationary surface 314, and elevating surface 312 may be movably secured to guide 344.

Figure 13:
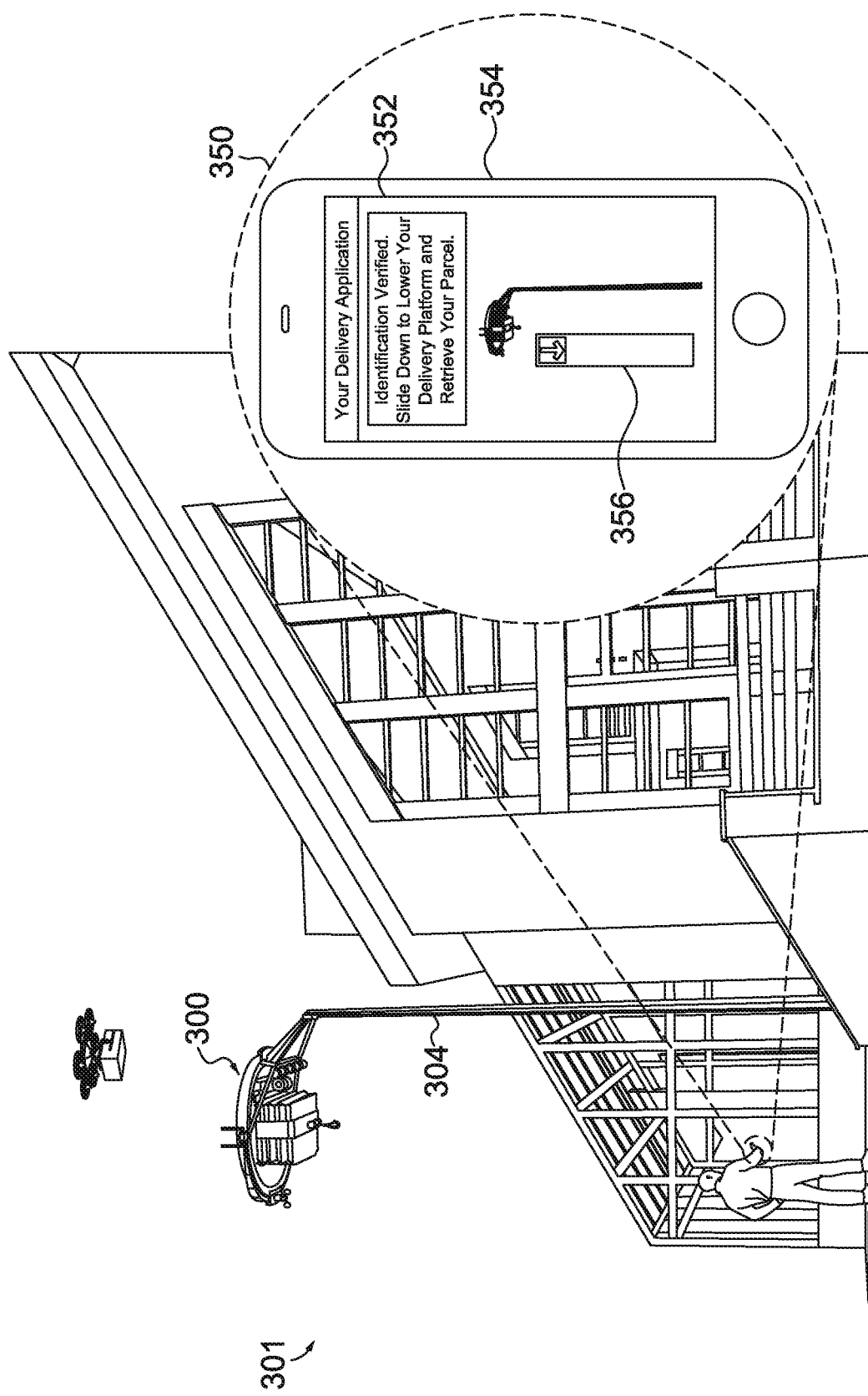
FIG. 13 illustrates an example use-case scenario for the delivery platform of FIGS. 10-12, in accordance with embodiments described herein.

With reference now to FIG. 13, which illustrates example delivery system 301, vertical track system 304 may be used to retrieve parcels from delivery platform 300 or to place parcels onto delivery platform 300 at a ground location. For example, delivery platform 300 may be movably secured to vertical track system 304. What is meant by vertical track system is a track system that raises and lowers delivery platform 300 from an elevated position, where parcels may be delivered using a UAV, to a lowered position at or near a retrieval area, such as the ground or a containment unit (discussed in more detail below). In the lowered position, parcels may be retrieved or dropped off by a person. Thus, in this embodiment, delivery platform 300 may traverse all of or a portion of a vertical height from the elevated position to the lowered position by moving vertically along vertical track system 304. This system may be used in addition to or in lieu of an elevating surface that may be raised and lowered from an elevated position to a lowered position, such as the one described above with reference to FIGS. 6-7.

Figure 41:
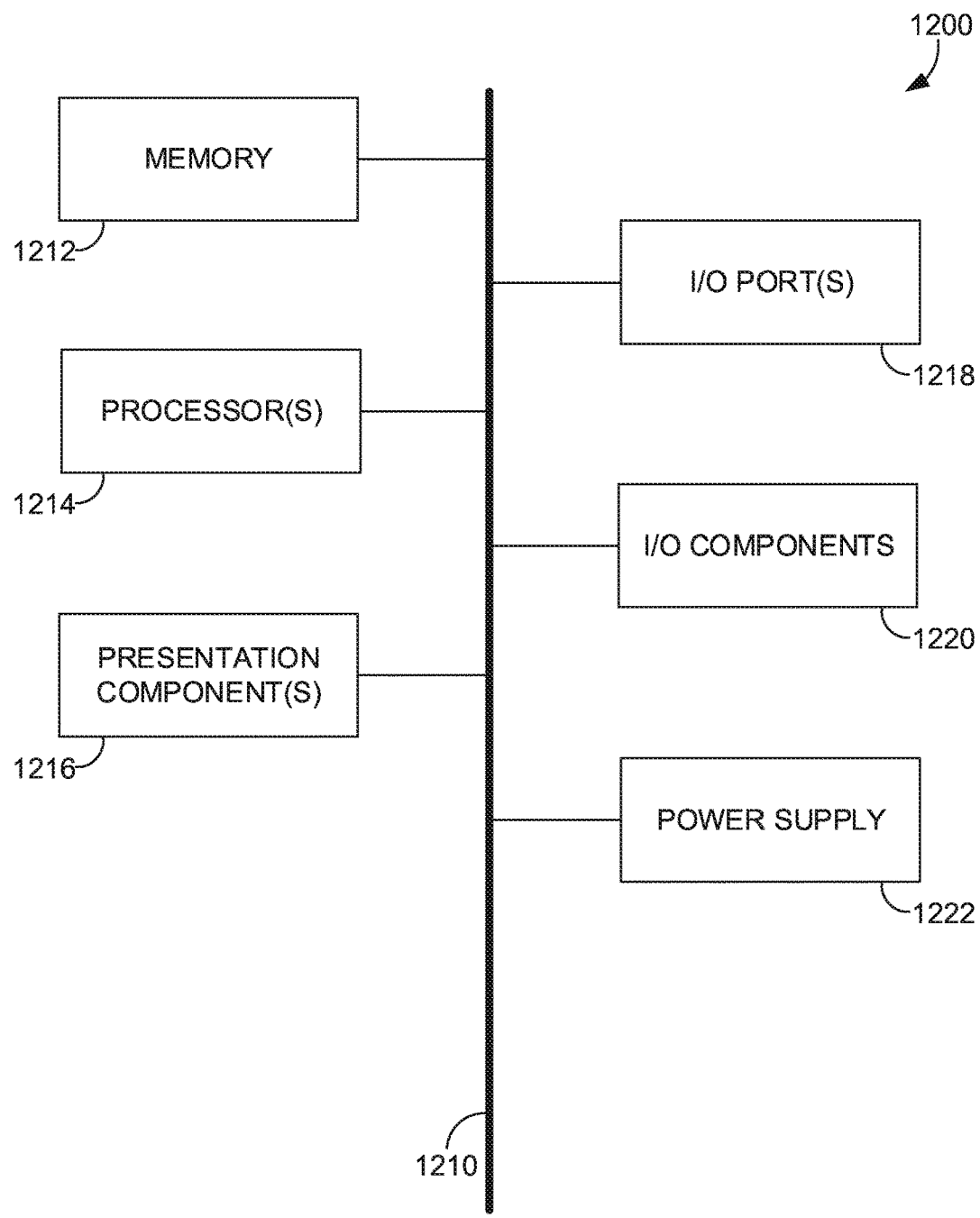
FIG. 41 illustrates an example computing device, in accordance with embodiments described herein.

As illustrated by FIG. 13, and will be further explained below, some embodiments of delivery platform 300 can be controlled using computer application 352. For example, raising and lowering delivery platform 300, or an elevating surface as described in some embodiments, may be performed using computer application 352 on user device 354, best illustrated in enlarged view 350. User device 354 can be any user device having a processor executing computer readable instructions on memory. Computing device 1200 of FIG. 41 is a suitable example. Computer application 352 may utilize security features of user device 354, such as facial identification, fingerprint identification, passcodes, etc. to verify an identity of a person attempting to retrieve a parcel, or use delivery platform 300, generally. User device 354 can receive an input, for example, at input area 356 to instruct delivery platform 300 to perform a particular action, illustrated in FIG. 13 as lowering delivery platform 300, which is just one example. Other examples include raising a delivery platform or elevating surface, requesting pick up or delivery of a parcel, deploying a cover, receiving information from sensors associated with a delivery platform, inputting a delivery location for a parcel, and the like. User device 354 may communicate to delivery platform or a carrier associated with UAVs delivering to the delivery platform using Wi-Fi or cellular service.

Figure 14:
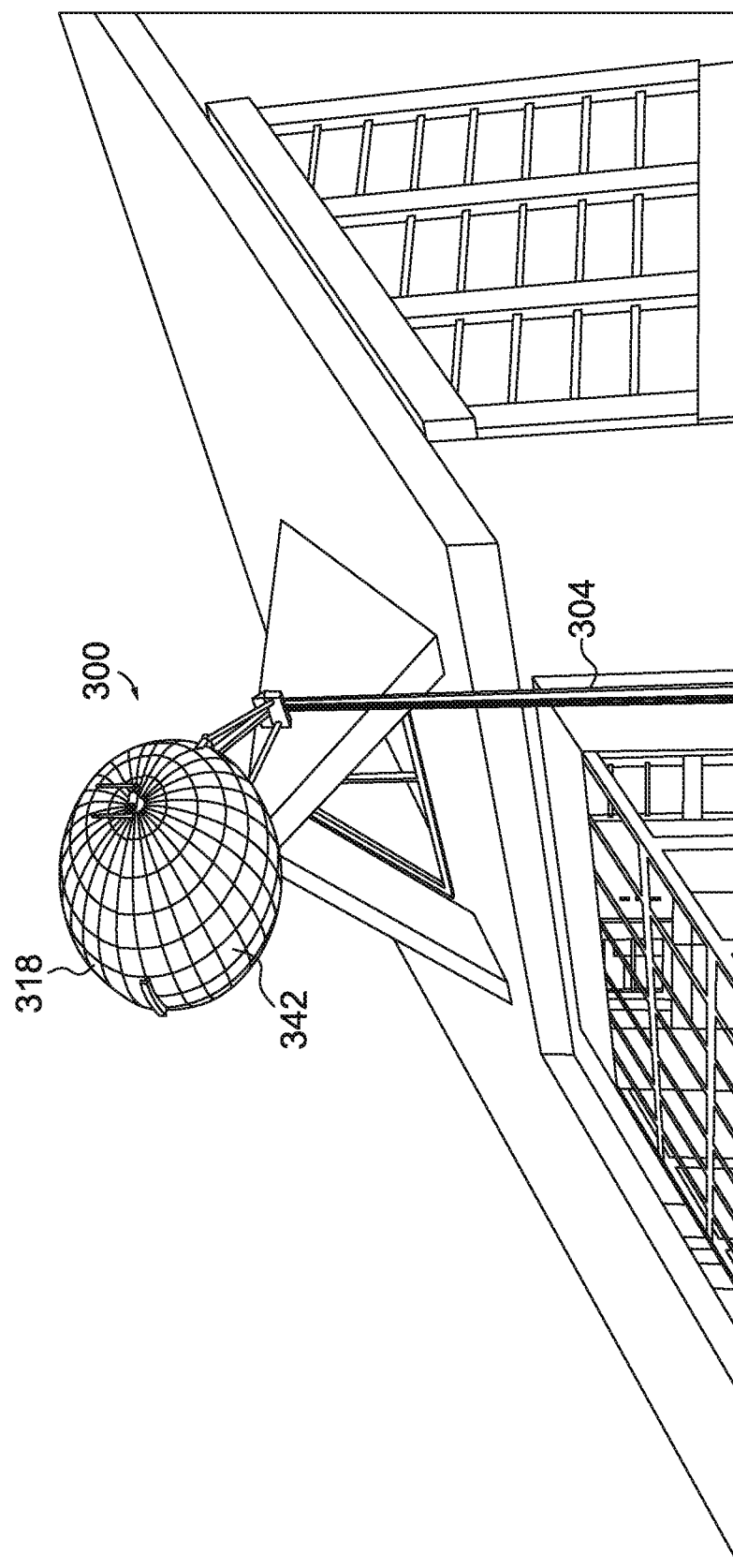
FIG. 14 illustrates an example embodiment of a cover for a delivery platform, in accordance with embodiments described herein.

With reference now to FIG. 14, in some embodiments, delivery platform 300 may comprise an upper cover 318 and a lower cover 342. For example, upper cover 318 may be deployed to cover the top of delivery platform 300, while lower cover 342 may be deployed to cover a bottom part of delivery platform 300. Each may operate in a manner similar to cover 218 described in FIG. 4. Lower cover 342 may provide additional protection to parcels on delivery platform 300. It may also provide additional protection to delivery platform 300 itself and vertical track system 304 by making delivery platform 300 more aerodynamically stable during high wind situations. Like the other components described with reference to delivery platform 300 lower cover 342 may be used with any of the embodiments of the technology described herein.

Figure 15:
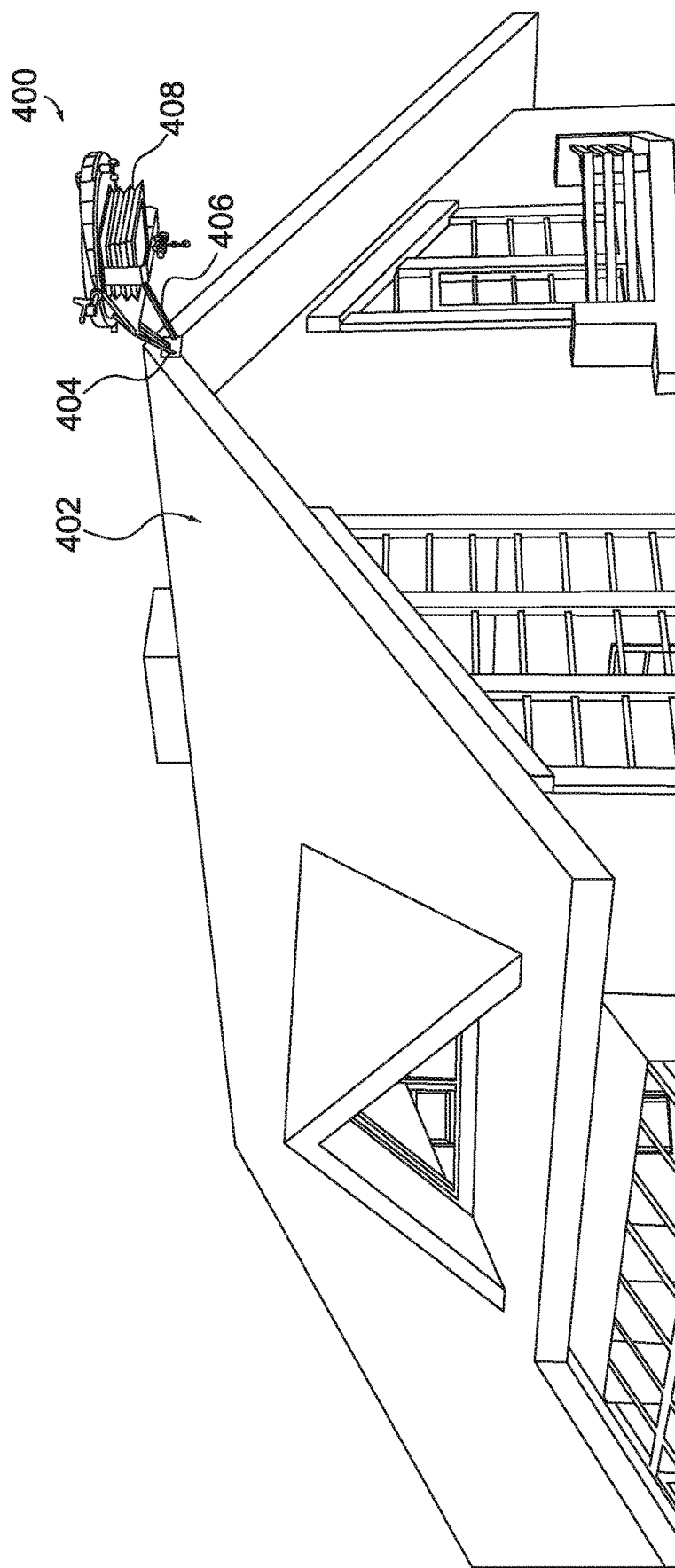
FIG. 15 illustrates another example embodiment of a delivery platform, in accordance with embodiments described herein.
Figure 16:
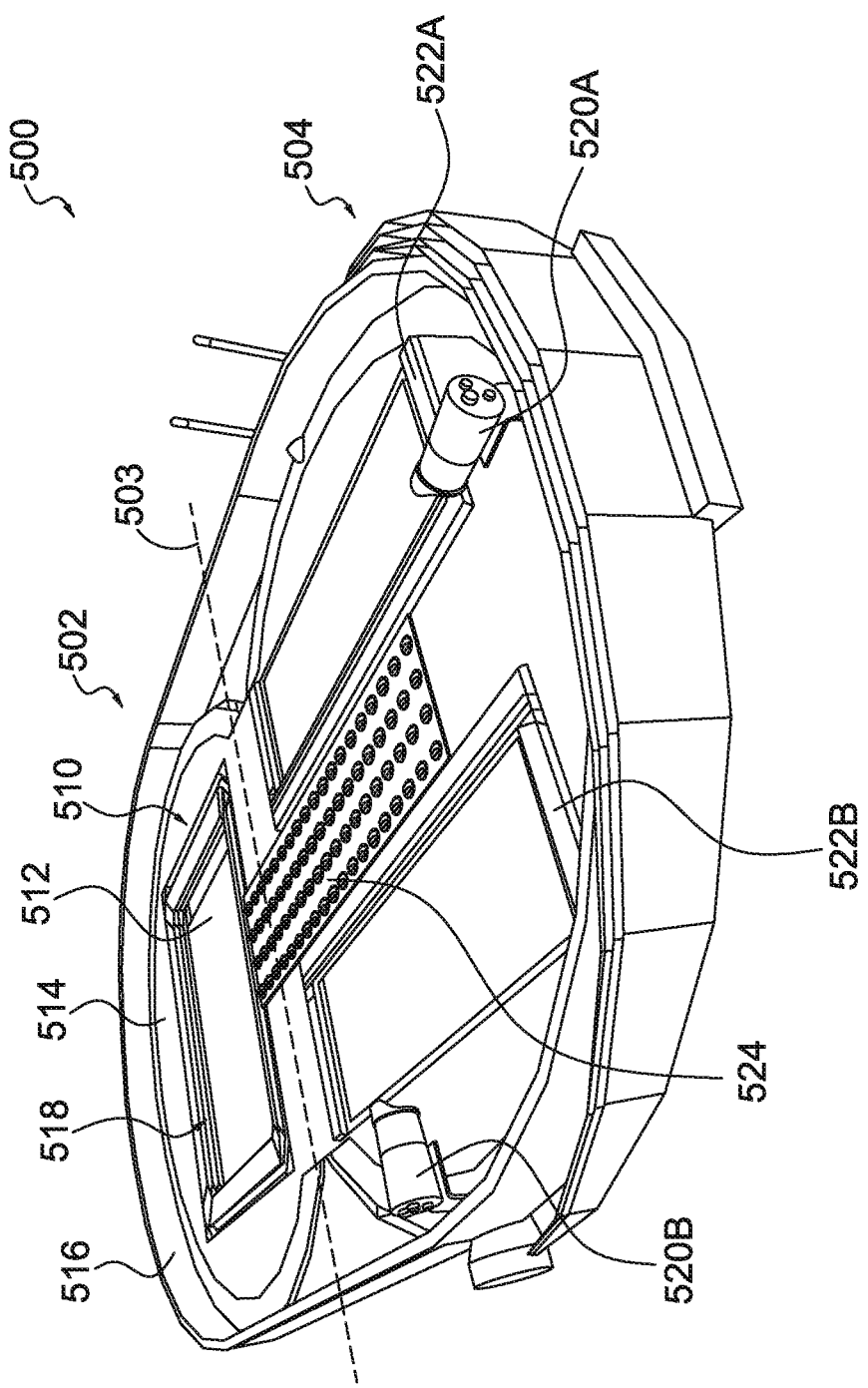
FIGS. 16-21 illustrate another example embodiment of a delivery platform and an example method for utilizing the delivery platform to secure a parcel to a UAV, in accordance with embodiments described herein.

In reference now to FIG. 15, another embodiment of a delivery platform is provided. Here, delivery platform 400 is secured directly to structure 402, and does not use a track system. This embodiment provides additional stability for delivery platform 400, as delivery platform 400 comprises one or more arms, such as arm 406, that extend away from delivery platform 400 and are mounted directly to structure 402 using mount 404. In this example embodiment, delivery platform 400 comprises variable volume chamber 408 to store multiple parcels. To raise and lower the parcels, delivery platform 400 may use an elevating surface having a lift, which are not illustrated.

Another example embodiment of a delivery platform is provided in FIGS. 16-21, which illustrates delivery platform 500 having securing area 504 to facilitate UAV pick up of a parcel. FIGS. 16-21 illustrate an example series of figures that illustrate a method for securing a parcel to a UAV to facilitate the UAV picking up the parcel. As illustrated, delivery platform 500 comprises delivery area 502 and securing area 504. Delivery platform 500 is illustrated having delivery area 502 and securing area 504 as separate areas that are separated by theoretical dashed line 503. In some embodiments, it may be difficult to distinguish delivery area 502 from securing area 504. In some cases, delivery area 502 and securing area 504 may comprise the same area. That is, the various components described with respect to each of delivery area 502 and securing area 504 may be found in other arrangements where sometimes a particular component may be found on delivery area 502, while in other embodiments, it may be located on securing area 504. Although this applies to all components described with respect to these figures, some specific examples are discussed in more detail. In some cases, delivery platform 500 may comprise a set of one or more rollers 524 that may move a parcel from delivery area 502 to securing area 504. Delivery area 502 and securing area 504 are illustrated as extending to a stationary edge, wherein outer rim 516 extends upward and away from the stationary edge.

As noted, delivery platform 500 may comprise delivery area 502 and securing area 504. Delivery area 502 may comprise delivery surface 510. Delivery surface 510 may comprise elevating surface 512 and stationary surface 514. Like other embodiments previously described, in some cases, elevating surface 512 may comprise all of or only a portion of delivery surface 510. In the embodiment illustrated as delivery platform 500, delivery area 502 comprises chamber 518, which may be a variable volume chamber, such as those previously described. In addition to or in lieu of chamber 518, elevating surface 512 may be lowered and raised by a lift system, not illustrated.

Additionally, delivery platform 500 is illustrated as having securing area 504. In general, securing area 504 may facilitate pick up of a parcel, such as parcel 508 shown in FIG. 17, by a UAV. Continuing with FIG. 16, securing area 504 may comprise one or more securing arms, such as securing arms 522A and 522B, described in more detail below. Securing area 504 may also comprise one or more sensors 520A and 520B. Sensors 520A and 520B may be embodied as an emitter, such as a laser; as a camera; or any other sensor that may detect the presence or location of an object. As noted above, sensors 520A and 520B are shown associated with securing area 504, however, one or more may also be located in delivery area 502, for example to detect when a top of a parcel is horizontally aligned with elevating surface 512 or for detecting machine-readable indicia on the parcel.

Figure 17:
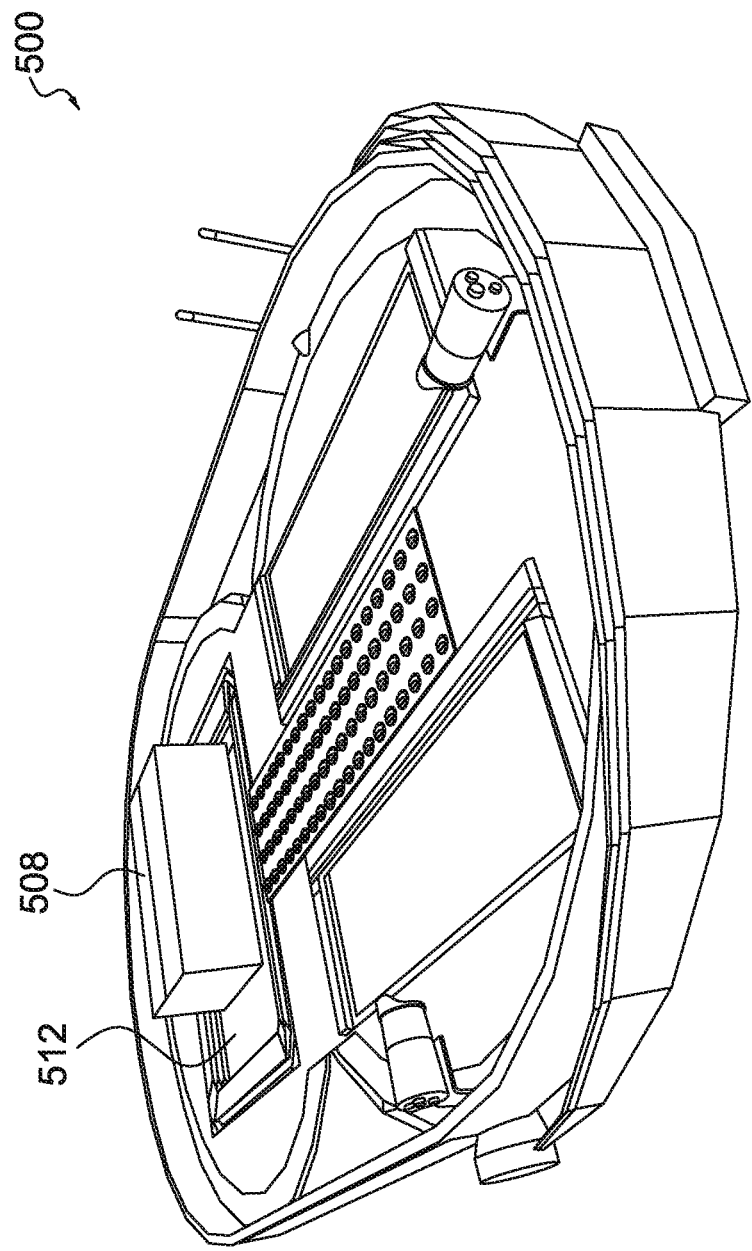

To describe how delivery platform 500 may facilitate pick up of a parcel, such as parcel 508, reference is now made to FIGS. 17-21. In these figures, sensors 520A and 520B have been removed for convenience in describing the technology. In FIG. 17, parcel 508 is atop elevating surface 512. Parcel 508 may arrive at elevating surface 512 by methods previously described. For example, elevating surface 512 may be lowered to a lowered position at or near the ground. There, a person may have placed parcel 508 on elevating surface 512, intending parcel 508 to be picked up for delivery by a UAV. Elevating surface 512 may be raised to an elevated position, as shown in FIG. 17. In another example, delivery platform 500 may have been lowered to a lowered position, such as by using a vertical track system, so that parcel 508 can be placed on elevating surface 512, or more generally, onto delivery surface 510. In some cases, a combination of these methods, or other methods described herein, may be used.

Figure 18:
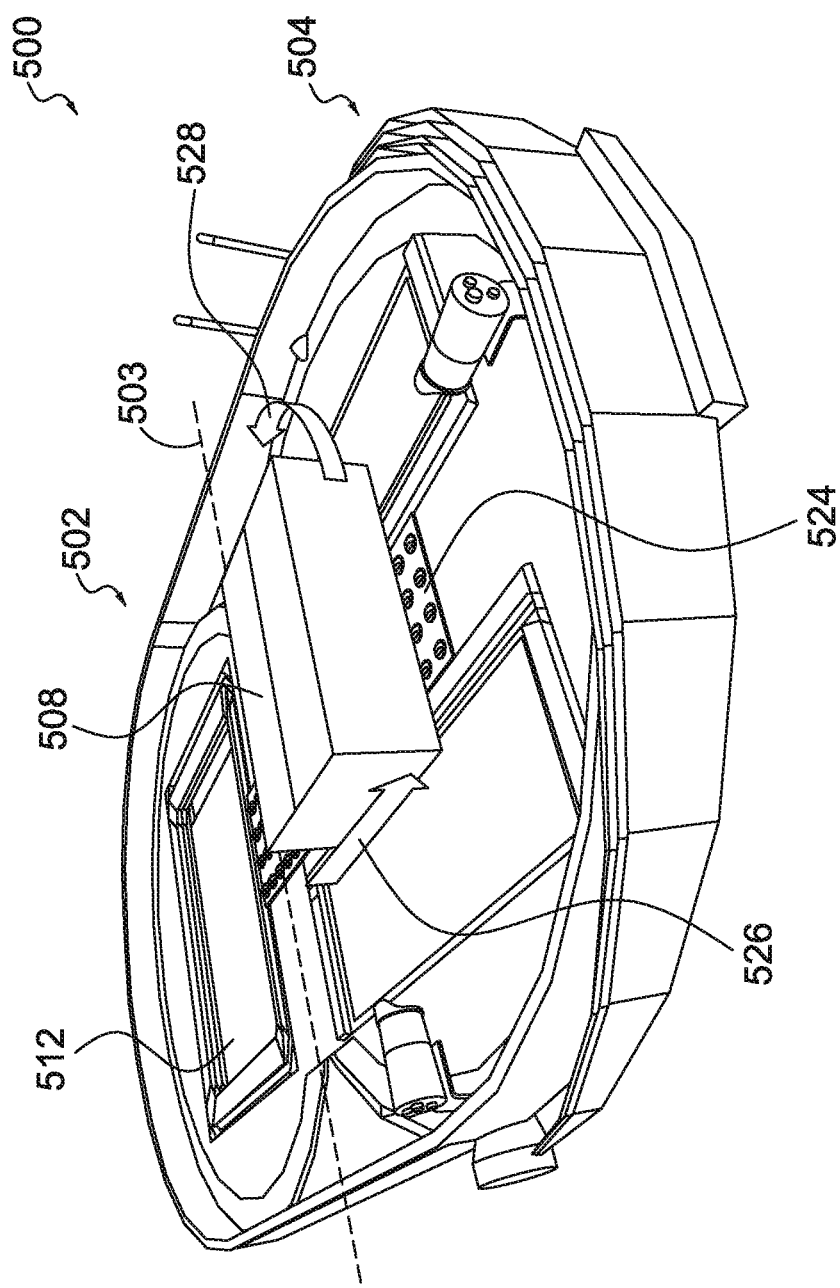

As shown in FIG. 18, parcel 508 may be moved from delivery area 502 to securing area 504. This is illustrated in FIG. 18 as parcel 508 moving in the direction of directional arrow 526 and crossing dashed line 503, which illustrates the theoretical "boundary" between delivery area 502 and securing area 504. To move parcel 508 from delivery area 502 to securing area 504, delivery platform 500 may include a set of rollers 524 that traverse from delivery area 502 to securing area 504. Rollers 524 may be multidirectional rollers, meaning that rollers 524 may be able to rotate in any direction. Rollers 524 may be independently movable, such as one roller rolling in one direction, while another roller rolls in another direction, while yet another roller does not move. In this way, the orientation of parcel 508 may also be adjusted by rollers 524, as illustrated by directional arrow 526. As such, parcel 508 may be maneuvered by rollers 524 to orient parcel 508 to a position where a UAV may pick up parcel 508.

Figure 19:
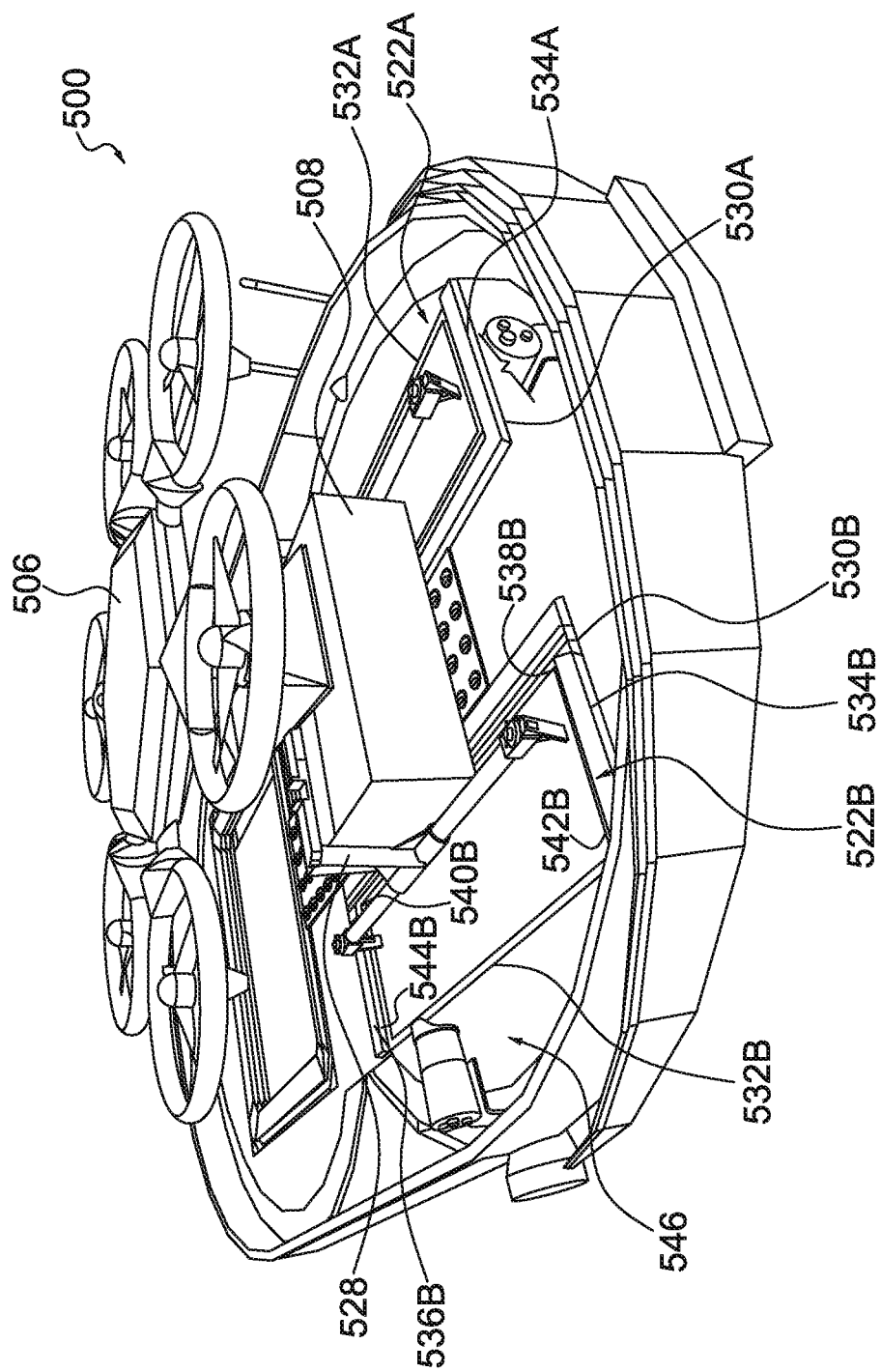
Figure 20:
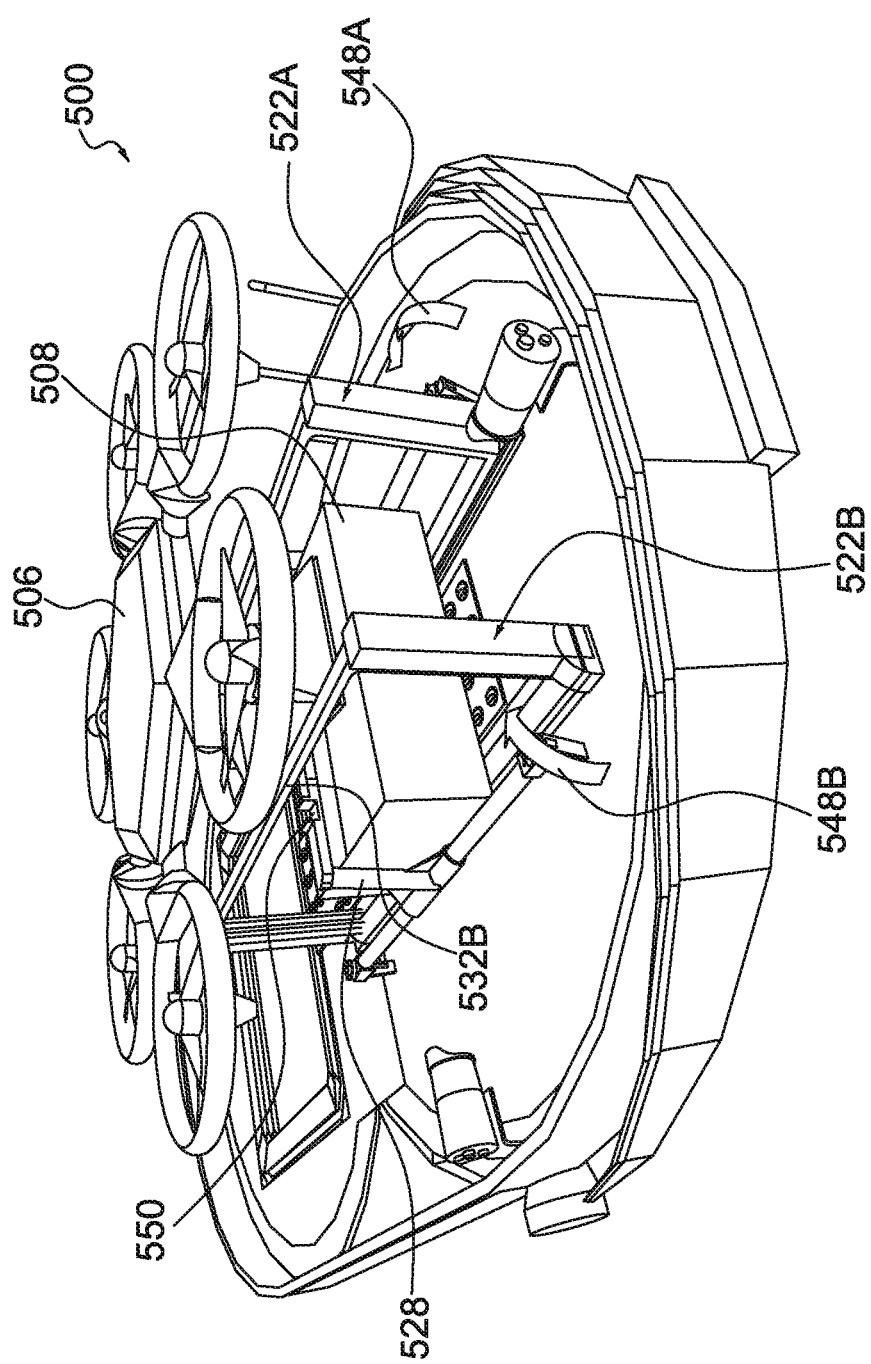

An example of UAV 506 descending onto delivery platform 500 to pick up parcel 508 is illustrated in FIG. 19. Here, parcel 508 has been oriented so that when UAV 506 descends on parcel 508, at least a portion of parcel carrier 528 is placed around parcel 508. Further, parcel carrier 528 may be positioned around parcel 508 so that at least a portion of parcel carrier 528 is between a securing arm pivot area, such as securing arm pivot areas 530A and 530B, and a securing arm crossbar, such as securing arm crossbar 532A and 532B. Examples of parcel carriers that may be suitable for use as parcel carrier 528, and with this technology more generally, are described in U.S. application Ser. No. 15/870, 187, entitled "Methods for Picking Up a Parcel Via an Unmanned Aerial Vehicle," filed Jan. 12, 2018, which is expressly incorporated by reference in its entirety.

While FIG. 19 illustrates two securing arms, securing arms 522A and 522B, some embodiments of delivery platform 500 may comprise only one securing arm, while others may comprise more than two. In this figure, each of securing arms 522A and 522B is illustrated as having the same feature, and thus, reference is made only to 522B when describing securing arm 522B in more detail; however, securing arm 522A may have some of the same features and the discussion is equally applicable, although some components may be hidden from view in FIG. 19. Further, while securing arms 522A and 522B are illustrated as part of securing area 504, in other embodiments, securing arms 522A and 522B may be part of delivery area 502, for example, by locating securing arms 522A and 522B on opposing sides of elevating surface 512.

With continued reference to FIG. 19, securing arm 522B comprises securing arm pivot area 530B, first member 534B, second member 536B, and securing arm crossbar 532B. While not described in detail, second member 534A may comprise features that are described in conjunction with first member 534B. First member 534B may be pivotably secured to securing arm pivot area 530B at a first end 538B of first member 534B. Second member 536B may be pivotably secured to securing arm pivot area 530B at a second end 540B of second member 536B. Thus, first member 534B and second member 536B may pivot from a retracted position where first member 534B and second member 536B are parallel with securing surface 546, such as in FIG. 19, to an engaged position where first member 534B and second member 536B are perpendicular to securing surface 546, such as in FIG. 20. However, more generally, in this same manner, first member 534B and second member 536B may be positioned at any angle relative to securing surface 546 along an arc created by pivoting each member about pivot area 530B.

Continuing again with FIG. 19, securing arm 522B may comprise crossbar 532B. Crossbar 532B may extend from third end 542B of first member 534B, where third end 542B is opposite first end 538B, to fourth end 544B of second member 536B, where fourth end 544B is opposite second end 540B. As described, securing arm 522B may be pivoted from a retracted position to an engaged position, such as by pivoting securing arm 522B in the direction of directional arrow 548B, shown in FIG. 20. Keeping with FIG. 20, as illustrated, by pivoting securing arm 522B to the engaged position, crossbar 532B may be positioned above both parcel 508 and at least a portion of parcel carrier 528. Put another way, at least a portion of parcel carrier 528 may be disposed between crossbar 532B and parcel 508. In some cases, crossbar 532B may be positioned above notch 550 of parcel carrier 528.

Figure 21:
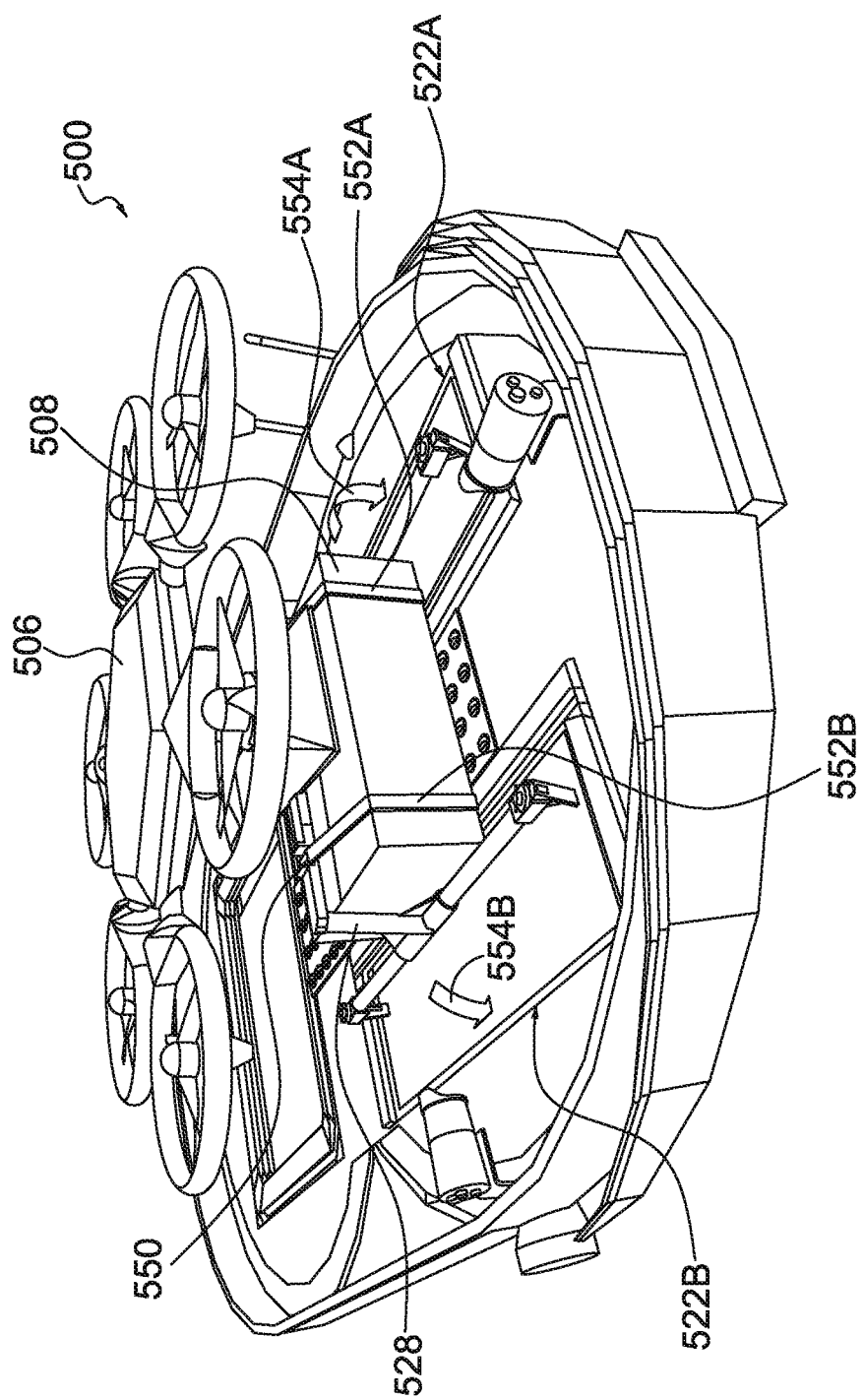

Additionally, securing arm 522B may house strap 552B, shown in FIG. 21. For example, strap 552B may be formed of polypropylene or another polymer. In some cases, strap 552B may comprise a metal, such as a wire. Continuing with FIG. 21, to secure parcel 508 to parcel carrier 528, strap 552B may be tightened to apply until strap 552B wraps around parcel 508 and parcel carrier 528. Strap 552B may be disposed within notch 550 so that strap 552B does not slip along a portion of parcel carrier 528. After securing parcel 508 to parcel carrier 528 with one or more straps, such as strap 552B, securing arm 522B may be moved to the retracted position by pivoting securing arm 522B in the direction of directional arrow 554B. Strap 552B may be cut to form two cut ends. The two cut ends may be secured together so that strap 552B wraps around parcel 508 and parcel carrier 528. As an example, the two cut ends of strap 552B may be secured together at a bottom of parcel 508, so that parcel 508 remains secured to parcel carrier 528 until strap 552B is cut or loosened. When the securing arms, such as securing arm 522B, are in the retracted position, UAV 506 may be free to navigate away from delivery platform 500 with parcel 508. As noted above, directional arrow 548A and strap 552A may be analogous to directional arrow 548B and strap 552B, respectively, however, with respect to securing arm 522A.

In an embodiment, crossbar 532B may not be a separate component of securing arm 522B, but may itself be formed of strap 552B. In this embodiment, a portion of strap 552B may extend from third end 542B of first member 534B to fourth end 544B of second member 536B of securing arm 522B. Thus, after strap 552B is tightened around parcel 508 and parcel carrier 528, only first member 534B and second member 536B may be moved to the retracted position. Another strap may then be extended from third end 542B to fourth end 544B and the process repeated for pick up of the next parcel.

Figure 22:
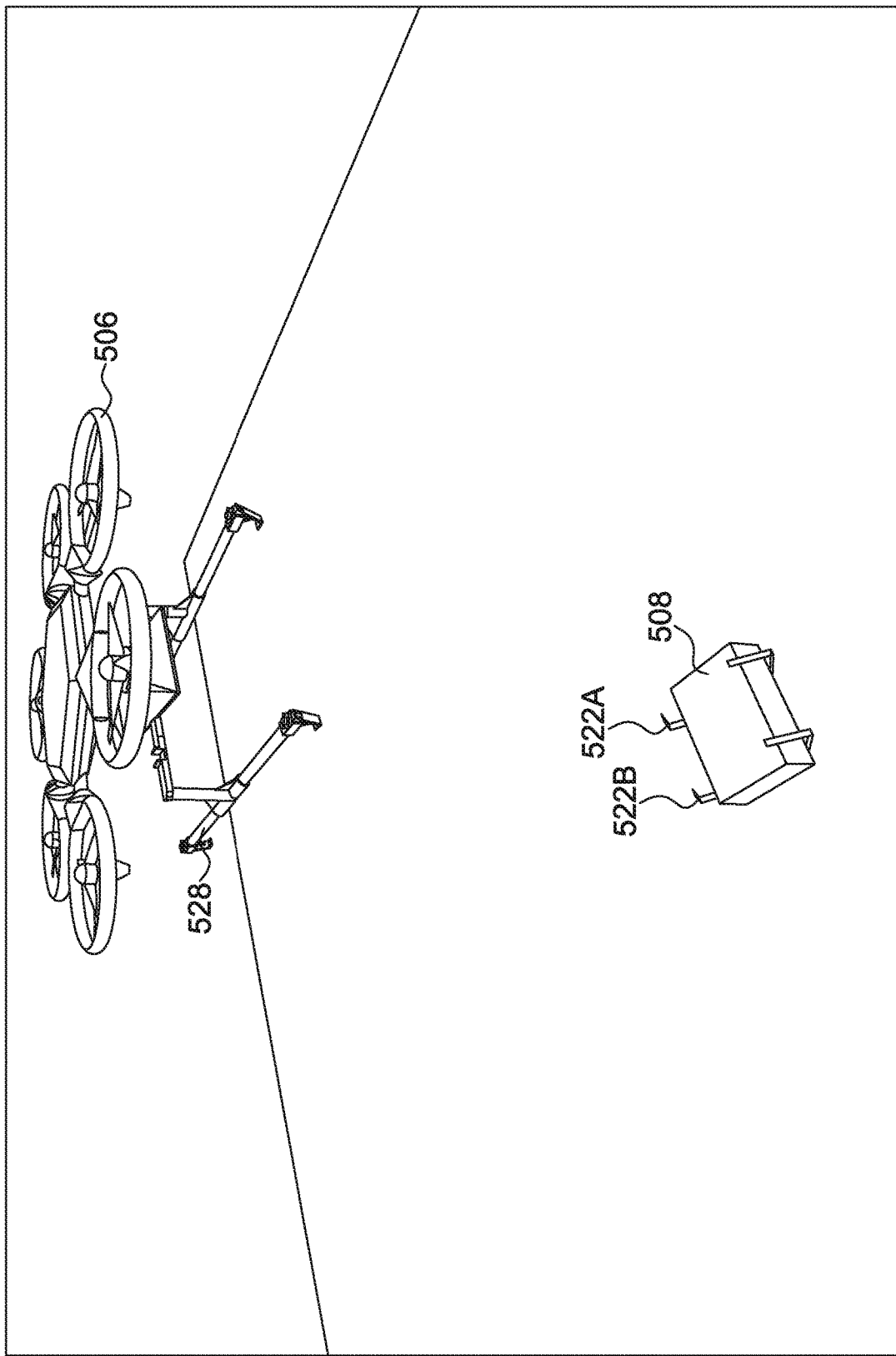
FIG. 22 illustrates an example of releasing the parcel of FIGS. 16-21 from the UAV, in accordance with embodiments described herein.

Turning briefly to FIG. 22, parcel 508 may be released from parcel carrier 528 of UAV 506 by disengaging the strap, such as straps 552A and 552B. For instance, while not illustrated, parcel carrier 528 may comprise a blade to cut straps 552A and 552B. In some cases, parcel carrier 528 may apply tension to straps 552A and 552B to break it. For example, the tension may be applied to a weak area, such as an area where straps 552A and 552B were fastened when securing parcel 508 to parcel carrier 528.

Throughout this disclosure, several embodiments of delivery platforms are described. Some embodiments of the delivery platforms have been described having a set of components, while other embodiments have been described having a different set. It will be recognized that not all embodiments of the delivery platform can be described in this disclosure, and therefore, it is intended by the inventors that the various aspects and components described relative to each embodiment of the delivery platforms are interchangeable and can be in any combination with any other embodiment.

Containment Unit

Embodiments of the delivery platform may sometimes be used in conjunction with a containment unit that may hold a parcel until it is picked up or retrieved by a person. For instance, the containment unit may be located near the ground so that it is easily accessible. In some cases, the containment unit may be located on a balcony or a window of a multistory building. In some cases, the containment unit may be built into an exterior wall. At a high level, the containment unit may receive a parcel from a delivery platform after a UAV has released the parcel at the delivery platform. This operates to free up space on the platform, while still providing security for the parcel and ease of access when a person retries it. In other cases, the containment unit may be used to hold a parcel that is intended to be picked up by a UAV, and it may hold the parcel until receiving an indication from the delivery platform that a UAV is ready to pick up the parcel. This too helps to free up space on the delivery platform so other parcels may be delivered. Thus, using the containment unit in conjunction with the delivery platform allows for more parcels to be delivered from UAVs As will be described in more detail below, embodiments of the containment unit may load and unload parcels from one or more ends of the containment unit. Thus, a containment unit may engage with other forms of unmanned systems. Some examples of which will be further described.

Figure 23:
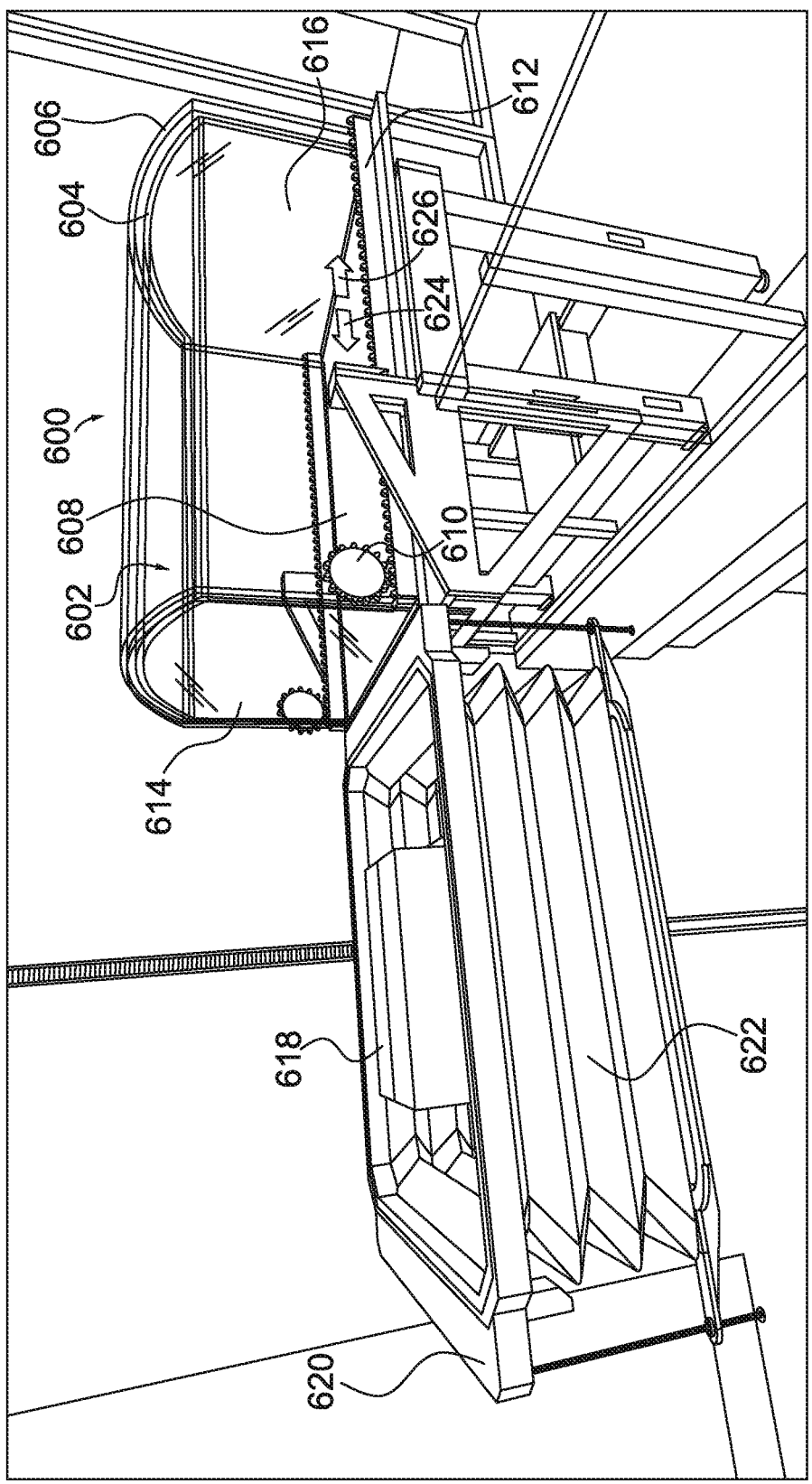
FIGS. 23-26 illustrate an example embodiment of a containment unit and an example method for retrieving a parcel from a delivery platform, in accordance with embodiments described herein.

Turning to FIG. 23, an example embodiment of containment unit 600 is provided. Containment unit 600 is shown comprising housing 602. Housing 602 may comprise one or more units, such as inner housing unit 604 and outer housing unit 606. Housing 602 may also comprise floor 608, i.e., "housing floor." Inner housing unit 604 may comprise more than one wall. In a specific example, inner housing unit 604 may comprise two sidewalls, i.e., "inner sidewalls." In another specific example, inner housing unit 604 may comprise two sidewalls and a top wall. A first sidewall may extend parallel to a second sidewall and be separated by a distance, each sidewall forming a portion of inner housing unit 604. A first end of the first sidewall and a first end of the second sidewall may be connected by a first end piece 614 of inner housing unit 604, while a second end of the first sidewall and a second end of the second sidewall may be connected by a second end piece 616 of the inner housing unit 604. In this way, the sidewalls and end pieces 614 and 616 may form a box-like that is inner housing unit 604. In some cases, inner housing unit 604 may comprise a top wall that extends from the top of the first sidewall and the second sidewall. Though the top wall is illustrated in the figures having an arc shape, it will be recognized that the top wall, when present, may be any shape. Inner housing unit 604 may be open on its bottom side, meaning that at least a portion of the bottom side of inner housing unit 604 is not covered by a wall and access to an inside volume space of inner housing unit 604 may be made through an open portion.

Outer housing unit 606 may comprise a first sidewall and a second sidewall, i.e., "outer sidewalls." A top wall of outer housing unit 606 may connect the top of the first sidewall and the top of the second sidewall. In this way, the sidewalls and the top wall of outer housing unit 606 may form a box-like structure having a volume and is open on both ends. In some cases, outer housing unit 606 may include floor 608, and floor 608 may connect a bottom of the first sidewall and a bottom of a second sidewall of outer housing unit 606. In some embodiments, floor 608 may be independent of outer housing unit 606.

Inner housing unit 604 may be movable, while outer housing unit 606 may be stationary. As an example, inner housing unit 604 may be movable using gear 610 and gear track 612. In this example, gear track 612 may be secured to inner housing unit 604, while gear 610 is secured to a stationary portion of containment unit 600. Other mechanisms for moving inner housing unit 604 may also be used, such as an actuator system, a motorized threaded shaft, etc. In some cases, inner housing unit 604 may move from an extended position to a retracted position. When inner housing unit 604 is in the retracted position, outer housing unit 606 may cover at least a portion of inner housing unit 604. When inner housing unit 604 is in the retracted position, the first sidewall and the second sidewall of inner housing unit 604 may be above at least a portion of floor 608. The retracted position for the inner housing unit 604 is illustrated in FIG. 23.

Figure 24:
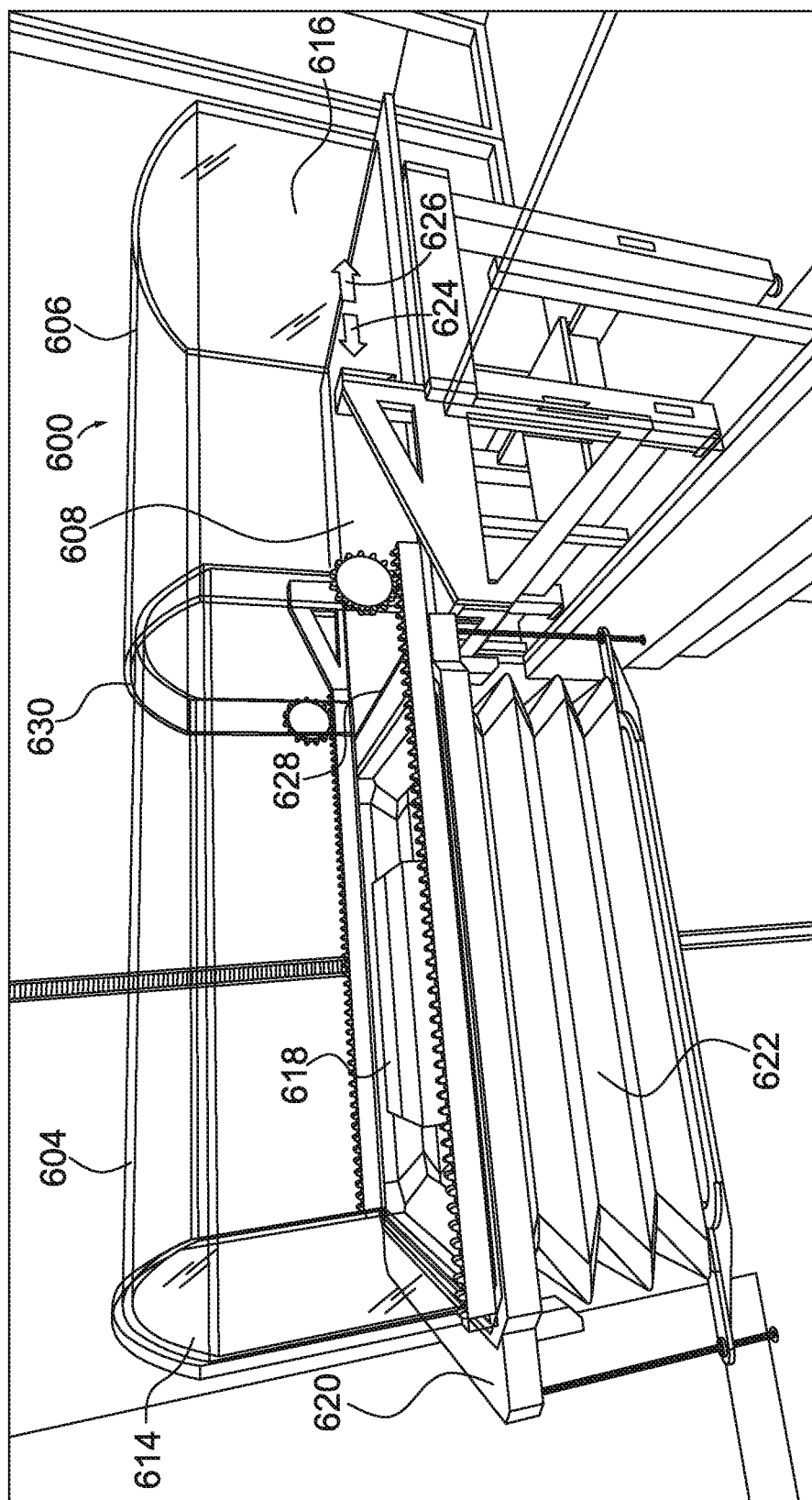

To move from the retracted position to an extended position, inner housing unit 604 may move in a direction indicated by either directional arrow 624 or 626. FIG. 24 illustrates inner housing unit 604 in an extended position. Here, inner housing unit 604 has moved in the direction of directional arrow 624. In the extended position, at least a portion of the sidewalls of inner housing unit 604 is not above floor 608. In the extended position, the open portion at the bottom of inner housing unit 604 may extend beyond edge 628 of floor 608. In the extended position, at least a portion of inner housing unit 604 may extend beyond edge 630 of outer housing unit 606, and thus, at least a portion of inner housing unit 604 may not be covered by outer housing unit 606.

In embodiments that comprise outer housing unit 606, outer housing unit 606 may serve to provide additional protection for parcels stored in containment unit 600. For instance, if there is a parcel stored in containment unit 600, containment unit 600 may retrieve another parcel for storage. During retrieval of the second parcel, outer housing unit 606 may protect the stored first parcel, while inner housing unit 604 is used to facilitate storage of the second parcel in containment unit 600.

Referring now to FIGS. 23-26, generally illustrate one example of how containment unit 600 may retrieve one or more parcels 618 from a delivery platform is provided. Only a portion of a delivery platform is shown. The figures illustrate elevating surface 620 and variable volume chamber 622 having parcels 618. Initially, the delivery platform may receive a parcel from a UAV. Elevating surface 620 may be lowered to a lowered position where elevating surface 620 is horizontally aligned with floor 608 of containment unit 600. Using chamber 622, the tops of the parcels 618 may be lowered so that they are horizontally aligned with or they are below elevating surface 620, which may include the entirety of parcels 618 being within chamber 622.

As can be seen in FIG. 24, inner housing unit 604 may be extended from the retracted position to an extended position by moving inner housing unit 604 in the direction of directional arrow 624. Because the parcels 618 are within chamber 622, inner housing unit 604 may be extended over parcels 618 and cover all of or a portion of elevating surface 620. As previously noted, at least a portion of the bottom of inner housing unit 604 may be opened to allow access to the volume space within inner housing unit 604. By extending inner housing unit 604 over the top of parcels 218, parcels 218 may have access to the inside of inner housing unit 604.

Figure 25:
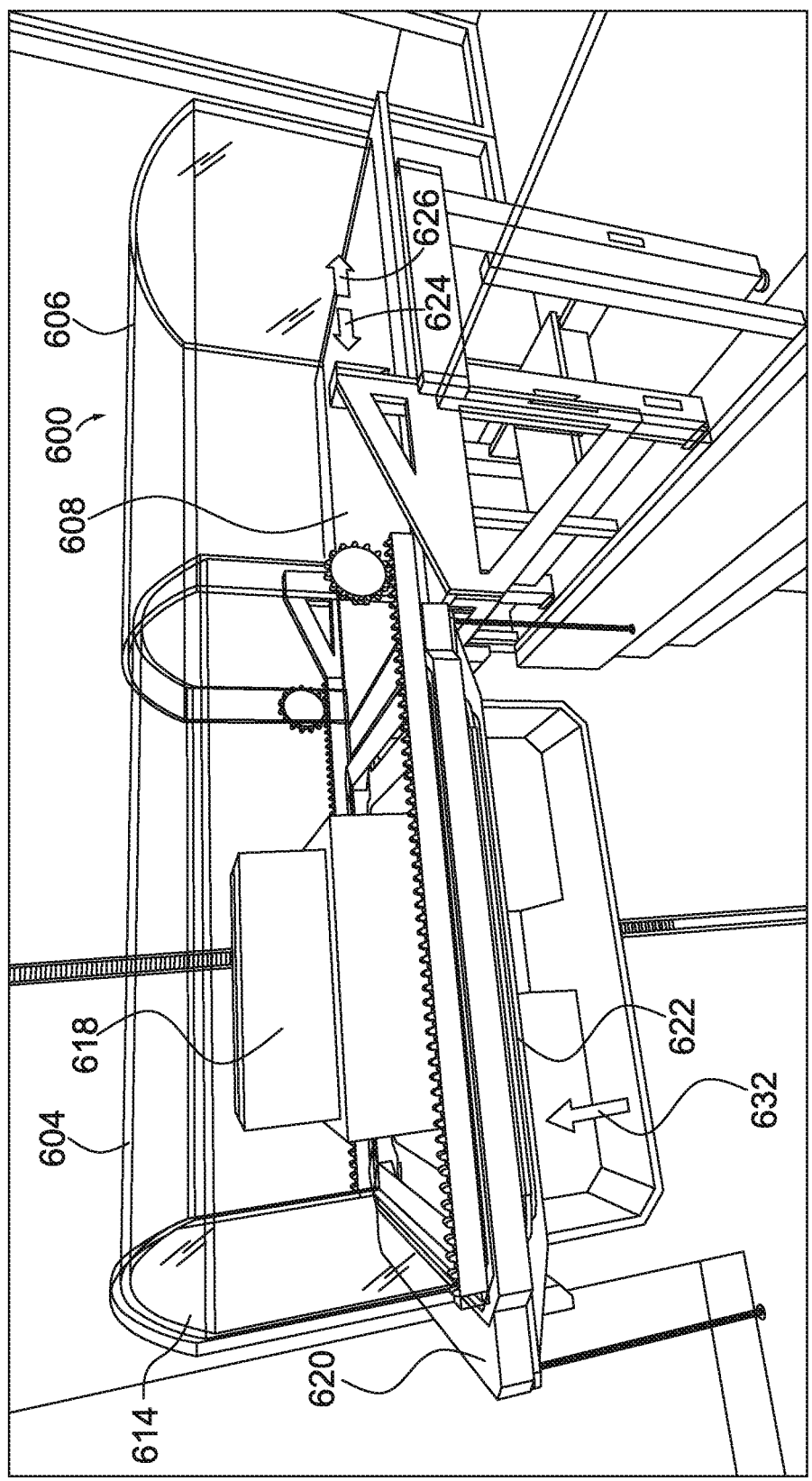

To insert parcels 218 within inner housing unit 604, a surface of chamber 622 may be raised, as previously described, in the direction of directional arrow 632. As the surface of chamber 622 is raised, so are parcels 218, and parcels 218 are inserted into the volume space of inner housing unit 604, as illustrated in FIG. 25.

Figure 26:
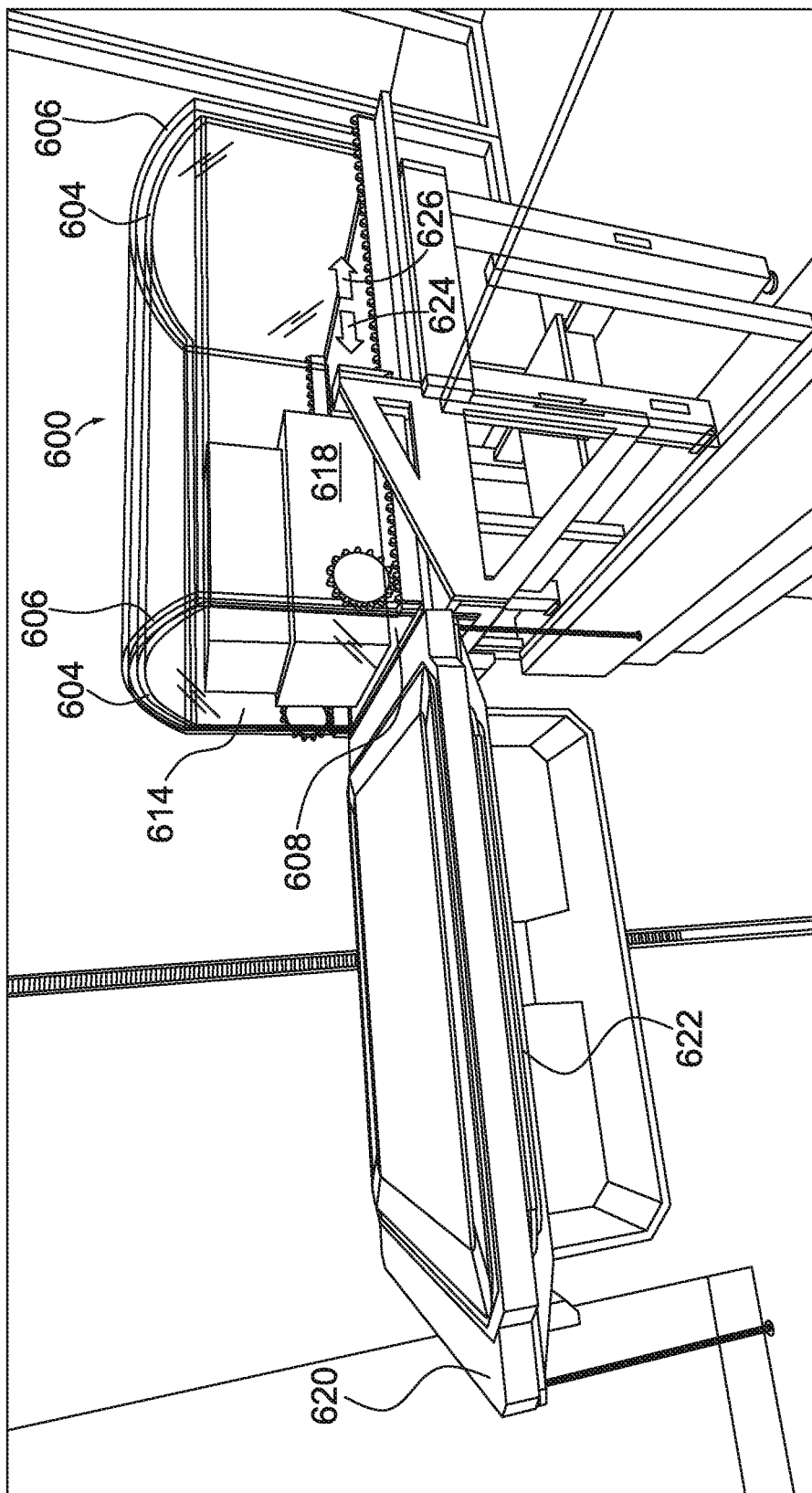

To remove parcels 218 from elevating surface 620 and onto floor 608 of containment unit 600, inner housing unit 604 may be retracted to the retracted position by moving inner housing unit 604 in the direction of directional arrow 626. As inner housing unit 604 is retracted into the retracted position, first end piece 614 begins to make contact with parcels 618, which applies a force to parcels 618 in the direction of directional arrow 626, e.g., from elevating surface 620 towards floor 608. Thus, parcels 618 may slide from elevating surface 620 onto floor 608 of containment unit 600. Sliding parcels 618 from elevating surface 620 onto floor 608 may be further facilitated by the horizontal alignment of elevating surface 620 and floor 608. An example embodiment of parcels 618 stored within containment unit 600 is illustrated in FIG. 26, which shows the inner housing unit 604 in the retracted position, having moved from the extended position shown in FIG. 25.

To load parcels 618 onto elevating surface 620, for example to send parcels 618 using a UAV delivery method, the process may act in reverse. Particularly, a person may have access to containment unit 600 by accessing through second end piece 616, which may open for the person using a key or by receiving a message from a user device to open. Once parcels 618 are secured within containment unit 600, inner housing unit 604 may move to the extended position. Here, second end piece 616 applies a force on parcels 618 to move them onto elevating surface 620. The delivery platform may then perform methods that have previously been described to facilitate retrieval of parcels 618 by the UAV.

Figure 27:
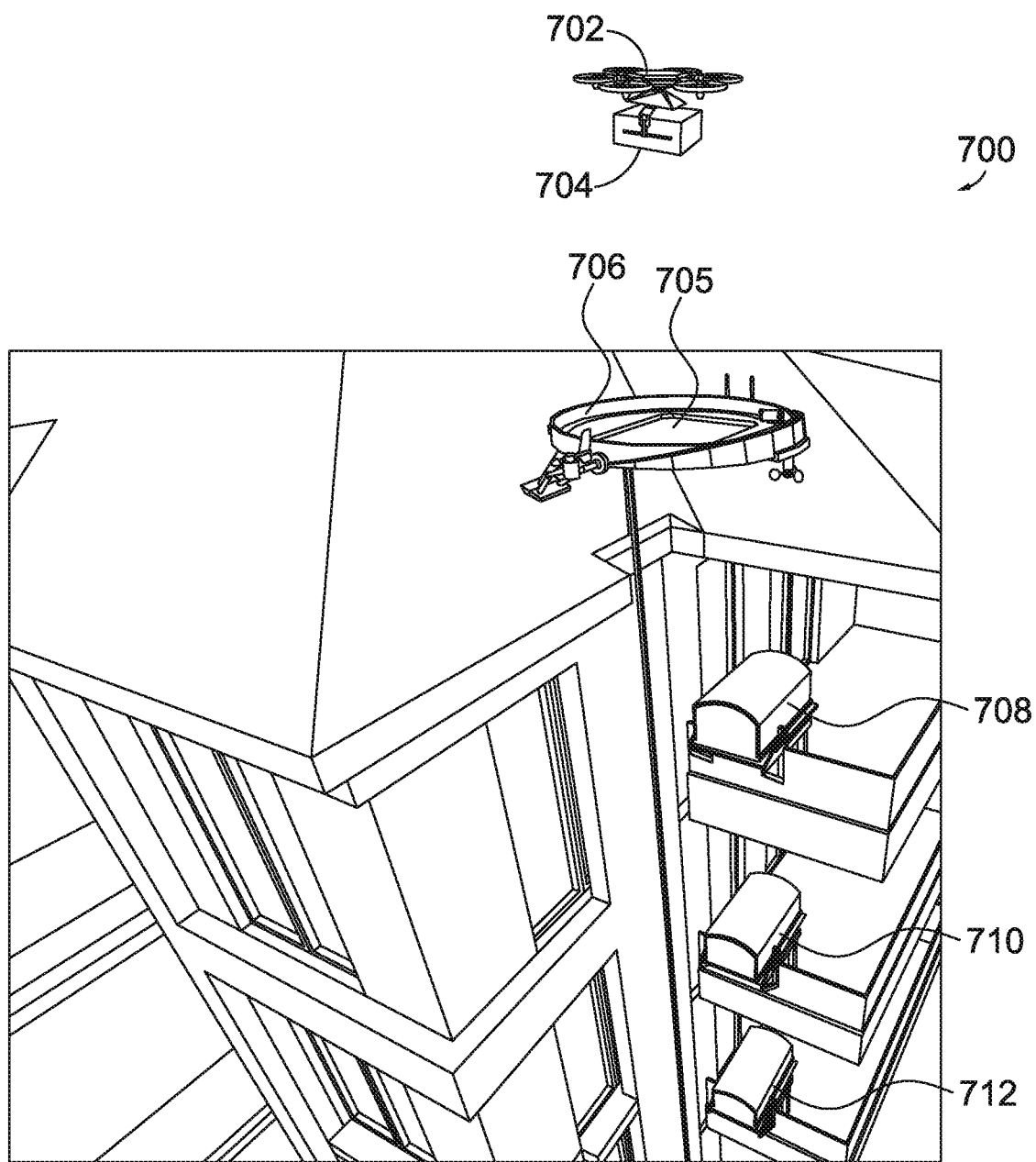
FIGS. 27-29 illustrate an example use-case environment for an example delivery platform and one or more example containment units for a multi-story, multi-occupant dwelling, in accordance with embodiments described herein.
Figure 28:
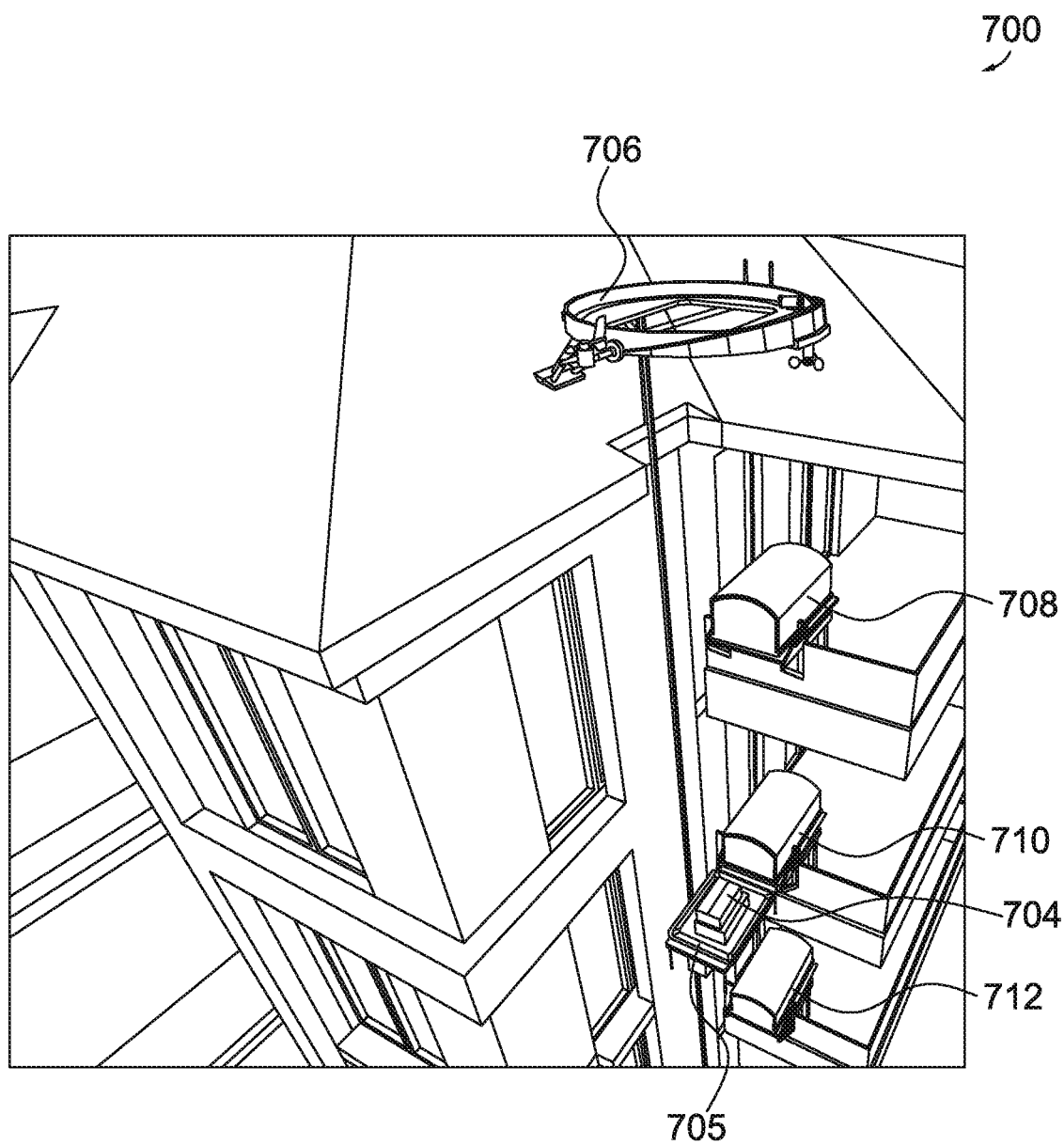
Figure 29:
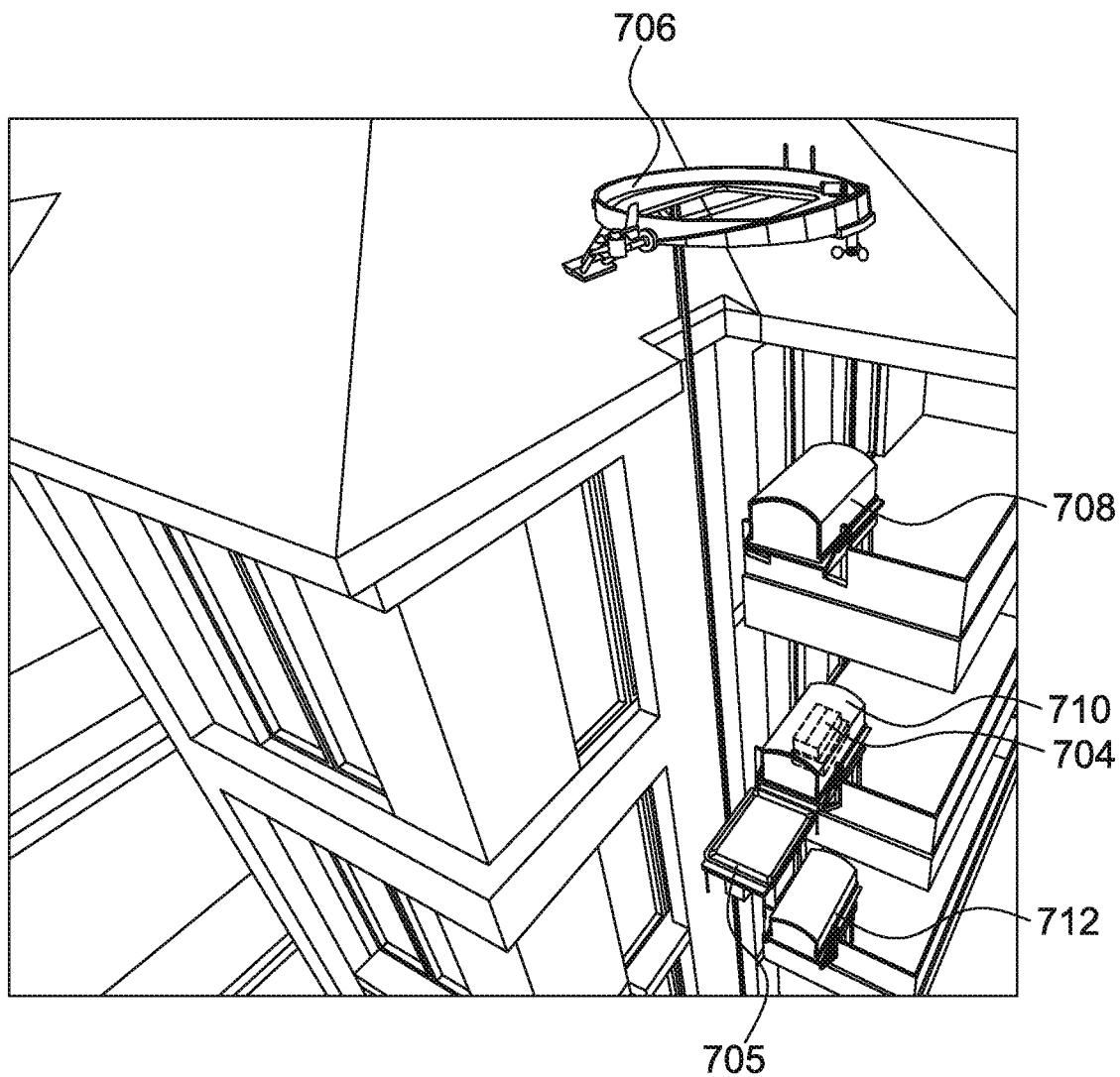

FIGS. 27-29 illustrate an example use-case environment for a plurality of containment units 708, 710, and 712 and delivery platform 706. In this use-case example, containment units 708, 710, and 712 are associated with a multi-story, multi-occupant dwelling. In such cases, delivery platform 706 may be able to deliver parcels from each of containment units 708, 710, and 712. This may have the benefit of limiting the number of delivery platforms, while still allowing individual people with different delivery addresses to send and receive parcels using UAVs.

FIG. 27 illustrates delivery platform 706 having delivery surface 705. Delivery platform 706 is associated with a plurality of containment units. In this example, delivery platform 706 is may be usable with first containment unit 708, which is associated with a first delivery address; second containment unit 710, which is associated with a second delivery address; and third containment unit 712, which is associated with a third delivery address. Each of the delivery addresses may be a different address for a respective dwelling unit.

As is shown in FIG. 27, UAV 702 is approaching delivery platform 706 with parcel 704 for delivery. Once parcel 704 is released onto delivery platform 706, a camera of delivery platform 706 may detect and image machine-readable indicia on parcel 704, and the delivery address may be determined based on the machine-readable indicia. Based on determining the delivery address, delivery platform 706 may deliver parcel 704 to a containment unit associated with the determined delivery address.

In the example illustrated by FIGS. 27-29, it is determined that one or more parcels, including parcel 704, are to be delivered to the second delivery address, which is associated with second containment unit 710. Using methods previously described, delivery platform 706 may lower elevating surface 705 to a lowered position at second containment unit 710, such as in FIG. 28, so that parcel 704 may be retrieved by second containment unit 710, such as in FIG. 29.

Figure 30:
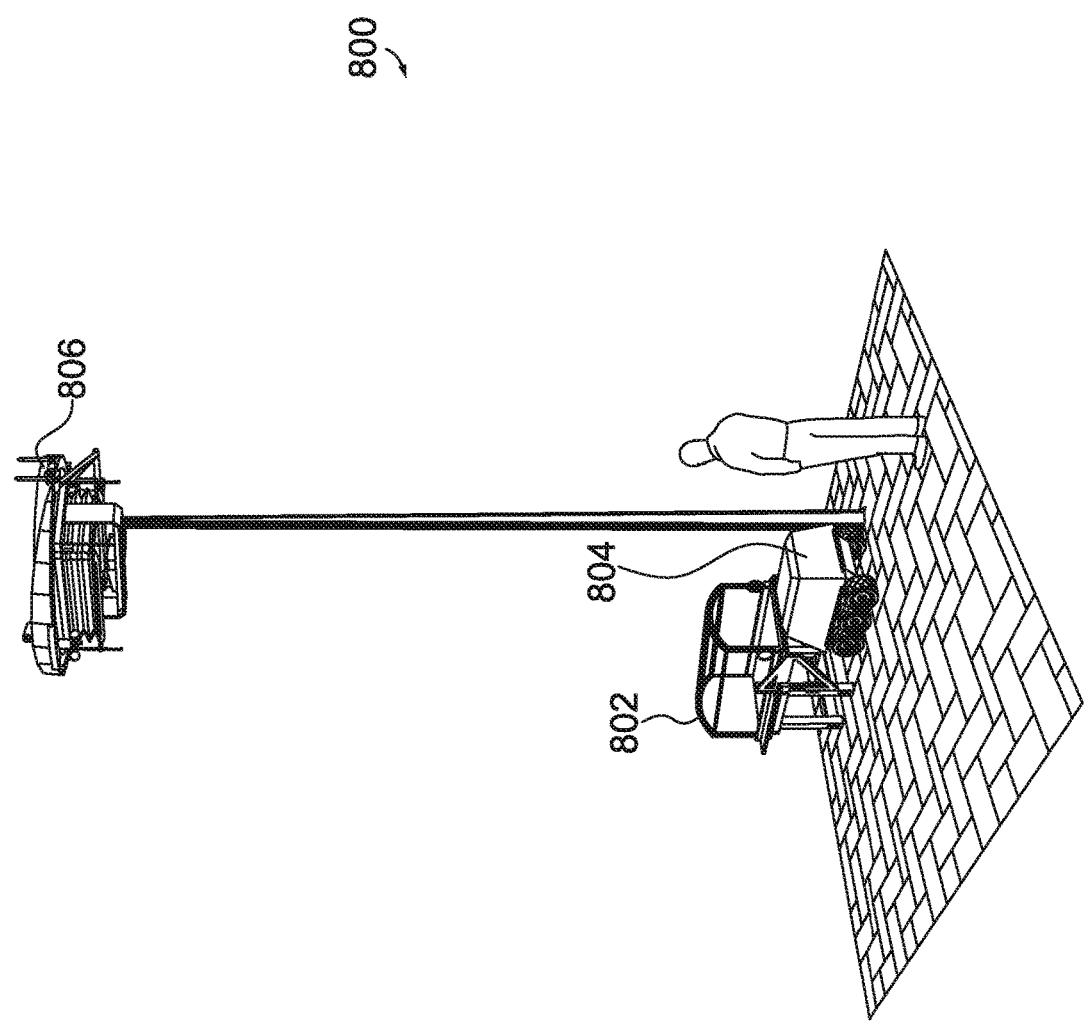
FIG. 30 illustrates an example use-case environment of an example delivery platform, an example unmanned terrestrial vehicle (UTV), and an example containment unit, in accordance with embodiments described herein.

In some cases, containment units may interact with unmanned terrestrial vehicles (UTVs). FIG. 30 illustrates an example use-case environment 800 having containment unit 802, UTV 804, and delivery platform 806. While FIG. 30 illustrates containment unit 802, UTV 804, and an embodiment of delivery platform 806, it is contemplated that any combination of the components described herein may be used.

Figure 31:
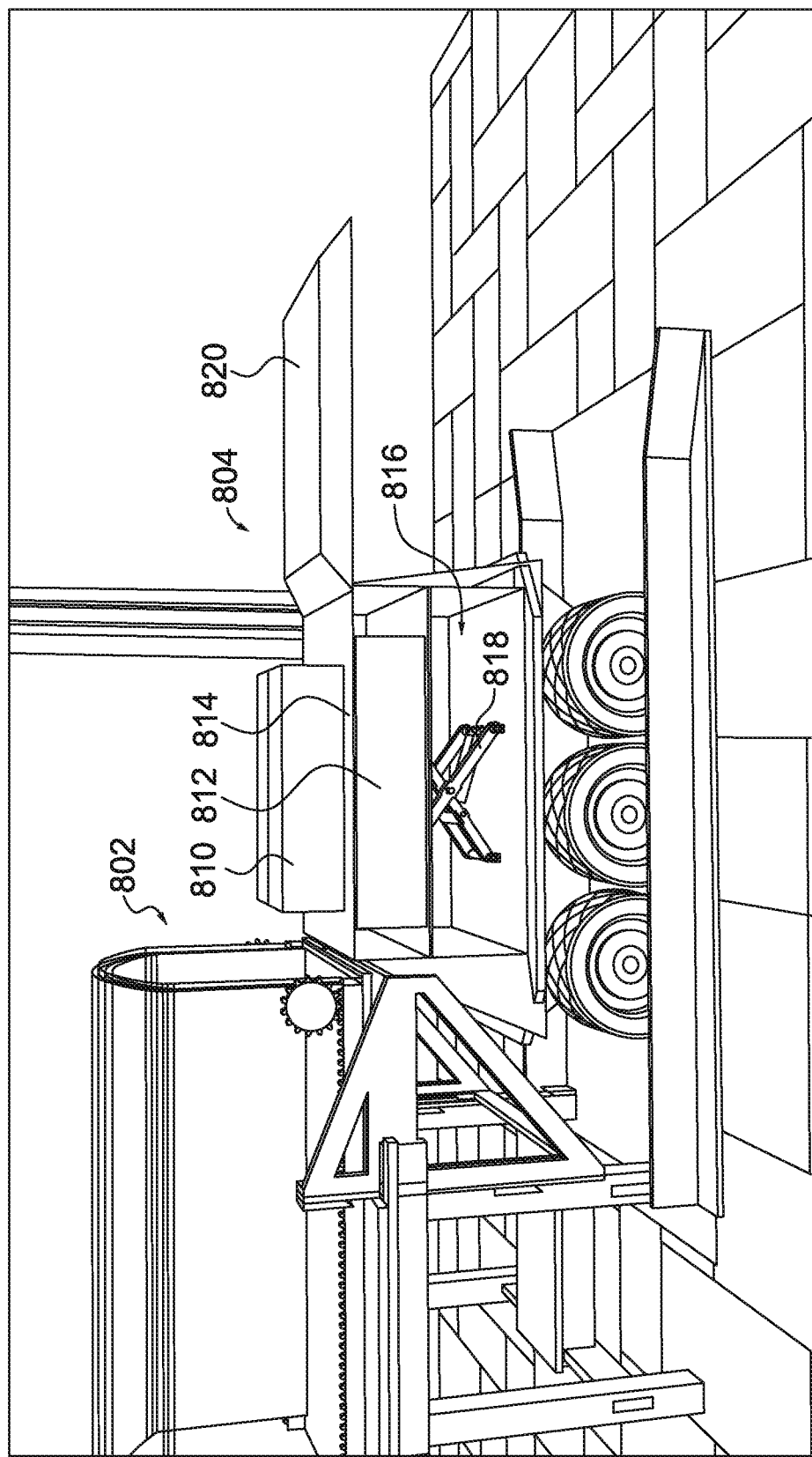
FIG. 31 illustrates the UTV of FIG. 30 delivering a parcel to the containment unit, in accordance with embodiments described herein.

An embodiment of UTV 804 is illustrated in FIG. 31, which provides an example of UTV 804 delivering one or more of parcels 810 and 812 to or from containment unit 802. Parcels 810 and 812 may be separated by divider 814. In this example, UTV 804 comprises storage area 816 that may house one or more parcels. UTV 804 may further comprise lift 818 that raises parcels 810 and 812. In some cases, lift 818 may comprise a scissor lift. UTV 804 may comprise a top portion 820 that is movable. An opening to storage area 816 may be formed by moving top portion 820 to an open position. By opening storage area 816 at the top, lift 818 may raise or lower parcels through the opening in the top.

Figure 32:
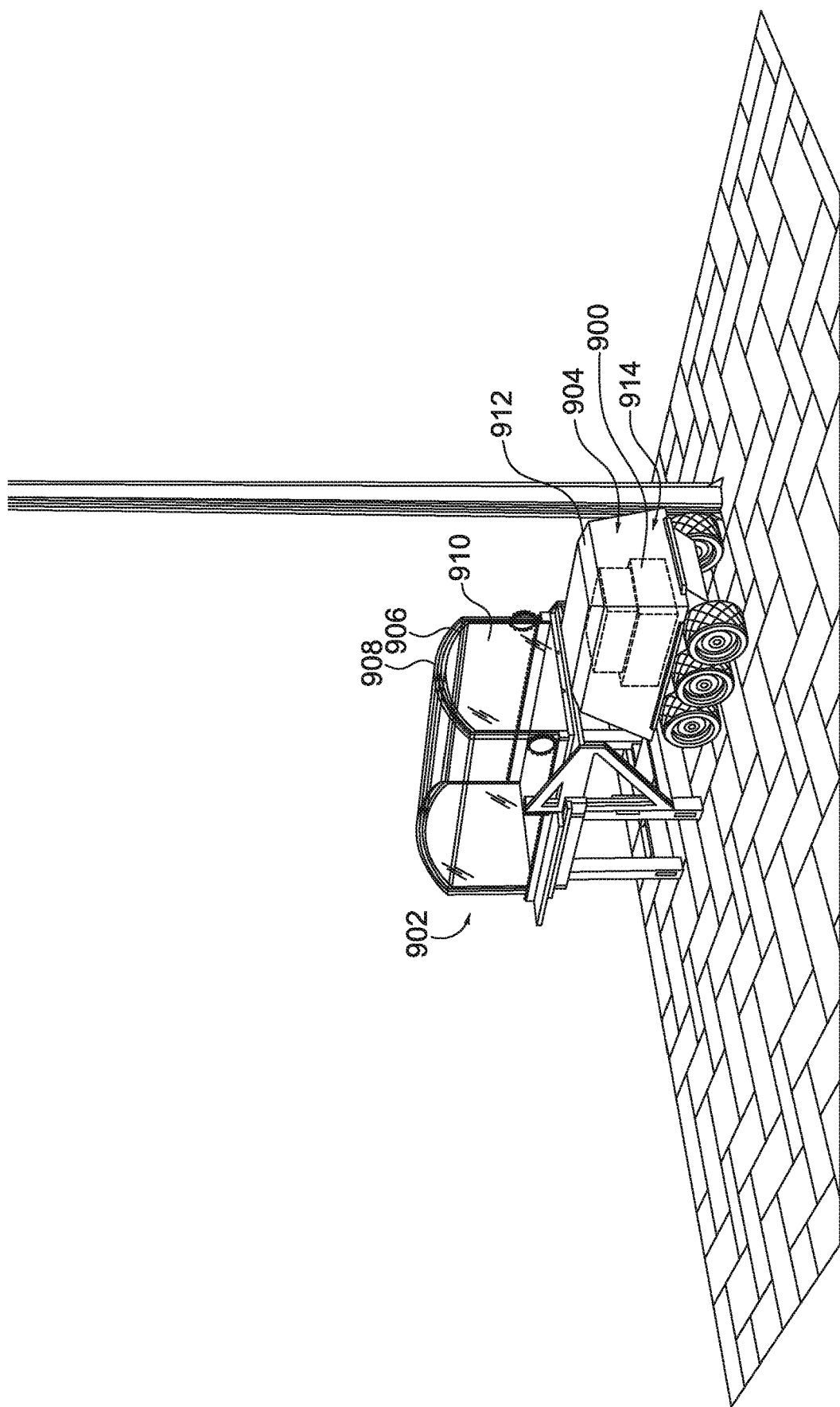
FIGS. 32-36 illustrate an example method of dropping off parcels at an example containment unit, in accordance with embodiments described herein.
Figure 33:
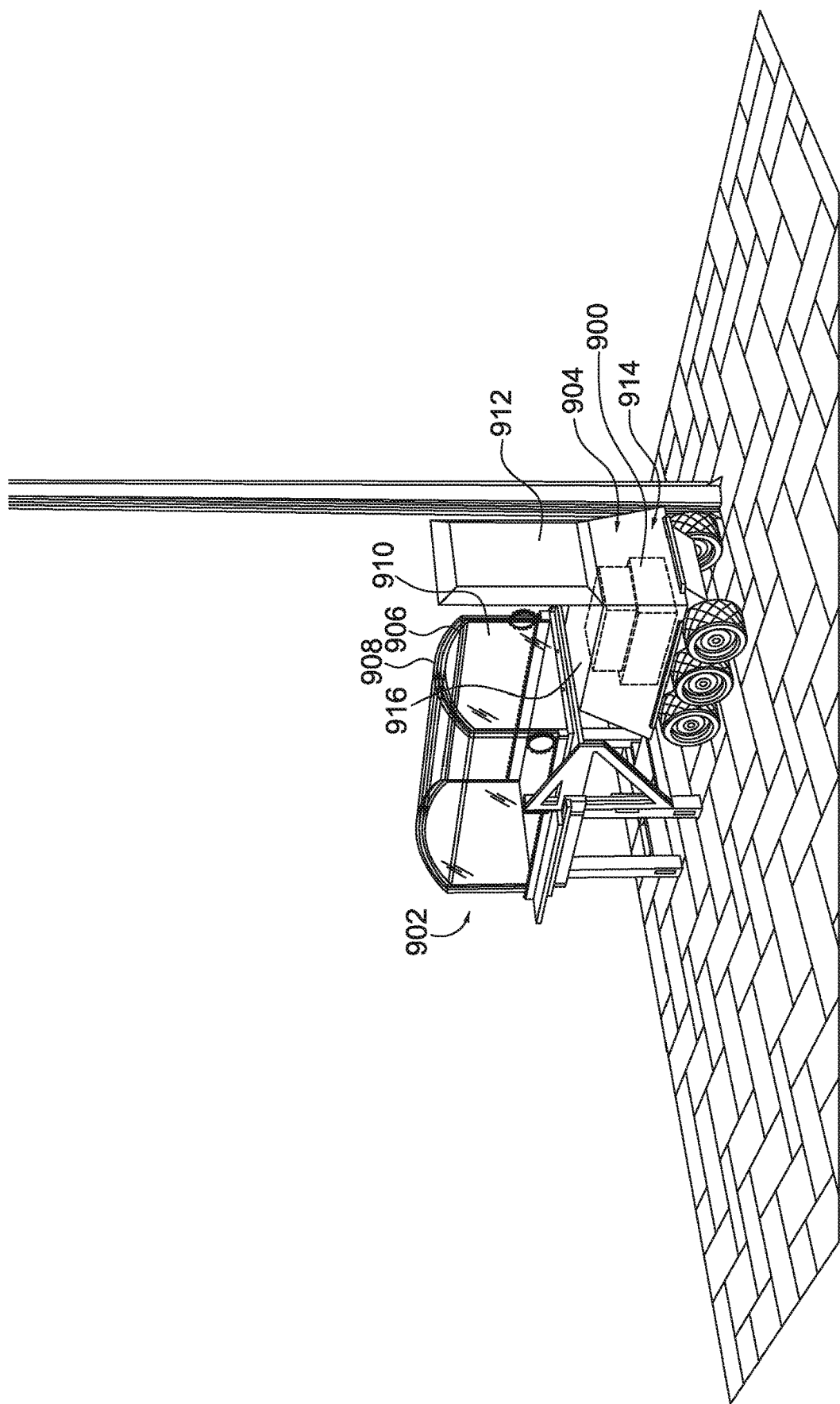
Figure 34:
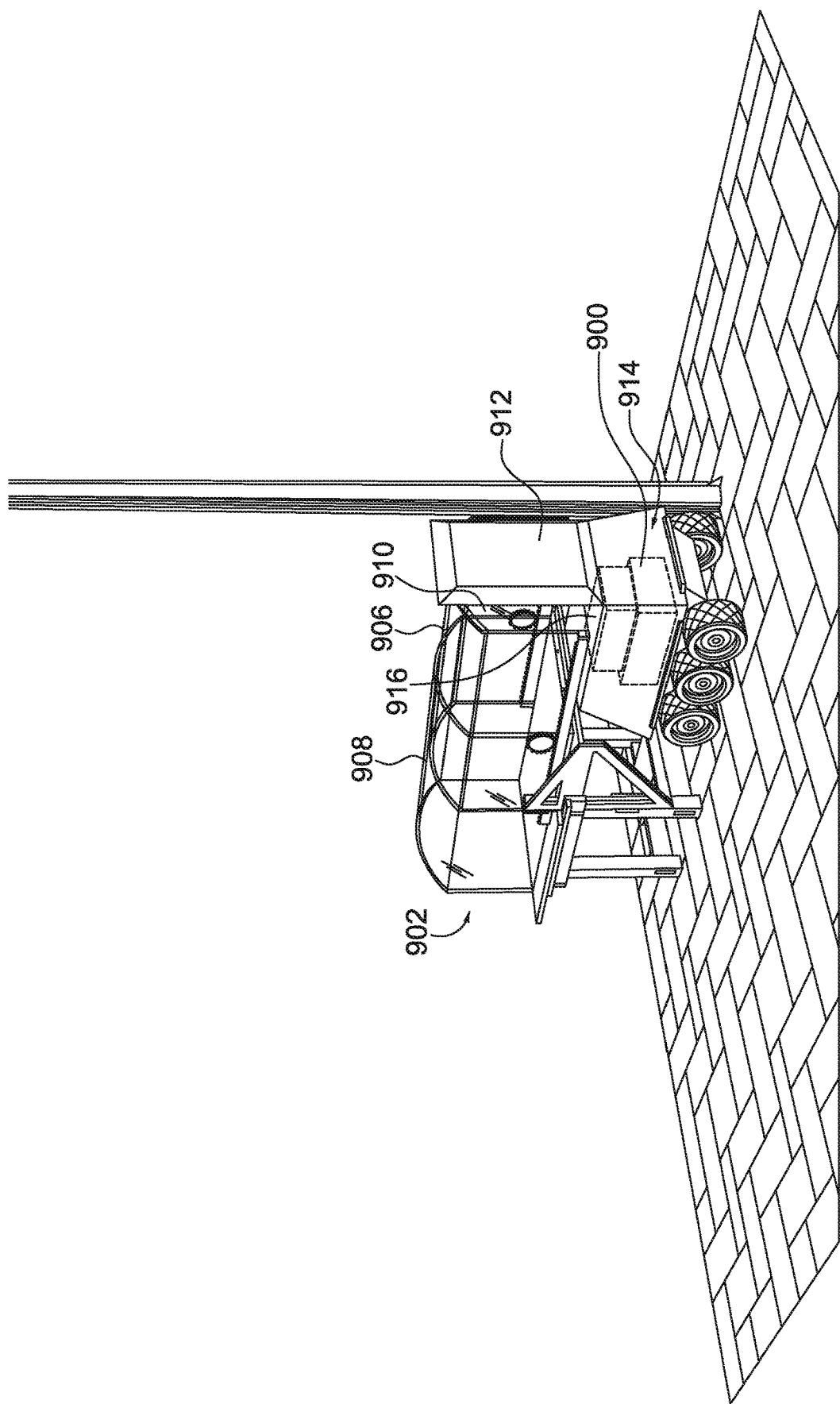
Figure 35:
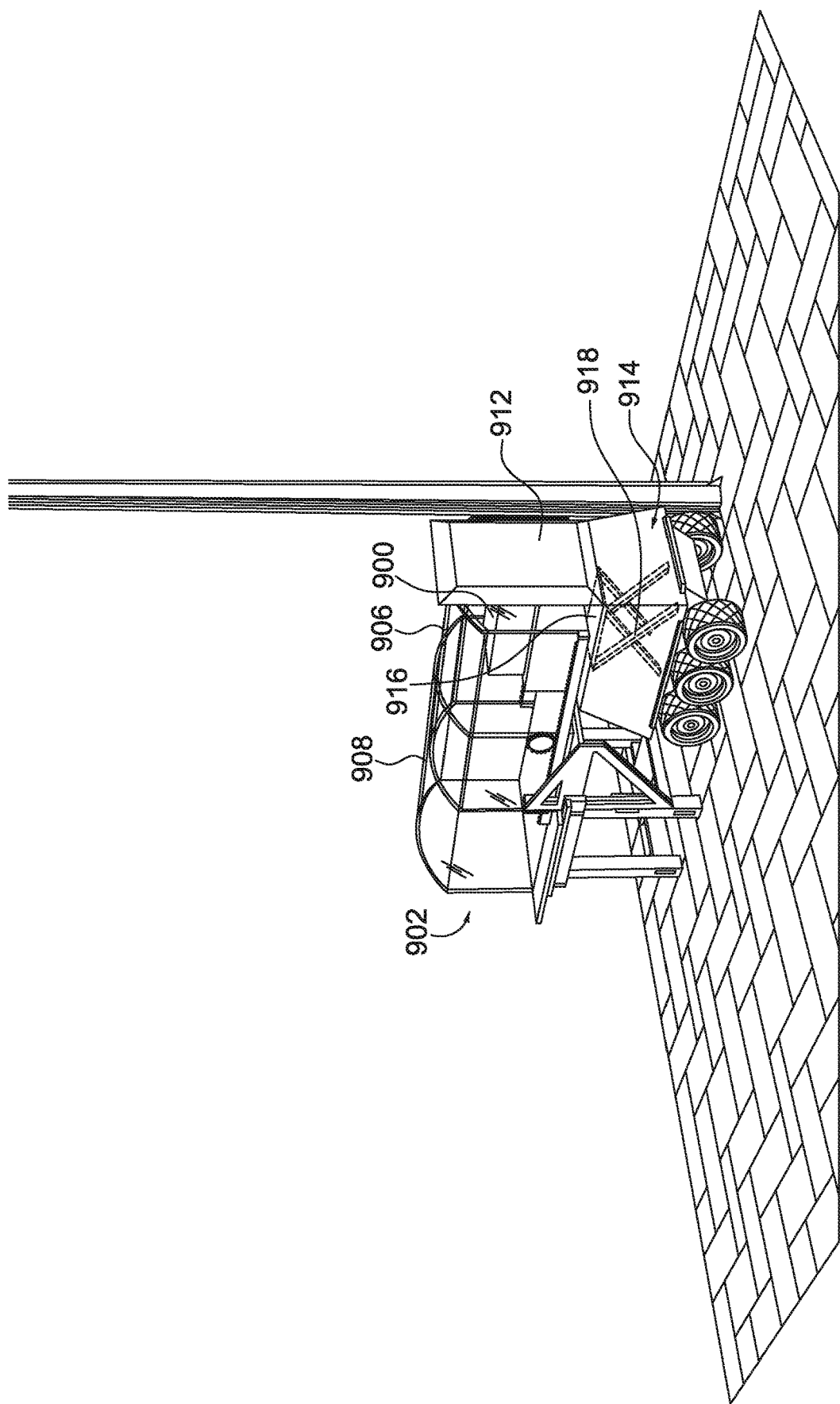
Figure 36:
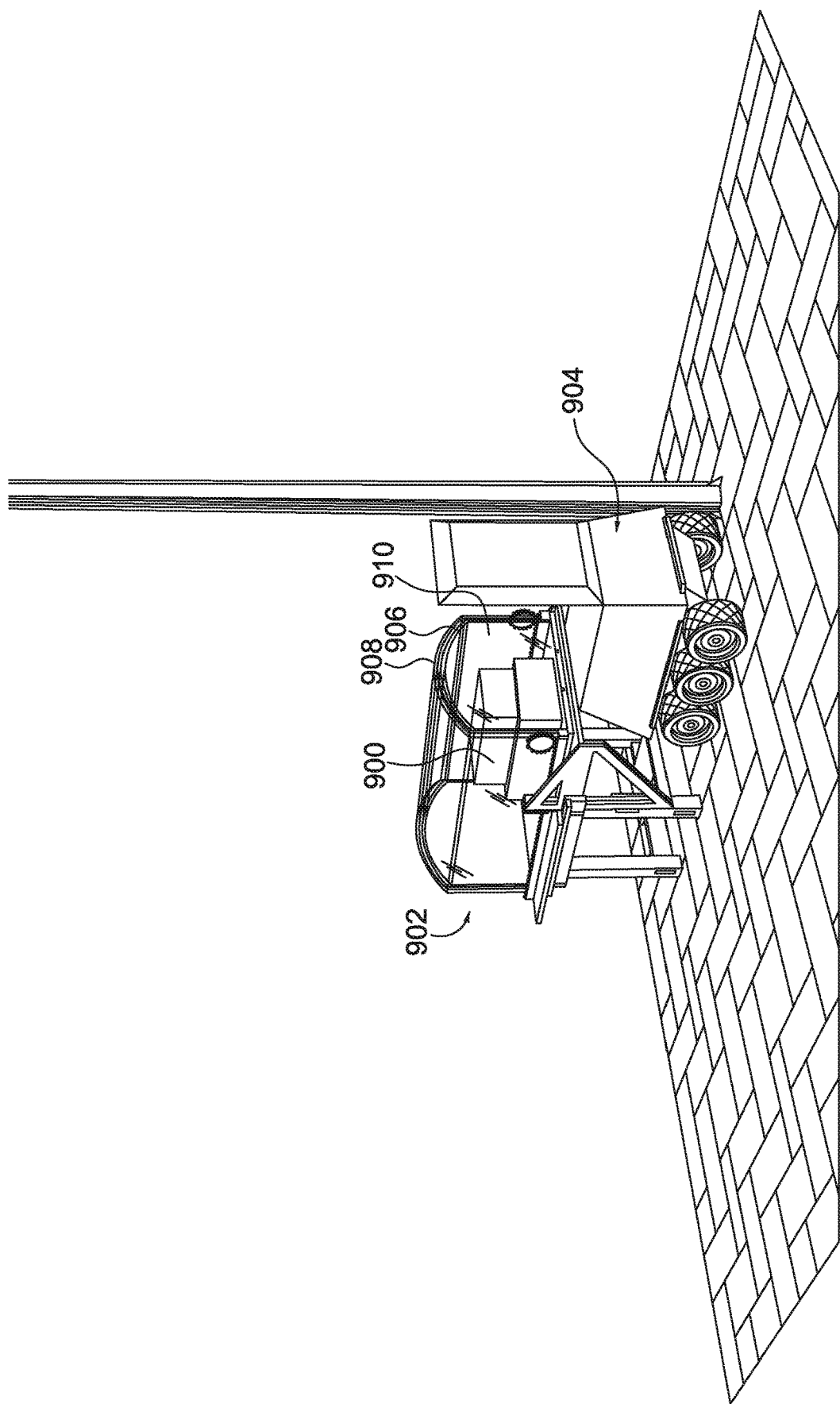

FIGS. 32-36 illustrate dropping off one or more parcels 900 at containment unit 902 using UTV 904, having outer housing unit 908 and inner housing unit 906. In FIG. 32, UTV 904 may approach containment unit 902 with parcels 900. UTV 904 has movable top portion 912 that may be moved to create top opening 916 to storage area 914 of UTV 904, as illustrated in FIG. 33. After creating top opening 916 to storage area 914, containment unit 902 may move inner housing unit 906 to a position over top opening 916. As in embodiments already described, inner housing unit 906 may have an opening on the bottom that allows access to the inside of inner housing unit 906. By positioning at least a portion of inner housing unit 906 above top opening 916 of the UTV 904, parcels 900 may be raised through top opening 916 and the bottom opening of inner housing unit 906, such as by lift 918, as can be seen in FIG. 35. Similar to methods previously described, inner housing unit 906 may move to the retracted position, and in doing so, first end piece 910 may pull parcels 900 into containment unit 902, the position shown in FIG. 36.

Figure 37:
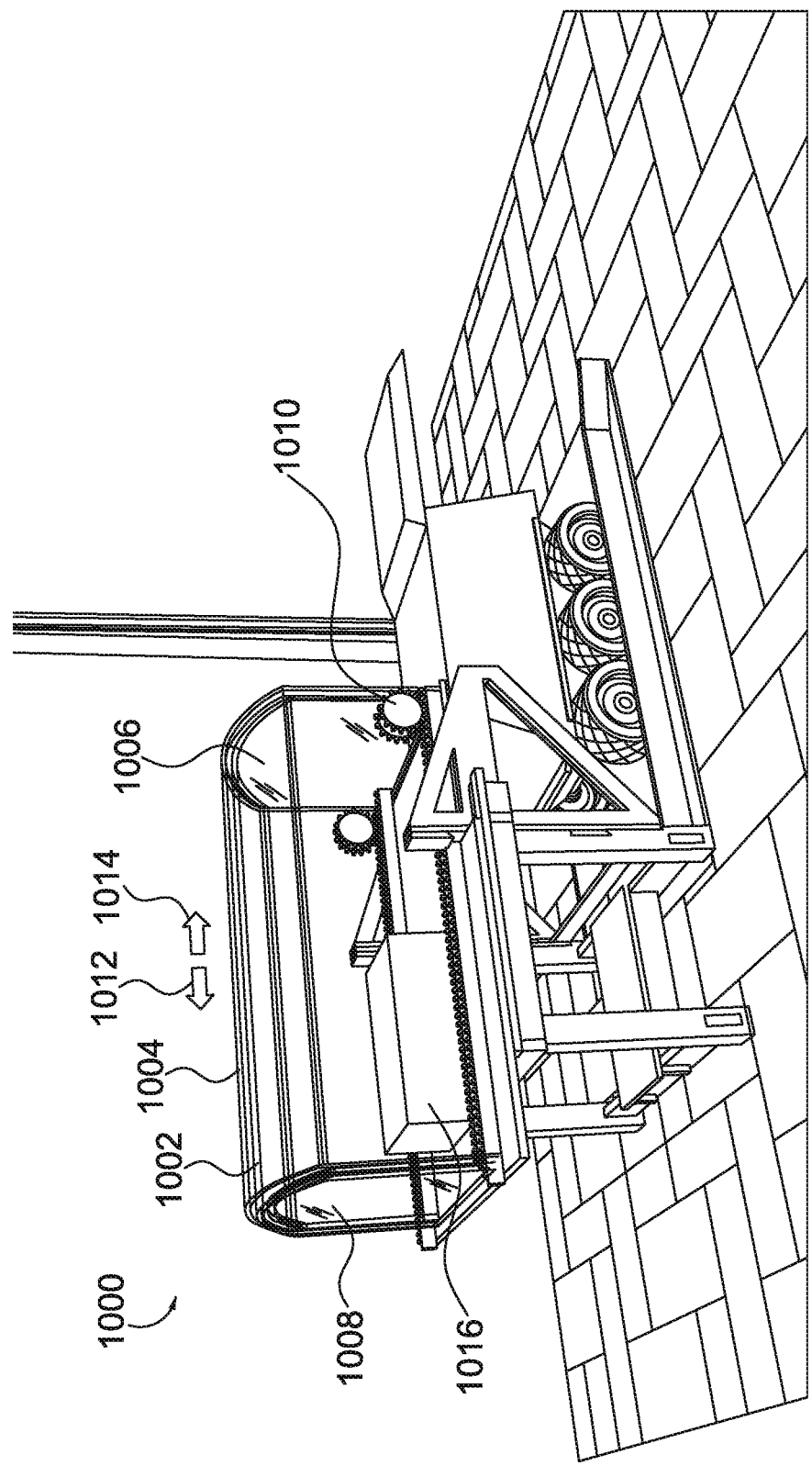
FIGS. 37-39 illustrate another example embodiment of a containment unit and an example method of removing a parcel from the containment unit, in accordance with embodiments described herein.

Moving now to FIG. 37, another embodiment of a containment unit is provided as containment unit 1000. Containment unit 1000 may comprise inner housing unit 1002 and outer housing unit 1004. As described in other embodiments, inner housing unit 1002 may also comprise first end piece 1006, and inner housing unit 1002 may be movable, for example, by using a first gear and track system 1010.

Containment unit 1000 may further comprise a movable second end piece 1008. Movable second end piece 1008 may be in a first position at the location shown in FIG. 37. That is, when movable second end piece 1008 is in the first position, movable second end piece 1008 is opposite a delivery end, i.e., the end where the parcel 1016 is being retrieved from or dropped off. As illustrated in FIG. 37, the delivery end is the end of containment unit 1000 having first end piece 1006. Movable second end piece 1008 may move in a direction indicated by directional arrows 1012 and 1014. For example, movable second end piece 1008 may move in a direction towards the delivery end, such as toward first end piece 1006 and may move in a direction away from the delivery end, such as away from first end piece 1006. By moving second end piece 1008 toward or away from the delivery end, second end piece 1008 may facilitate removing parcel 1016 from containment unit 1000

Figure 38:
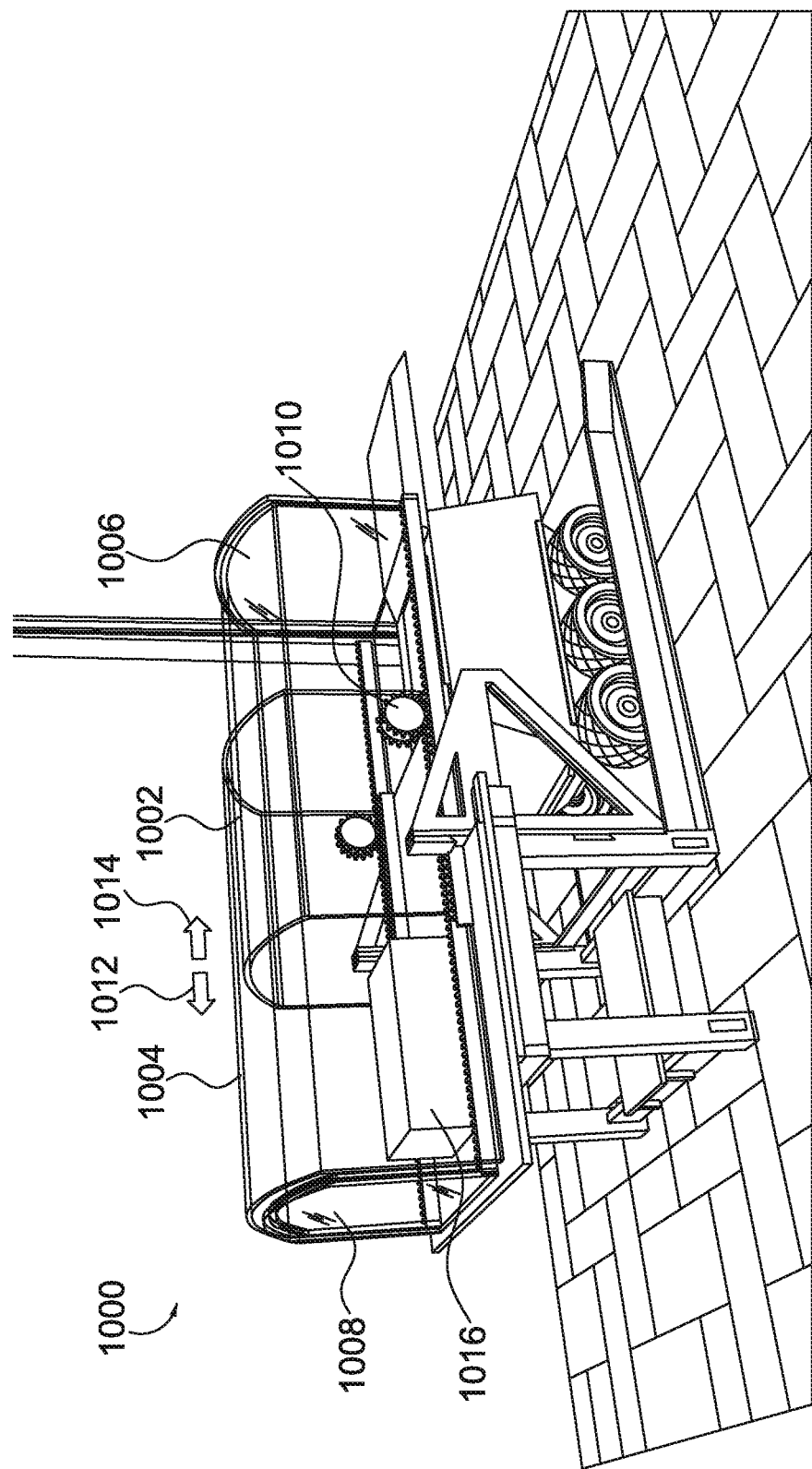
Figure 39:
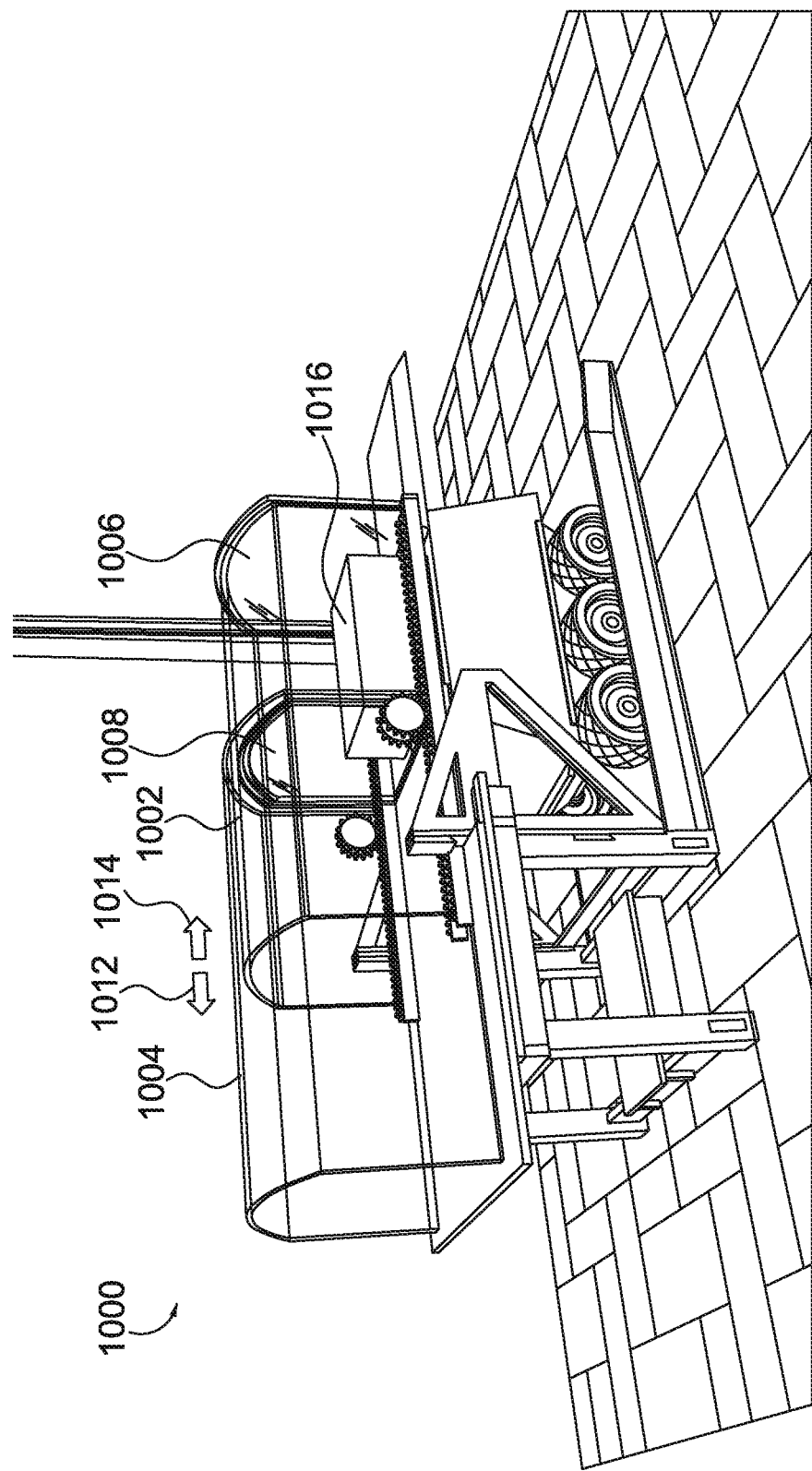

FIGS. 37-39 illustrate an example of removing parcel 1016 from containment unit 1000 so that parcel 1016 may be retrieved by an unmanned system. For example, in FIG. 37, parcel 1016 is inside containment unit 1000, which includes at least inner housing unit 1002. Like other embodiments of containment units, containment unit 1000 may comprise inner housing unit 1002 and not comprise outer housing unit 1004, although containment unit 1000 is illustrated as having outer housing unit 1004.

To remove parcel 1016, inner housing unit 1002 may move to an extended position, such as that shown in FIG. 38. As noted, movable second end piece 1008 may move in the direction of the delivery end, or first end piece 1006, by moving in the direction indicated using directional arrow 1014. As illustrated in FIG. 39, when second end piece 1008 moves toward the delivery end of containment unit 1000, it pushes parcel 1016 in the direction of the delivery end. When parcel 1016 moves toward the delivery end, parcel 1016 may exit a bottom opening of inner housing unit 1002 that is formed by moving inner housing unit 1002.

Figure 40:
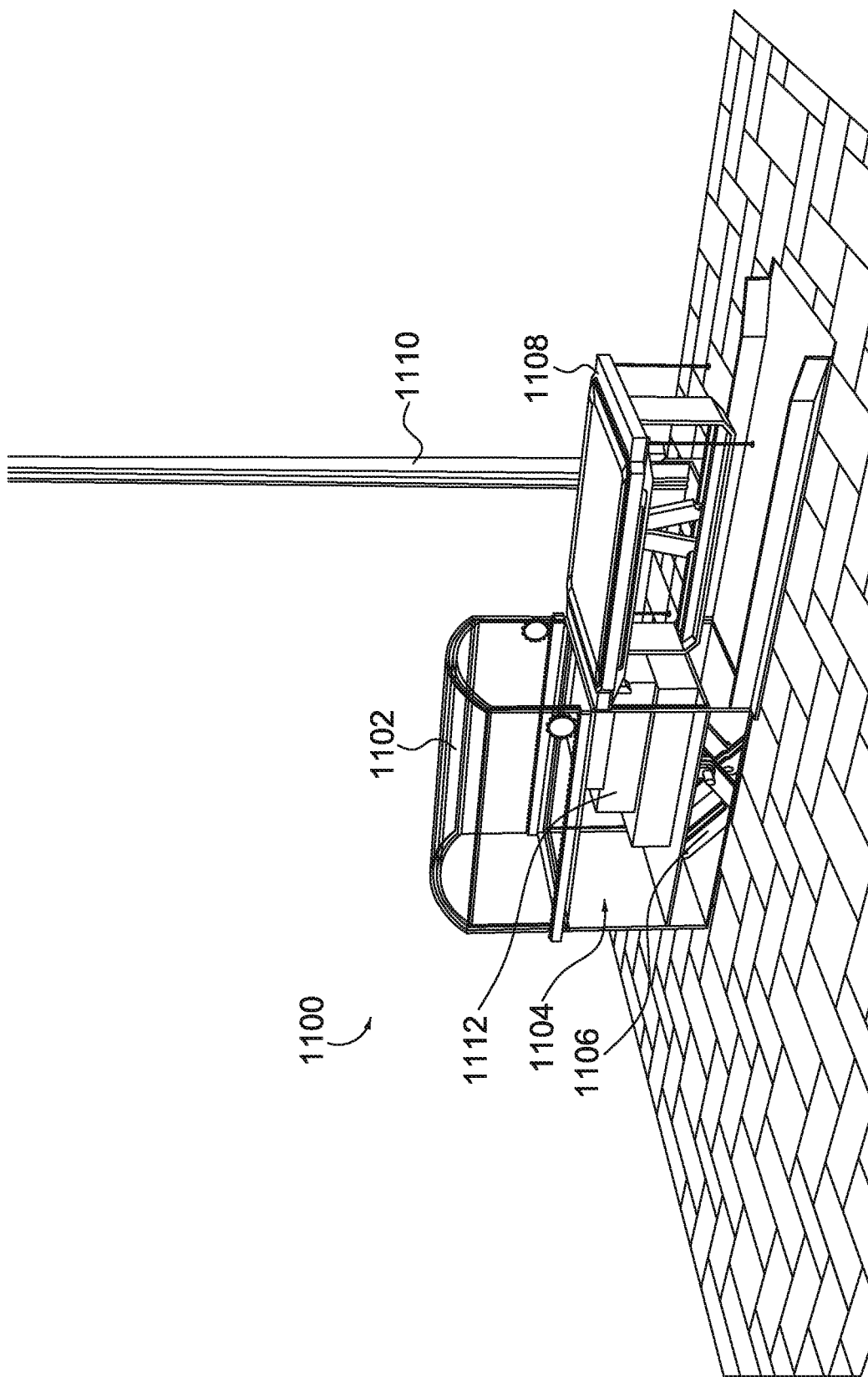
FIG. 40 illustrates another example embodiment of a containment unit, in accordance with embodiments described herein.

With reference now to FIG. 40, another embodiment of a containment unit, illustrated as containment unit 1100, is described. Here, containment unit 1100 comprises housing 1102, which may comprise one or more housing units. Containment unit 1100 may further comprise chamber area 1104 and movable floor 1106, which may be movable using lift 1108. In this embodiment, floor 1106 may be lowered, which increases the volume of chamber area 1104, which allows for the storage of parcels 1112 within the chamber area 1104 and below housing 1102. Floor 1106 may also be raised to decrease the volume of chamber area 1104, which moves parcels 1112 in an upward direction toward housing 1102. Parcel 1112 may be moved upward until they are within housing 1102. In some cases, parcels 1112 may be moved into housing 1102 so that parcels 1112 may be removed from within housing 1102 using methods previously described. Parcels 1112 may be raised or lowered using floor 1106 so that a top portion of parcels 1112 is horizontally aligned with elevating surface 1110 so that another parcel may be received from elevating surface 1110, not illustrated.

This disclosure provides several embodiments of containment units. Some embodiments of the containment units have been described having a set of components, while other embodiments have been described having a different set. For example, containment unit 1100 is described having movable floor 1106, while containment unit 600 is described having floor 608, which is associated with one or more housing units. It will be recognized, however, that not all embodiments of the containment unit can be described in this disclosure, and therefore, it is intended by the inventors that the various aspects and components described relative to each embodiment of the containment units are interchangeable and can be in any combination with any other embodiment.

Methods

With regard to various embodiments described in this disclosure, and with reference to the methods below, aspects of the present technology may take the form of methods; systems; one or more computer storage media having computer-executable instructions embodied thereon that may be executed by one or more processors; or any combination thereof. Example methods are illustrated with reference to FIGS. 42-46

Figure 42:
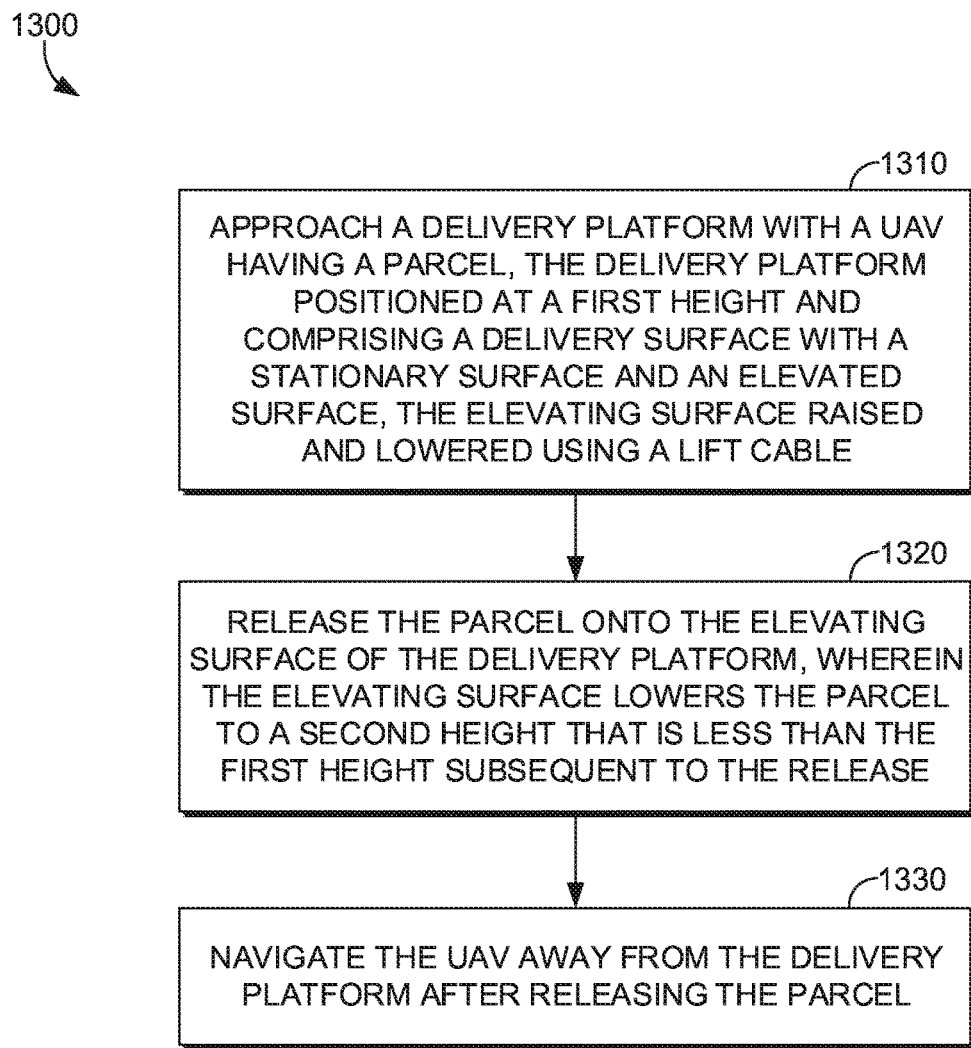
FIGS. 42-46 illustrate a selection of example methods that may be performed using the described technology, in accordance with embodiments described herein.

FIG. 42 illustrates a flow diagram of method 1300 for delivering a parcel. Method 1300 includes, at block 1310, approaching a delivery platform with a UAV having a parcel. The UAV may communicate to the delivery platform an indication that the UAV is approaching with the parcel for release on the delivery platform. The delivery platform may include any of the embodiments described herein. For example, the delivery platform may include a delivery surface that comprises an elevating surface and a stationary surface, the elevating surface having a lift that lowers the elevating surface from a raised position at a first height at the delivery platform to a lowered position where the parcel may be retrieved. Method 1300 further includes, at block 1320, releasing the parcel onto the delivery platform, for example, releasing the parcel onto the elevating surface of the delivery platform. Subsequent to the release, the elevating surface lowers the parcel to a second height that is less than the first height. In response to releasing the parcel on the delivery platform, method 1300 further includes, at block 1330, navigating the UAV away from the delivery platform.

Figure 43:
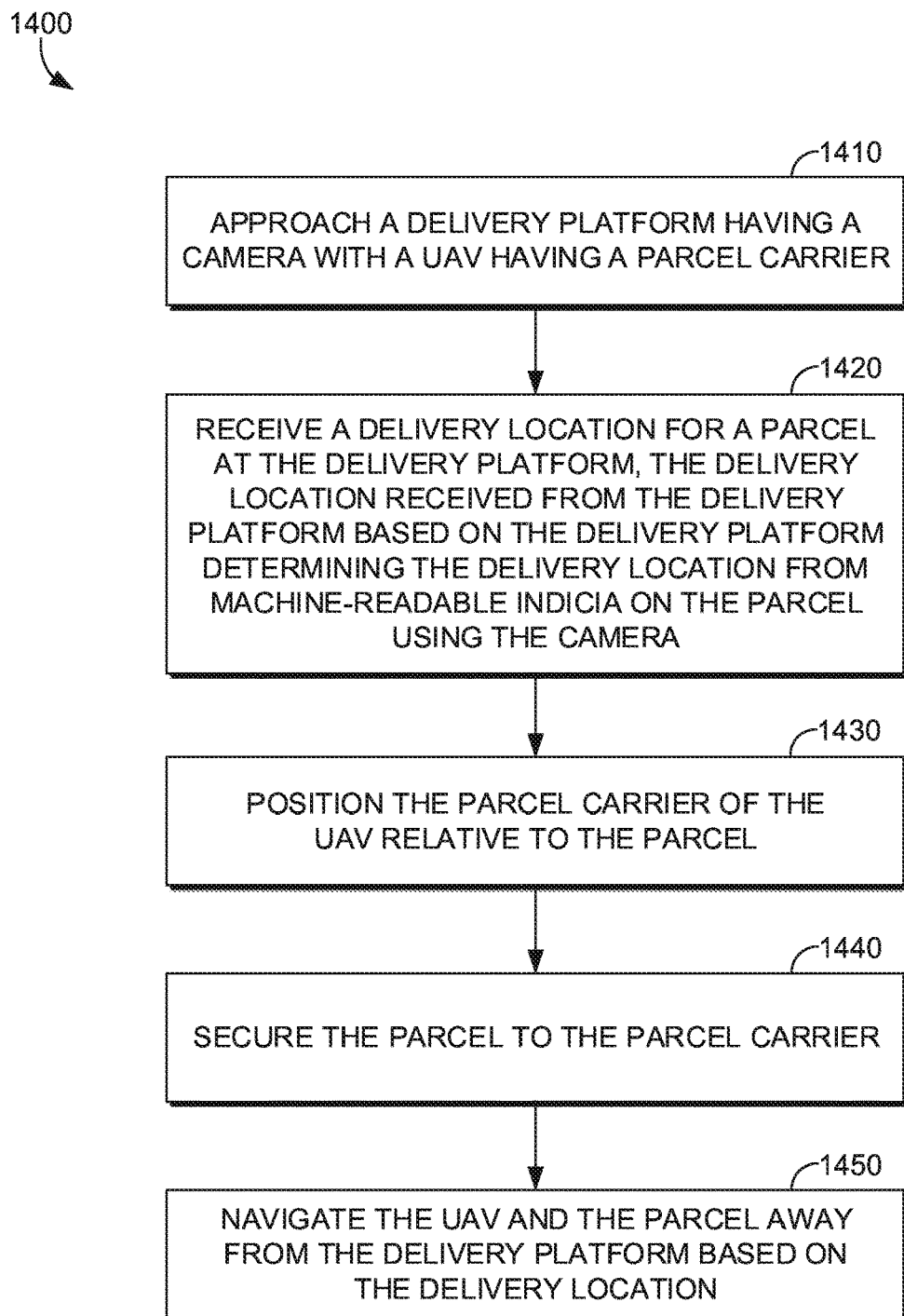

FIG. 43 provides example method 1400 for retrieving a parcel from a delivery platform. At block 1410, a UAV having a parcel carrier approaches a delivery platform. The delivery platform may be any type of delivery platform described herein. In an example, the delivery platform comprises a camera to read machine-readable indicia. At block 1420, a delivery location for the parcel is received. The delivery location can be received at the UAV from delivery platform. The delivery location is received from the delivery platform based on the delivery platform determining the delivery location from machine-readable indicia on the parcel. The UAV uses the camera to scan the machine-readable indicia to determine the delivery location. At block 1430, the UAV is positioned relative to the parcel. The position of the UAV is relative to the parcel based on the parcel carrier, for example, the parcel carrier may require the UAV to be positioned above the parcel carrier. The UAV can be positioned at any point relative to the parcel, such that parcel can be secured to or by the parcel carrier. Based on the position of the UAV, at block 1440, the parcel is secured to the parcel carrier. In an aspect, the parcel carrier closes around the parcel to secure the parcel. In another aspect, the delivery platform secures the parcel to the parcel carrier. At block 1450, the UAV navigates away from the delivery platform with the parcel. The UAV navigates away based on the delivery location. That is, the UAV may navigate away from delivery platform to the delivery location or to an intermediate location to facilitate delivery of the parcel to the delivery location.

Figure 44:
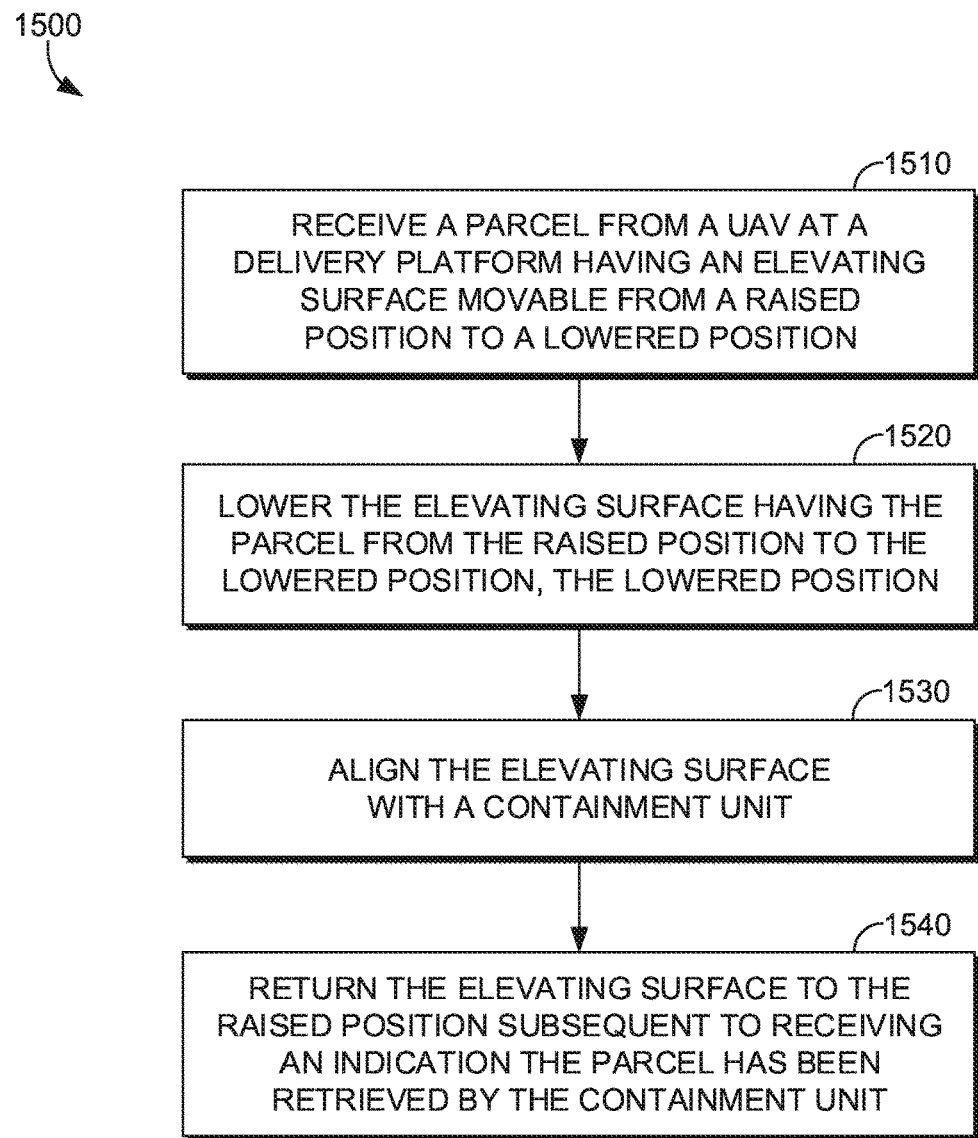

Method 1500 is described with reference to FIG. 44. Method 1500 includes an example method for delivering a parcel. At block 1510, method 1500 includes receiving a parcel from a UAV at a delivery platform. The delivery platform may include any of the embodiments described herein. For example, the delivery platform may include a delivery surface that comprises an elevating surface and a stationary surface, the elevating surface may have a lift that lowers the elevating surface from a raised position at the delivery platform to a lowered position. At block 1520, in response to receiving the parcel at the delivery platform, lowering the elevating surface having the parcel from the raised position to the lowered position. The method may include receiving an indication that the parcel has been delivered to the delivery platform. The parcel may be scanned by a camera on the delivery platform to determine a delivery address of the parcel. For example, the camera may image a machine-readable indicia on the parcel that is associated with the delivery information of the parcel. In some cases, the delivery address may be determined by receiving an indication of the delivery address from the UAV. Based on determining the delivery address, the method may include determining that the delivery address is associated with a containment unit of a plurality of containment units. The elevating surface may be lowered to the containment unit associated with the delivery address. At block 1530, the elevating surface is aligned with a containment unit. The elevating surface may be lowered to horizontally align a bottom of the parcel with a floor of the containment unit. Based on receiving an indication that the parcel has been retrieved by the containment unit (e.g., the elevating surface no longer detects the parcel's weight), at block 1540, the elevating surface may be raised to the raised position.

Figure 45:
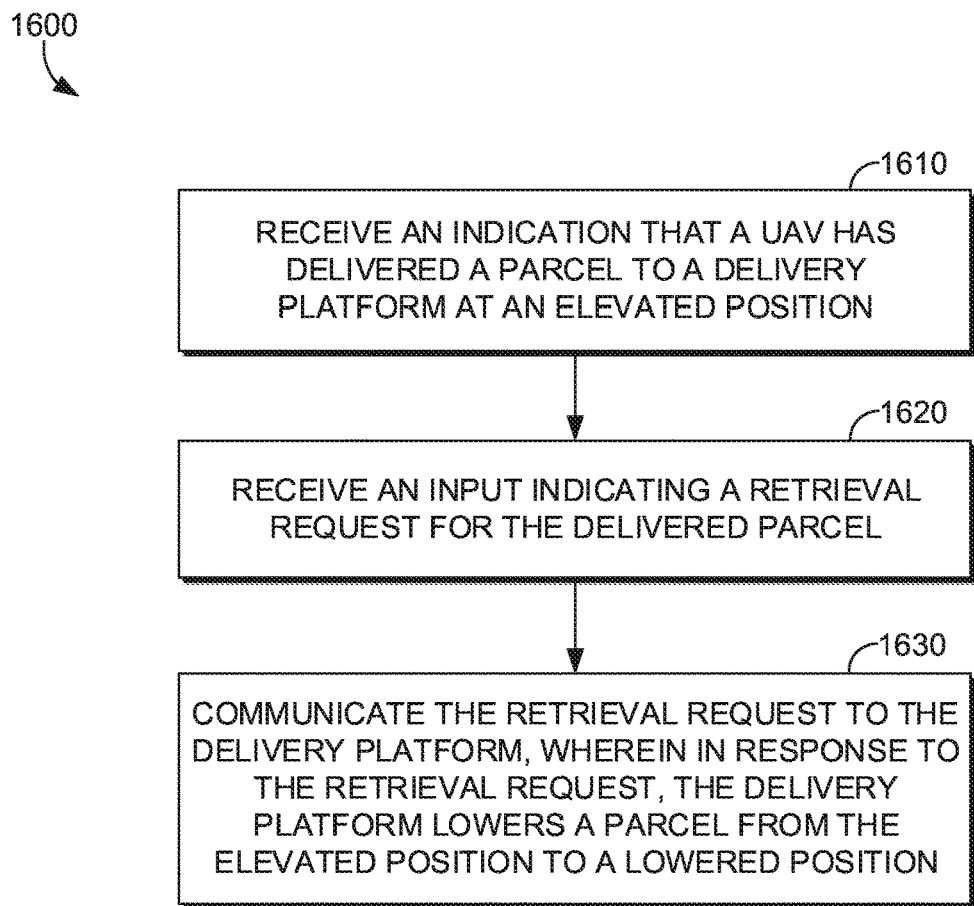
Figure 46:
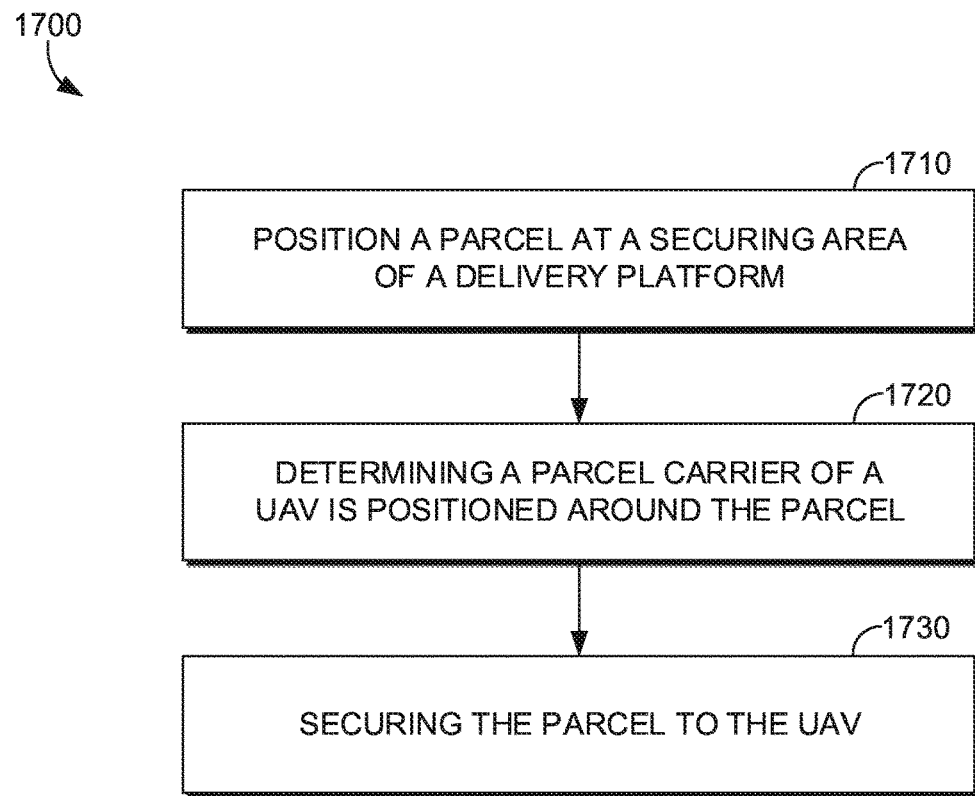

An example method of retrieving a parcel is provided by method 1600 with reference to FIG. 45. Method 1600 can be performed using computer-readable media that store executable instructions. Such instructions may be in the form of an app that is executable by a user device, such as a smartphone. At block 1610, an indication that a UAV has delivered a parcel to a delivery platform may be received by the user device. In response to receiving the indication, the user device, at block 1620, receives an input indicating a retrieval request for the delivered parcel. In response to receiving the retrieval request, at block 1630, the user device may communicate instructions to the delivery platform to initiate a retrieval process. The retrieval process may include lowering an elevating surface of the delivery platform having the parcel from an elevated position to a lowered position.

In some cases, the elevating surface of the delivery platform may be lowered to a lowered position where it is retrieved by a containment unit. The user device may receive an indication that the parcel has been retrieved by the containment unit. In some cases, the user device may communicate a retrieval request to the containment unit, where in response to the retrieval request to the containment unit, the containment unit releases the parcel.

Method 1700 provides an example method for securing a parcel to a UAV at a delivery platform. Method 1700 is described with reference to FIG. 46. At block 1710, a parcel is positioned at a securing area of a delivery platform. The delivery platform may be any delivery platform described herein. Positioning the parcel at the securing area may include receiving a parcel at an elevating surface of the delivery platform. In such cases, the elevating surface raises the parcel to a delivery surface. Securing area can be separate from, part of, or the same as delivery surface. Positioning the parcel at the securing area may include maneuvering the parcel into a particular position, which may be done using rollers. At block 1720, it is determined that that a parcel carrier of a UAV is positioned around a parcel. This can be determined using sensors provided on the delivery platform, such as the camera. At block 1730, the parcel is secured to the UAV. The parcel can be secured to the parcel carrier of the UAV. Using one method, the parcel carrier extends a securing arm over the parcel carrier and the parcel. The parcel carrier uses the securing arm to tighten a strap around the parcel carrier and the securing arm. The strap secures the parcel to the securing arm, such the UAV can be navigated away from the delivery platform with the parcel.

Computing Device

Referring back now to FIG. 41, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 41, computing device 1200 includes a bus 1210 that directly or indirectly couples the following devices: memory 1212, one or more processors 1214, one or more presentation components 1216, input/output ports 1218, input/output components 1220, and an illustrative power supply 1222. Bus 1210 represents what may be one or more busses (such as an address bus, data bus, or combination thereof). Although the various blocks of FIG. 41 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 41 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 41 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, random access memory (RAM), read-only memory (ROM), electrically erasable programmable read-only memory (EEPROM), flash memory or other memory technology, Compact Disc Read-Only Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc.

Example embodiments described in and derived from the description above include the following:

Embodiment 1: A delivery platform to facilitate delivery of parcels by unmanned aerial vehicles (UAVs), the delivery platform comprising: a delivery surface, the delivery surface comprising a stationary surface and an elevating surface; a lift cable extendable from the delivery platform, the lift cable secured to the elevating surface, wherein extending the lift cable lowers the elevating surface from an elevated position to a lowered position and retracting the lift cable raises the elevating surface from the lowered position to the elevated position; and a guide wheel secured to the elevating surface and extending away from the elevating surface.

Embodiment 2: Embodiment 1, wherein the delivery platform is secured to a track system, and wherein the delivery platform moves along the track system from a first position to a second position, the first position higher in elevation than the second position. Embodiment 3: Any of Embodiments 1-2, wherein the stationary surface surrounds the elevating surface. Embodiment 4: Any of Embodiments 1-3, further comprising a cover extendable from a retracted position to a covered position, the covered position extending over a top of the delivery surface. Embodiment 5: Any of Embodiments 1-4, wherein the cover comprises a plurality of segments that stack together when the cover is in the retracted position and extend end to end when the cover is in the covered position. Embodiment 6: Any of Embodiments 1-5, wherein the cover is pivotably secured to the delivery platform at a pivot such that rotation about the pivot in a first direction moves the cover from the retracted position to the covered position and rotation about the pivot in a second direction opposite the first direction moves the cover from the covered position to the retracted position. Embodiment 7: Any of Embodiments 1-6, further comprising a chamber below the stationary surface, wherein a bottom of the chamber corresponds to the elevating surface, the chamber formed by lowering the elevating surface away from the stationary surface.

Embodiment 8: A delivery system to facilitate delivery of parcels by unmanned aerial vehicles (UAVs), the delivery system comprising: a track system; and a delivery platform movably coupled to the track system such that the delivery platform moves about the track system from a first position to a second position, the first position having a higher elevation than the second position, wherein the delivery platform further comprises: a delivery surface comprising a stationary surface having a stationary edge; and an outer rim extending upward and away from the stationary edge. Embodiment 9: Embodiment 8 further comprising a chamber below the stationary surface. Embodiment 10: Any of Embodiments 8-9, wherein the chamber comprises a bottom portion corresponding to an elevating surface of the delivery surface, the chamber formed by lowering the elevating surface away from the stationary surface. Embodiment 11: Any of Embodiments 8-10, wherein the chamber comprises a top rim, the top rim horizontally aligned with the stationary surface, and the chamber comprises a sidewall extending from the top rim to the elevating surface. Embodiment 12: Any of Embodiments 8-11, wherein the elevating surface contacts a threaded shaft extending below the stationary surface, and wherein the elevating surface is lowered by rotating the threaded shaft in a first direction and is raised by rotating the threaded shaft in a second direction opposite the first direction. Embodiment 13: Any of Embodiments 8-12, further comprising an elongated member having a pivot joint end pivotably affixed to a bottom of the elevating surface and a movable end opposite the pivot joint end, the movable end coupled to a shaft such that movement of the shaft in a first direction lowers the elevating surface and movement of the shaft in a second direction raises the elevating surface. Embodiment 14: Any of Embodiments 8-13, further comprising a cover extendable from a retracted position to a covered position, the covered position extending over a top of the delivery surface. Embodiment 15: Any of Embodiments 8-14, wherein the cover is pivotably secured to the delivery platform at a pivot such that rotation about the pivot in a first direction moves the cover from the retracted position to the covered position and rotation about the pivot in a second direction opposite the first direction moves the cover from the covered position to the retracted position.

Embodiment 16: A delivery platform to facilitate delivery of parcels by unmanned aerial vehicles (UAVs), the delivery platform comprising: a delivery surface comprising an elevating surface movable from an elevated position to a lowered position, the elevated position having a higher elevation than the lowered position; a lift cable secured to the elevating surface, wherein extending the lift cable lowers the elevating surface from the elevated position to the lowered position and retracting the lift cable raises the elevating surface from the lowered position to the elevated position; and an arm extending away from the delivery surface to a mount. Embodiment 17: Embodiment 16, wherein the delivery surface further comprises a stationary surface, the stationary surface having a stationary edge and an outer rim extending upward and away from the stationary edge. Embodiment 18: Any of Embodiments 16-17, further comprising a cover extendable from a retracted position to a covered position, the covered position extending over a top of the delivery surface. Embodiment 19: Any of Embodiments 16-18, further comprising a chamber below the delivery surface, the chamber comprising a bottom portion corresponding to the elevating surface, and comprising a sidewall extending from a top rim of a stationary surface of the delivery platform, the chamber formed by lowering the elevating surface below the stationary surface. Embodiment 20: Any of Embodiments 16-19, further comprising a guide wheel extending from the elevating surface.

Embodiment 21: Any of Embodiments 1-20, further comprising: a containment unit for facilitating parcel delivery, the containment unit comprising: a housing having a housing floor, the housing comprising: a stationary outer housing unit; and a movable inner housing unit, the inner housing unit having a first inner sidewall and a second inner sidewall, the first inner sidewall and the second inner sidewall connected by an end piece, the inner housing unit comprising a bottom opening between the first inner sidewall and the second inner sidewall. Embodiment 22: Embodiment 21, wherein the first inner sidewall and the second inner sidewall are parallel and separated by a distance. Embodiment 23: Any of Embodiments 20-22, wherein the first inner sidewall and the second inner sidewall each have a first end and a second end, the end piece connecting the first end of the first inner sidewall and the first end of the second inner sidewall. Embodiment 24: Any of Embodiments 20-23, wherein the outer housing unit further comprises a first outer sidewall and a second outer sidewall, each of the first outer sidewall and the second outer sidewall having a first end and a second end, and wherein the outer housing unit is open between the first end of the first outer sidewall and the first end of the second outer sidewall. Embodiment 25: Any of Embodiments 20-24, wherein the inner housing unit further comprises a gear track, the gear track being in communication with a gear that is secured to a stationary portion of the containment unit.

Embodiment 26: Any of Embodiments 1-20, further comprising a containment unit for facilitating parcel delivery, the containment unit comprising: a housing floor having an edge; and a movable housing unit, the housing unit movable from a retracted position to an extended position, the housing unit comprising: a first sidewall and a second sidewall, each of the first sidewall and the second sidewall having a first end and a second end; a first end piece connecting the first end of the first sidewall and the second end of the second sidewall; and a bottom opening between the first sidewall and the second sidewall, wherein when the housing unit is in the retracted position, the first sidewall and the second sidewall are above the housing floor, and wherein when the housing unit is in the extended position, at least a portion of both the first sidewall and the second sidewall extend beyond the edge of the housing floor. Embodiment 27: Embodiment 26, wherein the housing unit is an inner housing unit, the first sidewall is a first inner sidewall, and the second sidewall is a second inner sidewall, the containment unit further comprising an outer housing unit around the inner housing unit. Embodiment 28: Any of Embodiments 26-27, wherein the outer housing unit comprises a first outer sidewall and a second outer sidewall, each of the first outer sidewall and the second outer sidewall having a first end and a second end, wherein the outer housing unit is open between the first end of the first outer sidewall and the first end of the second outer sidewall. Embodiment 29: Any of Embodiments 26-28, wherein when in the retracted position, the outer housing unit covers the inner housing unit, and wherein when in the extended position, at least a portion of the inner housing unit is not covered by the outer housing unit. Embodiment 30: Any of Embodiments 26-29, wherein the outer housing unit is stationary. Embodiment 31: Any of Embodiments 26-30, wherein the second end of the first sidewall and the second end of the second sidewall are connected by a second end piece. Embodiment 32: Any of Embodiments 26-31, wherein the second end piece provides access to a volume of space within the housing unit. Embodiment 33: Any of Embodiments 26-32, further comprising a movement mechanism, the housing unit movable from the retracted position to the extended position using the movement mechanism.

Embodiment 34: A method of receiving a parcel at a containment unit to facilitate delivery of the parcel, the method comprising: extending a housing unit of the containment unit from a retracted position to an extended position, the housing unit comprising a first sidewall and a second sidewall, each of the first sidewall and the second sidewall having a first end and a second end, the housing unit further comprising a first end piece connecting the first end of the first sidewall and the first end of the second sidewall; and subsequent to the parcel being placed in a volume of space of the housing unit, retracting the housing unit to the retracted position such that the first end piece applies a force to the parcel that slides the parcel onto a housing floor of the housing unit. Embodiment 35: Embodiment 34, wherein the housing unit is an inner housing unit, the first sidewall is a first inner sidewall, and the second sidewall is a second inner sidewall, the housing unit further comprising an outer housing unit around the inner housing unit. Embodiment 36: Any of Embodiments 34-35, wherein the outer housing unit is stationary. Embodiment 37: Any of Embodiments 34-36, wherein the outer housing unit comprises a first outer sidewall and a second outer sidewall, each of the first outer sidewall and the second outer sidewall having a first end and a second end, wherein the outer housing unit is open between the first end of the first outer sidewall and the first end of the second outer sidewall. Embodiment 38: Any of Embodiments 34-37, wherein the parcel is placed through a bottom opening between the first sidewall and the second sidewall when the housing unit is in the extended position. Embodiment 39: Any of Embodiments 34-38, wherein the second end of the first sidewall and the second end of the second sidewall are connected by a second end piece, wherein the method further includes providing access to the parcel using the second end piece. Embodiment 40: Any of Embodiments 34-39, wherein the housing unit further includes a gear track, the gear track being in communication with a gear that is secured to a stationary portion of the containment unit, wherein the containment unit extends the housing unit from the retracted position to the extended position by rotating the gear.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims. The described technology may be made without departing from the scope, it is to be understood that all matter described herein or illustrated in the accompanying drawings is to be interpreted as illustrative and not in a limiting sense.

What is claimed is:

1. A delivery platform to facilitate delivery of parcels by unmanned aerial vehicles (UAVs), the delivery platform comprising:
   a delivery surface, the delivery surface comprising a stationary surface and an elevating surface;
   a lift cable extendable from the delivery platform, the lift cable secured to the elevating surface, wherein extending the lift cable lowers the elevating surface from an elevated position to a lowered position and retracting the lift cable raises the elevating surface from the lowered position to the elevated position; and
   a guide wheel secured to the elevating surface and extending away from the elevating surface.

2. The delivery platform of claim 1, wherein the delivery platform is secured to a track system, and wherein the delivery platform moves along the track system from a first position to a second position, the first position higher in elevation than the second position.

3. The delivery platform of claim 1, wherein the stationary surface surrounds the elevating surface.

4. The delivery platform of claim 1, further comprising a cover extendable from a retracted position to a covered position, the covered position extending over a top of the delivery surface.

5. The delivery platform of claim 4, wherein the cover comprises a plurality of segments that stack together when the cover is in the retracted position and extend end to end when the cover is in the covered position.

6. The delivery platform of claim 4, wherein the cover is pivotably secured to the delivery platform at a pivot such that rotation about the pivot in a first direction moves the cover from the retracted position to the covered position and rotation about the pivot in a second direction opposite the first direction moves the cover from the covered position to the retracted position.

7. The delivery platform of claim 1, further comprising a chamber below the stationary surface, wherein a bottom of the chamber corresponds to the elevating surface, the chamber formed by lowering the elevating surface away from the stationary surface.

8. A delivery system to facilitate delivery of parcels by unmanned aerial vehicles (UAVs), the delivery system comprising:
   a track system; and
   a delivery platform movably coupled to the track system such that the delivery platform moves about the track system from a first position to a second position, the first position having a higher elevation than the second position, wherein the delivery platform comprises:
   a delivery surface comprising a stationary surface having a stationary edge,
   an outer rim extending upward and away from the stationary edge, and
   a chamber below the stationary surface, wherein the chamber comprises a bottom portion corresponding to an elevating surface of the delivery surface, the chamber formed by lowering the elevating surface away from the stationary surface.

9. The delivery system of claim 8, wherein the chamber comprises a top rim, the top rim horizontally aligned with the stationary surface, and the chamber comprises a sidewall extending from the top rim to the elevating surface.

10. The delivery system of claim 8, wherein the elevating surface contacts a threaded shaft extending below the stationary surface, and wherein the elevating surface is lowered by rotating the threaded shaft in a first direction and is raised by rotating the threaded shaft in a second direction opposite the first direction.

11. The delivery system of claim 8, further comprising an elongated member having a pivot joint end pivotably affixed to a bottom of the elevating surface and a movable end opposite the pivot joint end, the movable end coupled to a shaft such that movement of the shaft in a first direction lowers the elevating surface and movement of the shaft in a second direction raises the elevating surface.

12. The delivery system of claim 8, further comprising a cover extendable from a retracted position to a covered position, the covered position extending over a top of the delivery surface.

13. The delivery system of claim 12, wherein the cover is pivotably secured to the delivery platform at a pivot such that rotation about the pivot in a first direction moves the cover from the retracted position to the covered position and rotation about the pivot in a second direction opposite the first direction moves the cover from the covered position to the retracted position.

14. A delivery platform to facilitate delivery of parcels by unmanned aerial vehicles (UAVs), the delivery platform comprising:

a delivery surface comprising an elevating surface movable from an elevated position to a lowered position, the elevated position having a higher elevation than the lowered position;

a lift cable secured to the elevating surface, wherein extending the lift cable lowers the elevating surface from the elevated position to the lowered position and retracting the lift cable raises the elevating surface from the lowered position to the elevated position; and an arm extending away from the delivery surface to a mount.

15. The delivery platform of claim 14, wherein the delivery surface further comprises a stationary surface, the stationary surface having a stationary edge and an outer rim extending upward and away from the stationary edge.

16. The delivery platform of claim 14, further comprising a cover extendable from a retracted position to a covered position, the covered position extending over a top of the delivery surface.

17. The delivery platform of claim 14, further comprising a chamber below the delivery surface, the chamber comprising a bottom portion corresponding to the elevating surface, and comprising a sidewall extending from a top rim of a stationary surface of the delivery platform, the chamber formed by lowering the elevating surface below the stationary surface.

18. The delivery platform of claim 14, further comprising a guide wheel extending away from the elevating surface.

* * * * *

UNITED STATES PATENT AND TRADEMARK OFFICE
CERTIFICATE OF CORRECTION

PATENT NO. : 10,993,569 B2
APPLICATION NO. : 16/704967
DATED : May 4, 2021
INVENTOR(S) : Julio Gil et al.

Page 1 of 1

It is certified that error appears in the above-identified patent and that said Letters Patent is hereby corrected as shown below:

In the Specification

In Column 9, Line 22, delete "317" and insert -- 317. --, therefor.

In Column 15, Line 49, delete "UAVs" and insert -- UAVs. --, therefor.

In Column 18, Line 17, delete "detect and image" and insert -- detect an image --, therefor.

In Column 19, Line 29, delete "1000" and insert -- 1000. --, therefor.

In Column 20, Line 26, delete "42-46" and insert -- 42-46. --, therefor.

In Column 22, Lines 11-12, delete "that that" and insert -- that --, therefor.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*